(12) United States Patent
Perelli et al.

(10) Patent No.: US 11,234,510 B2
(45) Date of Patent: Feb. 1, 2022

(54) DEVICE AND STAND ASSEMBLY

(71) Applicant: Lenovo (Singapore) Pte. Ltd., Singapore (SG)

(72) Inventors: Thomas Perelli, Raleigh, NC (US); Brian H. Leonard, Chapel Hill, NC (US); Ali Kathryn Ent, Raleigh, NC (US); Cuong Huy Truong, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/551,931

(22) Filed: Aug. 27, 2019

(65) Prior Publication Data

US 2021/0059401 A1 Mar. 4, 2021

(51) Int. Cl.
| | |
|---|---|
| *A47B 23/04* | (2006.01) |
| *A47B 97/04* | (2006.01) |
| *G06F 1/16* | (2006.01) |
| *H02J 7/02* | (2016.01) |
| *F16M 11/18* | (2006.01) |
| *G06F 3/02* | (2006.01) |
| *H04M 1/02* | (2006.01) |
| *F16M 11/24* | (2006.01) |
| *F16M 13/02* | (2006.01) |

(52) U.S. Cl.
CPC ............ *A47B 23/043* (2013.01); *A47B 97/04* (2013.01); *G06F 1/1632* (2013.01); *H02J 7/025* (2013.01); *A47B 2023/049* (2013.01); *F16M 11/18* (2013.01); *F16M 11/24* (2013.01); *F16M 13/022* (2013.01); *G06F 1/166* (2013.01); *G06F 3/0202* (2013.01); *H04M 1/0202* (2013.01)

(58) Field of Classification Search
CPC .... G06F 1/1681; G06F 1/1618; G06F 1/1654; G06F 1/1679; G06F 1/166; G06F 1/1632; G06F 3/0202; F16M 11/10; F16M 11/24; F16M 11/18; F16M 13/022; A47B 21/02; A47B 23/043; A47B 97/04; A47B 2023/049; H04M 1/0202
See application file for complete search history.

(56) References Cited

U.S. PATENT DOCUMENTS

| | | | | |
|---|---|---|---|---|
| 4,832,303 | A * | 5/1989 | Myeeo | A47B 23/043 248/444.1 |
| 5,655,651 | A * | 8/1997 | Maier | A47B 97/08 206/1.7 |
| 6,994,306 | B1 * | 2/2006 | Sweere | F16M 11/10 248/295.11 |
| 8,662,605 | B2 * | 3/2014 | McRorie | A61B 50/13 312/276 |

(Continued)

*Primary Examiner* — Tan Le
(74) *Attorney, Agent, or Firm* — Brian J. Pangrle

(57) ABSTRACT

An assembly can include a rectangular device that includes an x dimension, a y dimension and a display; and a stand that supports the rectangular device in different orientations, where the different orientations include a horizontal orientation of the x dimension and a horizontal orientation of the y dimension, where the stand includes an adjustable coupling that physically supports at least a portion of a mass of the rectangular device in the horizontal orientation of the x dimension and that physically supports at least a portion of a mass of the rectangular device in the horizontal orientation of the y dimension.

19 Claims, 35 Drawing Sheets

(56) References Cited

U.S. PATENT DOCUMENTS

| | | | |
|---|---|---|---|
| 9,247,861 B2* | 2/2016 | Kan | H04N 5/655 |
| 9,720,444 B2* | 8/2017 | Holden | A47B 13/081 |
| 10,415,743 B2* | 9/2019 | Hsu | F16M 11/24 |
| 2012/0187056 A1* | 7/2012 | Hazzard | A47B 21/02 |
| | | | 211/26 |

* cited by examiner

DEVICE AND STAND ASSEMBLY

TECHNICAL FIELD

Subject matter disclosed herein generally relates to technology for computing or other devices.

BACKGROUND

Various types of devices, display devices, computing and display devices, etc. exist where such devices may be oriented for use.

SUMMARY

An assembly can include a rectangular device that includes an x dimension, a y dimension and a display; and a stand that supports the rectangular device in different orientations, where the different orientations include a horizontal orientation of the x dimension and a horizontal orientation of the y dimension, where the stand includes an adjustable coupling that physically supports at least a portion of a mass of the rectangular device in the horizontal orientation of the x dimension and that physically supports at least a portion of a mass of the rectangular device in the horizontal orientation of the y dimension. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
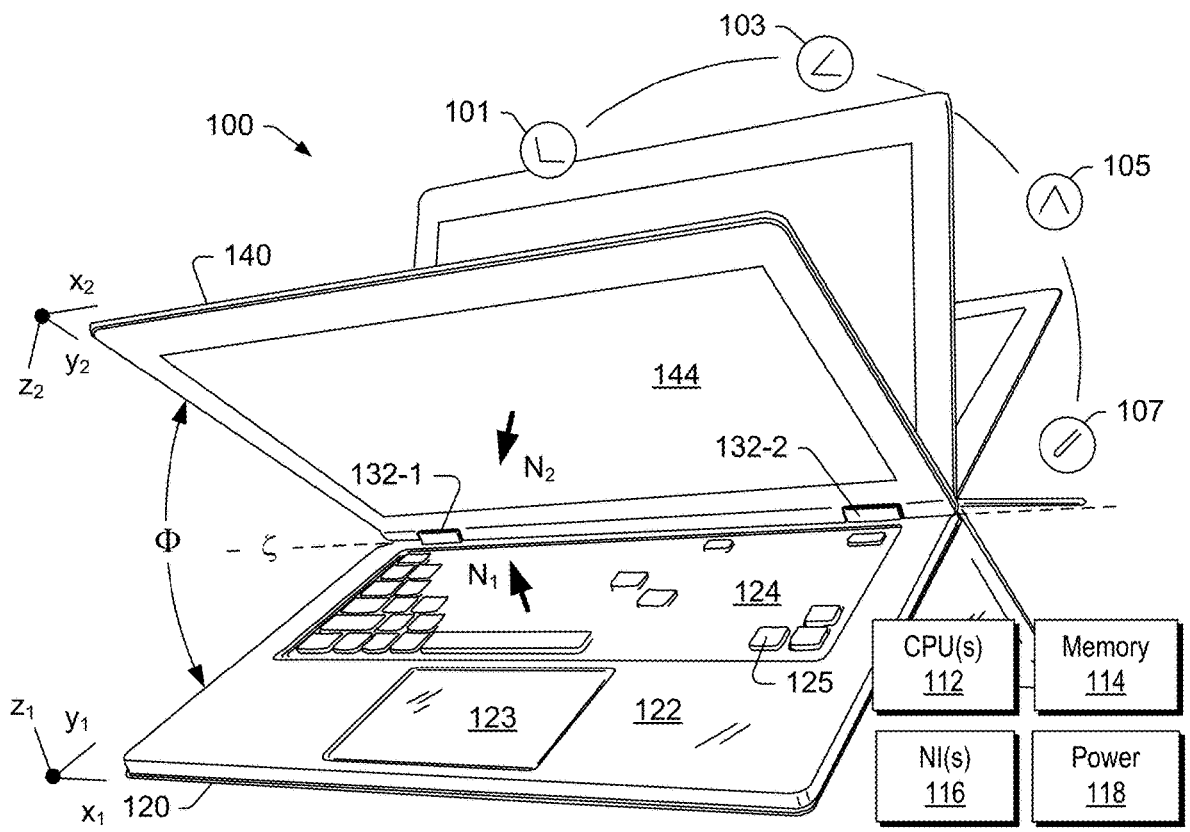
FIG. 1 is a diagram of an example of a device.
Figure 1:
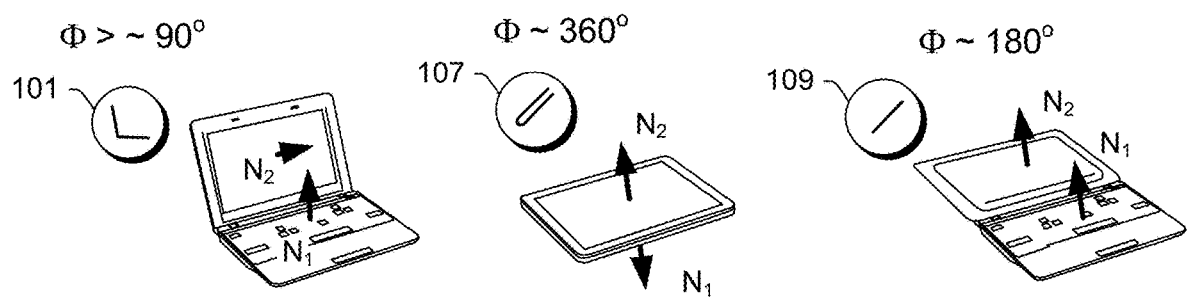

FIG. 1 shows an example of a device 100 that includes a keyboard housing 120 and a display housing 140 that are pivotable with respect to each other via movement about one or more hinges 132-1 and 132-2 (e.g., hinge assemblies). The device 100 may be a device such as, for example, a computing device (e.g., an information handling device).

As an example, the device 100 may include one or more processors 112, memory 114 (e.g., one or more memory devices), one or more network interfaces 116, and one or more power cells 118. Such components may be, for example, housed with the keyboard housing 120, the display housing 140, or the keyboard housing 120 and the display housing 140.

As shown in the example of FIG. 1, the keyboard housing 120 includes a keyboard 124 with keys 125 and the display housing 140 includes a display 144. In such an example, the keyboard 124 is defined in a first Cartesian coordinate system as having a depth along a y-axis ($y_1$), a width along an x-axis ($x_1$) and a height or thickness along a z-axis ($z_1$) that extends in a direction outwardly away from touch surfaces of keys 125 of the keyboard 124 and the display 144 is defined in a second Cartesian coordinate system as having a depth along a y-axis ($y_2$), a width along an x-axis ($x_2$) and a height or thickness along a z-axis ($z_2$) that extends in a direction outwardly away from a viewing surface of the display 144. As an example, a coordinate system may be right-handed or left-handed.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis ζ and an angle Φ about that axis.

FIG. 1 shows some examples of orientations 101, 103, 105, 107 and 109. The orientations 101, 103, 105, 107 and 109 may correspond to orientations of a clamshell computing device. The orientation 101 may be a notebook orientation where the angle Φ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both).

As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.). As an example, the frontal surface 122 may be a surface suitable for resting a palm or palms of a hand or hands. For example, as shown in FIG. 1, the touch input surface 123 can be defined by x and y dimensions.

A palm rest surface can allow a user to rest a palm or palms while the user may type (e.g., touch type) using keys of a keyboard that is part of a keyboard housing. For example, a user can rest a palm on a palm rest surface while using one or more finger tips (e.g., or finger pads) to touch keys to thereby instruct a computing device to receive input instructions. In such an example, the keys of the keyboard may be depressible keys. A depressible key may include a spring mechanism that allows the key to be, responsive to finger applied force, depressed a distance in the z direction of the Cartesian coordinate system of a keyboard housing to a level that may be a maximum depression level where, upon release of the force, the key may then return to an undepressed level.

As to the orientation 103, it may correspond to a display orientation for viewing the display 144 where the keyboard 124 faces downward and the device 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle $\Phi$ is approximately 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other; whereas, in contrast, for a closed orientation of the device 100 (e.g., where the angle $\Phi$ is approximately 0 degrees), the vectors $N_1$ and $N_2$ would be pointing toward each other.

In the orientation 107, the keyboard 124 has its keys 125 pointing outwardly in the direction of the vector $N_1$. Where the keys 125 are depressible keys, when a user grasps the device 100, the keys 125 may be contacted by the users hand or hands. A user may perceive the springiness of the keys 125 as being somewhat undesirable. For example, springy keys may interfere with a user's ability to comprehend or sense force that is sufficient to grasp the device 100, which may cause the user to grasp too lightly or to grasp too strongly, which may possibly impact integrity of the keys (e.g., springs, spring-mechanisms, contacts, etc.). Further, if the user repositions her hand or hands, the user may experience the springiness again. In contrast, a surface without such depressible keys may have a more even feel to a user and may be less distracting. An arrangement that allows for such a surface may include a single hinge that allows for swiveling and pivoting a keyboard housing with respect to a display housing such that keys of the keyboard housing can be oriented to face a back side of a display. In such an approach, a user may spin (e.g., swivel) the keyboard housing by 180 degrees about a central axis of the single hinge (e.g., an axis orthogonal to the axis ζ) and then rotate the keyboard housing such that the keys face the back side of the keyboard in a folded orientation. In such an example, a single centrally located hinge provides symmetry such that a computing device can be aligned in a clamshell closed orientation and a tablet orientation, optionally with the keys of the keyboard housing facing the back side of a display of a display housing.

The orientation 109 may be a planar orientation where the angle $\Phi$ is about 180 degrees such that a normal outward vector $N_1$ of the keyboard 124 of the keyboard housing 120 and a normal outward vector $N_2$ of the display 144 of the display housing 140 are oriented in approximately the same pointing directions.

Various computing devices such as laptop or notebook computing devices can be characterized at least in part by a footprint. For example, the device 100 of FIG. 1 may be characterized at least in part by dimensions in x and y as to the keyboard housing 120 and/or as to the display housing 140. As an example, a footprint can be an area that can be defined by a plane in the x and y directions of the Cartesian coordinate systems shown in FIG. 1.

As an example, a desktop computer or a notebook computer may be operatively coupled to a separate display or displays. Such a separate display tends to have a dedicated stand with a base and an arm where the display is adjustable using the arm and/or the base. For example, the display may tilt upwardly or downwardly (e.g., a few degrees to about 20 degrees) and the display may rotate about the base (e.g., clockwise and counterclockwise by a few degrees to about 20 degrees). The limited amount of adjustments tend to take into consideration that a display may be close to a wall (on the backside), a user is seated at a standard desk in a standard chair (e.g., conventional ergonomic heights, etc.), a user has a seated height within a normal distribution such that tilting corresponds to a standard deviation or two of the normal distribution, etc.

As an example, an assembly can include a device and a stand where the device can include a display with digitizer and/or touch technology, for example, for use of a stylus and/or touch (e.g., human finger touch). In such an example, the stand can allow for positioning the display at an angle of approximately 10 degrees to approximately 45 degrees with respect to a surface such as a desktop, a tabletop, a countertop, etc., which may be a horizontal surface that defines an angle of approximately 0 degrees (e.g., where a display would be flat and parallel to the surface). As an examples, such a stand may also allow for positioning of the display at an angle that is greater than approximately 45 degrees, for example, at an angle from approximately 60 degrees to approximately 90 degrees or slightly more where the position is suitable for viewing when a user is seated in a chair before a desk or standing at a standing desk, etc. In such an example, the user's eyes may be at a level that is less than an upper edge of the display and greater than the lower edge of the display. In contrast, for the stylus and/or touch orientation (e.g., approximately 10 degrees to approximately 45 degrees), the user's eyes may be at a level that is greater than the upper edge of the display.

As an example, with respect to articulation range, a stand can provide for moving a single display device, a multi-display device or a continuous display device (e.g., a continuous, flexible display that spans two housings that form a clamshell) from a lower drawing angle back up to a traditional vertical viewing angle. As an example, an assembly can include a rotatable member that allows for rotating a display or displays approximately 180 degrees, for example, from landscape to portrait orientation.

As an example, as to cable management, a stand may include a USB connector (e.g., C type, etc.) and an integrated cable hidden at least in part within a stand (e.g., within a leg, a conduit, etc.). As an example, a connector may be symmetric such that it can operate in one of two orientations (e.g., consider a USB C type connector receptacle (female) and USB C type connector plug (male)). As an example, one or more cables can be used outside of a stand, for example, run through a cable management holder where the cable or cables may be "inboard outboard" keeping a large length of the cable or cables straight and hidden making for a tidy workspace. For fewer cables and a "clearer" overall rear appearance, a stand may include a relatively short cable holder.

As an example, a stand can include a display mounting bar as a member that can be configured to accommodate various types of displays such as, for example, single, dual, various sizes, etc.

As an example, to enhance a work surface experience, a stand display mounting bar can include one or more features for a stylus (e.g., a pen, etc.). As an example, a member may include storage features such as a clip, a socket, a magnet, VELCRO material, etc., to help maintain a stylus in a stored configuration.

As an example, a member can include one or more types of circuitry. For example, consider a sound system where a member can provide audio controls and/or pen performance controls.

As an example, a USB type of connection from a display to a stand can make changing out displays a simple operation.

As an example, an assembly can include a dual display device and a stand where the stand accommodates the dual display device with an "even water line" for ergonomic viewing (e.g., the two displays being horizontally level).

As an example, a stand can include an integrated power and date cable, which may be at least in part hidden (e.g., inside a leg, etc.).

As an example, an assembly can include a component such as a thin client component, a high performance computing component, a gaming component, etc. As an example, a component such as a thin client component may be seamlessly integrated in one or more legs of a stand or another member of a stand.

As an example, an assembly can include a thin profile PC that can be mounted on a backside of a display, for example, via one or more of magnets, clips, sockets, etc., optionally connected with pogo pins. As an example, a PC component may be integrated within a display housing, which may provide for an overall "clean" design.

As an example, a device supported by a stand may be folded up to clean-up a workspace, for example, from a drawing mode to provide additional "clean" work surface for none computer tasks, etc.

As an example, a stand can be a tripod or easel type of stand, which may include circuitry that can be operatively coupled to a device (e.g., a display, a keyboard, a notebook, a thin client, a HPC unit, a gaming unit, etc.).

As an example, a stand can include a platform, which may be a bridge that bridges at least two legs of the stand. For example, consider a bridge being defined by a cross-member that provides an area for charging a phone, standing up a phone, etc. As an example, consider a bridge that includes charging circuitry for charging a device such as a stylus, a mouse, etc. As an example, a bridge can include divided trays (e.g., for organization of items, etc.).

As an example, in a lower display and upper display orientation, a lower display may be foldable upwardly to a closed clamshell orientation (e.g., for a "cleaner" desk surface). As an example, a stand may include one or more features for storing a keyboard vertically (e.g., for clearing a work surface).

As an example, an assembly can include a device and a stand where the stand can be supported on a floor as a support surface. In such an example, a device can include an integrated computer or an add-on computer (e.g., add-on computing unit) and/or a stand can include an integrated computer or an add-on computer.

As an example, a stand may include more than three legs. As an example, a stand can be of an easel or frame type that provides features that acts as a technology "bridge" if you will between a display and one or more other types of devices. As an example, a stand can allow for customization of an assembly. For example, consider one or more integrated connectors that can provide for wired and/or wireless connections to one or more items.

Figure 2:
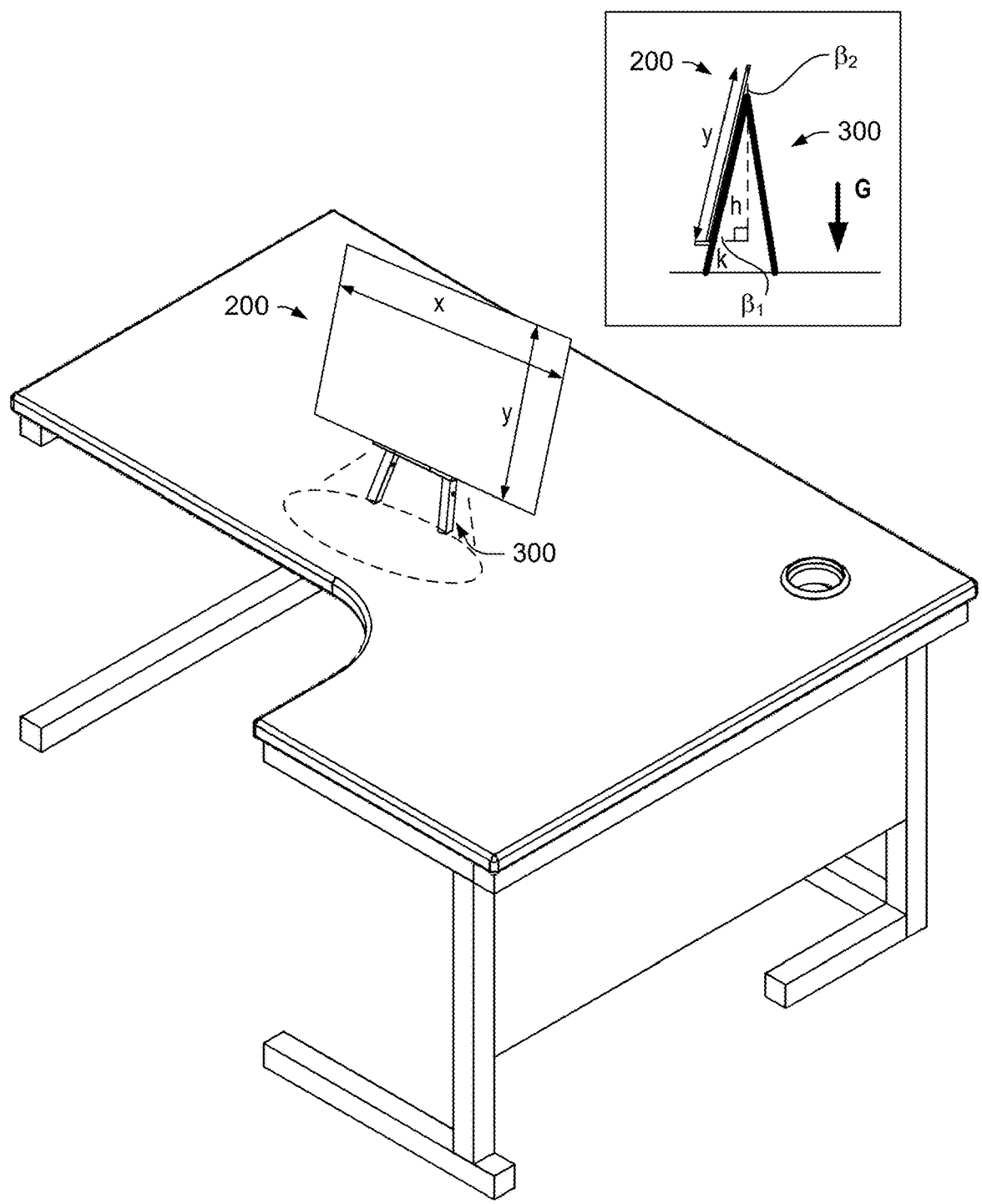
FIG. 2 is a view of an example of a device and an example of a stand.

FIG. 2 shows an example of a device 200 and an example of a stand 300, which can form an assembly. As shown in FIG. 2, the assembly is positioned on a desktop of a desk. The assembly can provide for a relatively clean, clutter-free workspace. As mentioned, an assembly can include circuitry. For example, a stand can include circuitry, which may be standalone circuitry and/or circuitry that can be operatively coupled to other circuitry. As an example, circuitry can be illumination circuitry such as, for example, one or more LEDs that are power to illuminate a portion of the workspace, as illustrated by the dashed lines. In such an example, a user may position a document, an item, a keyboard, etc., in an illuminated space to improve legibility thereof. In FIG. 2, the illumination circuitry is provided as an example; noting that various other examples of circuitry are described with respect to various other examples of assemblies.

Figure 3:
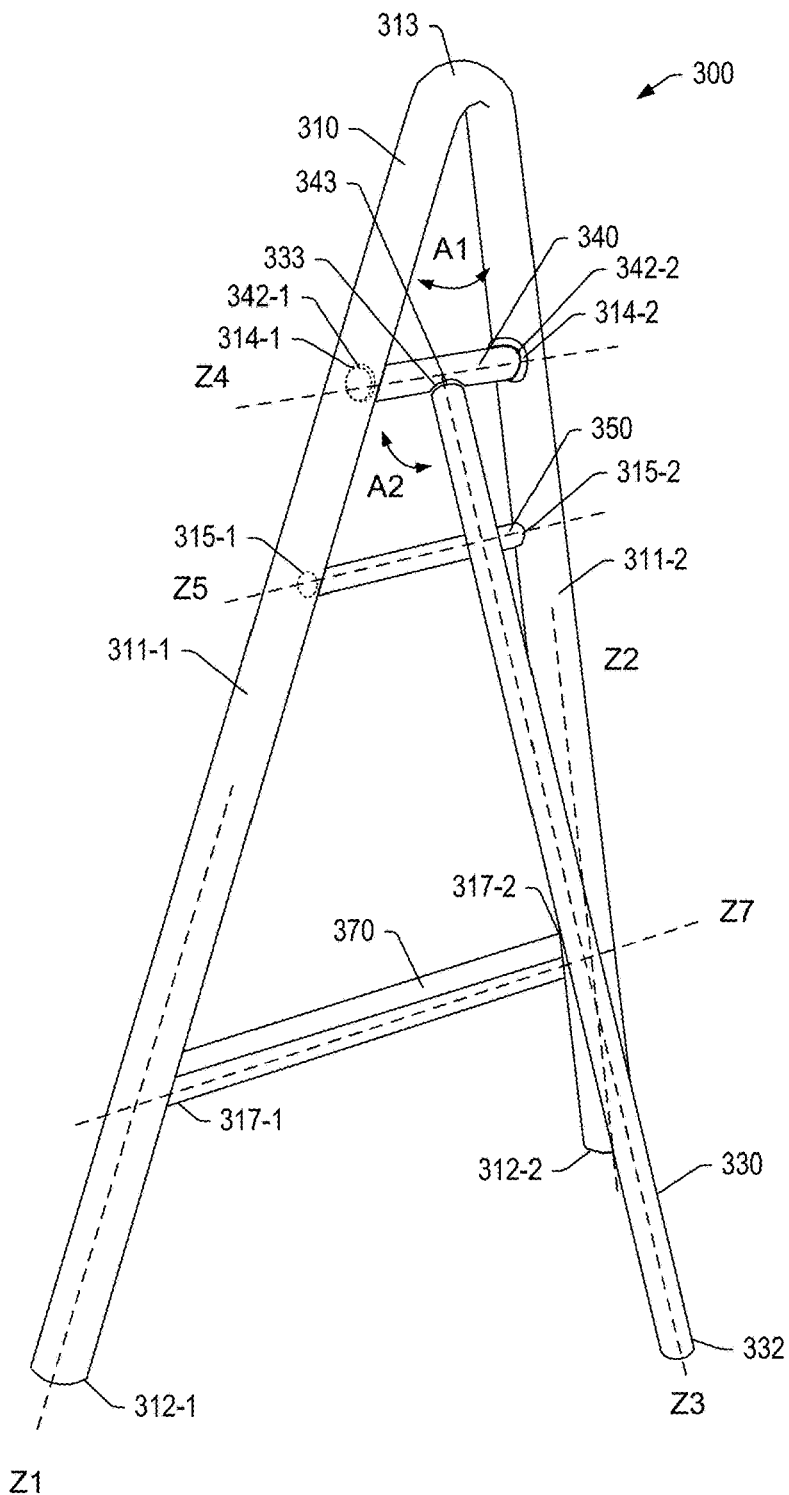
FIG. 3 is a diagram of the example of the stand of FIG. 2.
Figure 5:
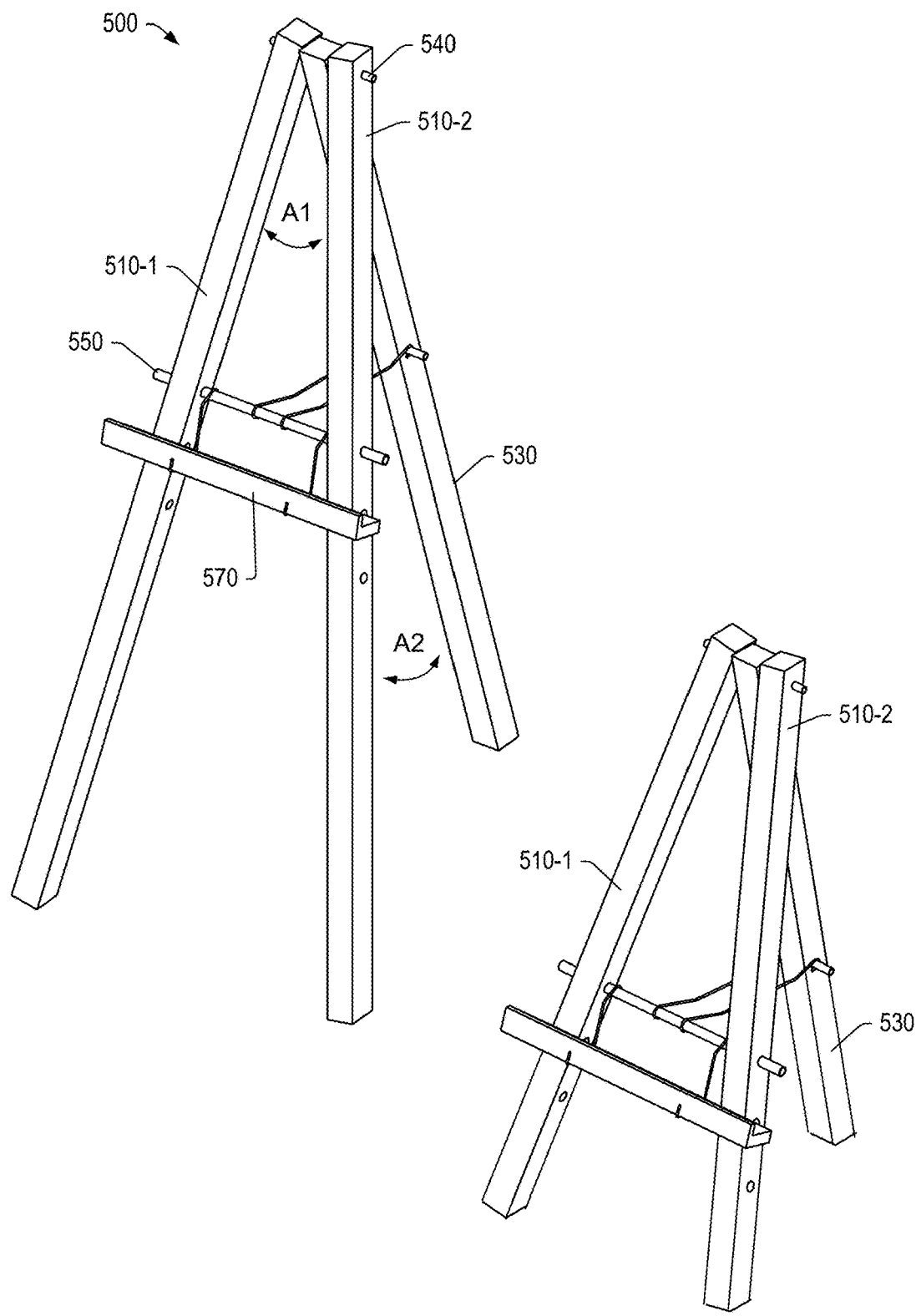
FIG. 5 is a diagram of an example of an adjustable stand in two configurations.

In the example of FIG. 2, the device 200 is a display device that includes a display, which may span at least 80 percent of the x and y dimensions of the device 200 and as great as approximately 100 percent of the x and y dimensions. As shown, the x dimension is substantially parallel to the desktop of the desk while the y dimension extends away from the desktop of the desk at an angle that, in a vector diagram, has a component that is normal to the desktop of the desk. In an inset diagram, the y dimension is shown as having vector components k and h where the component h is aligned with gravity, G. As shown, the component k is parallel to the desktop of the desk. As shown, y, k and h define a triangle that includes a 90 degree angle such that a sum of angles $\beta_1$ and $\beta_2$ is 90 degrees, where the sum of all three internal angles of the triangle is 180 degrees. As shown, the angle $\beta_1$ is approximately 77 degrees while the angle $\beta_2$ is approximately 13 degrees. In the example of FIG. 2, the stand 300 can be positioned on the desktop of the desk where front legs define a plane where a plane of the device 200 is substantially parallel to the plane defined by the front legs of the stand 300 and where the angle $\beta_1$ and hence $\beta_2$ are defined substantially by an angle between the front legs and a back leg of the stand (e.g., a rear leg of the stand), which may be approximately twice $\beta_2$ (e.g., where the front legs and the back leg define an isosceles triangle). In FIG. 3 and FIG. 5, an angle A2 is defined with respect to the stand 300 and a stand 500.

In the example of FIG. 2, the device 200 is rectangular with the x dimension being greater than the y dimension such that an aspect ratio may be defined as being different than unity where the x dimension is substantially horizontal (e.g., x dimension as a horizontal dimension). If the device 200 was rotated by 90 degrees and supported by the stand 300 on the desktop of the desk, the y dimension would be substantially horizontal (e.g., y as the horizontal dimension). As an example, a display of a device can be defined by an aspect ratio such as x:y. For example, consider an aspect ratio of 16:9 where a display is 32 cm wide and 18 cm high. In FIG. 2, the device 200 is oriented such that the x dimension is the width and the y dimension is the height, which may be referred to as an "upright" dimension (e.g., optionally at an angle such that it is not truly vertical). Again, for a rotation of 90 degrees, the device 200, if having the aforementioned dimensions, would have an aspect ratio that would be 9:16 (e.g., y:x), with respect to how a user seated before the desk and the device 200 (e.g., or standing in front of the desk and the device 200) as supported by the stand 300 would view an image rendered to a display of the device 200. As an example, an aspect ratio can be defined by a horizontal dimension and an upright dimension (e.g., "horizontal dimension":"upright dimension").

FIG. 3 shows an example of the stand 300 of FIG. 2. In the example of FIG. 3, the stand 300 includes various members, which may include one or more unitary members and/or one or more multi-piece members. As shown, a member 310 includes legs 311-1 and 311-2 defined by an apex 313 (e.g., a bend, a top end, top ends, etc.) where each of the legs 311-1 and 311-2 includes a respective foot 312-1 and 312-2. In the example of FIG. 3, each of the legs 311-1 and 311-2 can be defined by a respective axis Z1 and Z2 that can define a spread angle A1 with respect to the apex 313. For example, consider a spread angle in a range from approximately 5 degrees to approximately 175 degrees. In the example of FIG. 3, the spread angle A1, which may be fixed or adjustable, is at approximately 20 degrees.

As shown, a member 330 includes a foot 332 and an opposing end 333 that defined an axis Z3 where the end 333 is operatively coupled to a member 340, for example, via a joint feature 343, which may be a socket, a stub, etc., that joins the end 333 to the member 340. As shown, the legs 311-1 and 311-2 include joint features 314-1 and 314-2 (e.g., sockets, stubs, grommets, etc.) such that the member 340 is operatively coupled to the member 310. For example, the joint features 314-1 and 314-2 can be openings with gaskets, washers, etc., that can receive ends 342-1 and 342-2 of the member 340 where the member 340 is rotatable about its axis Z4.

As an example, the member 340 can be rotatable with some amount of resistance (e.g., friction) such that a support angle A2 can be maintained with reduced risk of the foot 332 sliding on a surface (e.g., a desktop, a tabletop, a countertop, etc.). As an example, the member 330 and the member 340 may form a T-hinge with respect to the member 310. For example, the member 340 can define a horizontal portion of a T-shape and the member 330 can define a vertical portion of a T-shape.

As an example, one or more of the feet 312-1, 312-2 and 332 may be formed of a material that increases friction with respect to a surface. For example, consider a foot that is formed of a rubber (e.g., natural, synthetic, etc.). As an example, a foot may include a foot that is a separate component that is operatively coupled to the member 310 or the member 330. For example, consider the member 310 or the member 330 being a hollow cylinder where a foot can include an extension that is received within the hollow cylinder (e.g., via an interference fit, a spring fit, a screw fit, etc.).

In the example of FIG. 3, the stand 300 includes one or more cross-members 350 and 370, noting that the member 340 may be referred to as a cross-member. The cross-member 350 may be optional and may provide for support, for example, as a bridge support member that bridges the two legs 312-1 and 312-2. As shown, the member 350 can be received via joint features 315-1 and 315-2 of the member 310 (e.g., sockets, stubs, grommets, etc.). As shown, the member 350 can include an axis Z5. As to the member 370, it includes an axis Z7 and it can be received via joint features 317-1 and 317-2 of the member 310 (e.g., sockets, stubs, grommets, etc.). The member 350 may be optional, for example, depending on one or more features of a device that is to be mounted to the stand 300. For example, consider the member 350 including one or more features that cooperate with one or more features of a device such that the device can be supported by the stand 300 and/or consider the member 370 as including one or more features that cooperate with one or more features of a device such that the device can be supported by the stand 300. As an example, consider the member 370 as being a ledge that can cooperate with an edge of a device such that the edge contacts the ledge and via force of gravity sits on the ledge. As an example, the member 370 can be an adjustable coupling that is adjustable to support a device in at least two different orientations.

As an example, the stand 300 may be referred to as a tripod stand or an easel stand. As an example, one or more members of the stand 300 may be telescoping. For example, one or more of the members 310 and 330 may include telescoping components such that a length may be adjustable.

As an example, one or more of the members of the stand 300 can include one or more electrical couplings that can electrically couple to one or more corresponding electrical couplings of a device, a cable, etc. For example, consider the member 370 including a power coupling and a device including a power coupling where the two power couplings can mate such that power can be transmitted in one or more directions.

As an example, the stand 300 can include one or more lights (e.g., LEDs, etc.) that can be operable when coupled to a device. For example, consider the legs 312-1 and 312-2 as including LEDs that can direct light in front of a plane defined by the legs 312-1 and 312-2 such that a workspace area may be illuminated while a device is supported by the stand 300. As an example, the cross-member 370 may include one or more lights (e.g., LEDs, etc.) that can direct light in front of a plane defined by the legs 312-1 and 312-2 such that a workspace area may be illuminated while a device is supported by the stand 300. As to such lighting examples, consider the configuration of FIG. 2 where light may be directed in a workspace area.

As an example, a stand such as the stand 300 of FIG. 3 can include circuitry, which may include one or more wires, one or more cables, one or more conductors, one or more power storage components (e.g., batteries, capacitors, etc.). As an example, circuitry of a stand may be operatively coupled to a device via wire and/or wirelessly. As an example, circuitry of a stand may provide for enhancement of a workspace, where such circuitry may be powered by a device, a power storage component, a power cord, etc. In various examples, a stand can be functional in that it may include one or more functions in addition to being a stand for a device. In various examples, a stand can be stored and carried along with a device. In various examples, a stand is collapsible for carrying with a device, optionally where one or more features of the device provide for coupling the stand and the device in a storage mode of the stand. For example, consider a collapsible stand that can be collapsed and assembled into a rod shape where a device includes features that allow for coupling the rod shaped, collapsed stand assembly to the device. Such an example may be implemented via one or more clips, one or more sockets, one or more magnets, etc.

Figure 4:
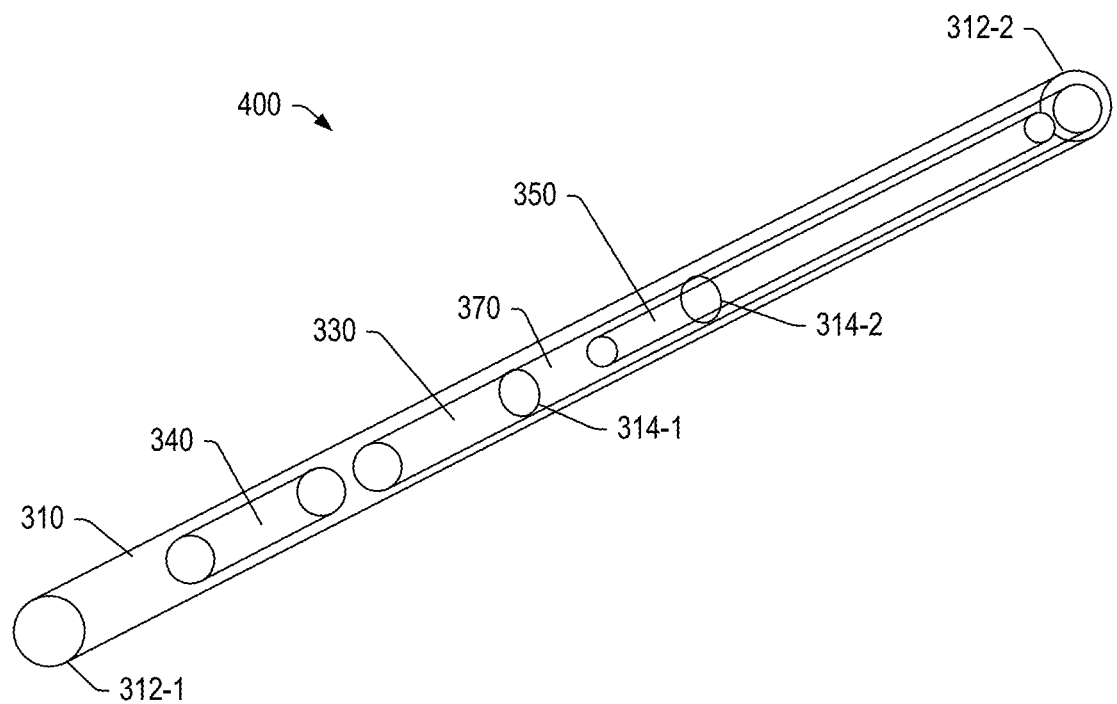
FIG. 4 is a diagram of an example of a collapsible stand.

FIG. 4 shows an example of a collapsed stand assembly 400, with reference to members of FIG. 3. As shown, the member 310 is hollow such that it can receive the members 330, 340, 350 and 370, noting that one or more of the members may be optional. As an example, the axes Z1, Z2, Z3, Z4, Z5 and Z7 may be substantially aligned in the collapsed stand assembly 400.

In the example of FIG. 4, the member 310 is bendable and may be made of a resilient material. For example, consider a rubber material that includes the openings 314-1 and 314-2 that can be oriented to face each other such that they can receive the member 340, which can then receive the member 330. As an example, the openings may be resilient to receive ends 342-1 and 342-2 of the member 340 snugly (e.g., via an interference fit) and to provide a certain amount of resistance (e.g., friction).

As an example, the collapsed stand assembly 400 may be received in a socket of a device, clipped to an end or a side of a device, placed in a case with a device (e.g., where the case may include a pocket, a sleeve, etc., for the collapsed stand assembly 400), etc. As an example, where one or more components of the collapsed stand assembly 400 are made of or include magnetic material, the collapsed stand assembly 400 may be coupled to a device, etc., via magnetic attraction force.

FIG. 3 and FIG. 4 show some examples of a stand; noting that a stand may be configured with more or with fewer components, which may be shaped differently, coupled differently, etc.

FIG. 5 shows an example of a stand 500 that includes members 510-1, 510-2, 530, 540, 550, and 570. As shown, the member 540 is an axle that joins the member 530 between the members 510-1 and 510-2. As shown, the member 570 can be a ledge that can support a device. In the example of FIG. 5, the member 550 can be a support member that may optionally be utilized to support the member 570 and/or to define the angle A2 between plane defined by the members 510-1 and 510-2 and the member 530 as coupled about the member 540 serving as an axle. FIG. 5 shows the stand 500 in two different configurations where the stand 500 may include telescoping members that allow for adjustment, for example, adjustment of a distance between ends of the members 510-1 and 510-2 and the member 570 and an overall length of the member 530. As an example, the member 570 can be an adjustable coupling that is adjustable to support a device in at least two different orientations.

Figure 6:
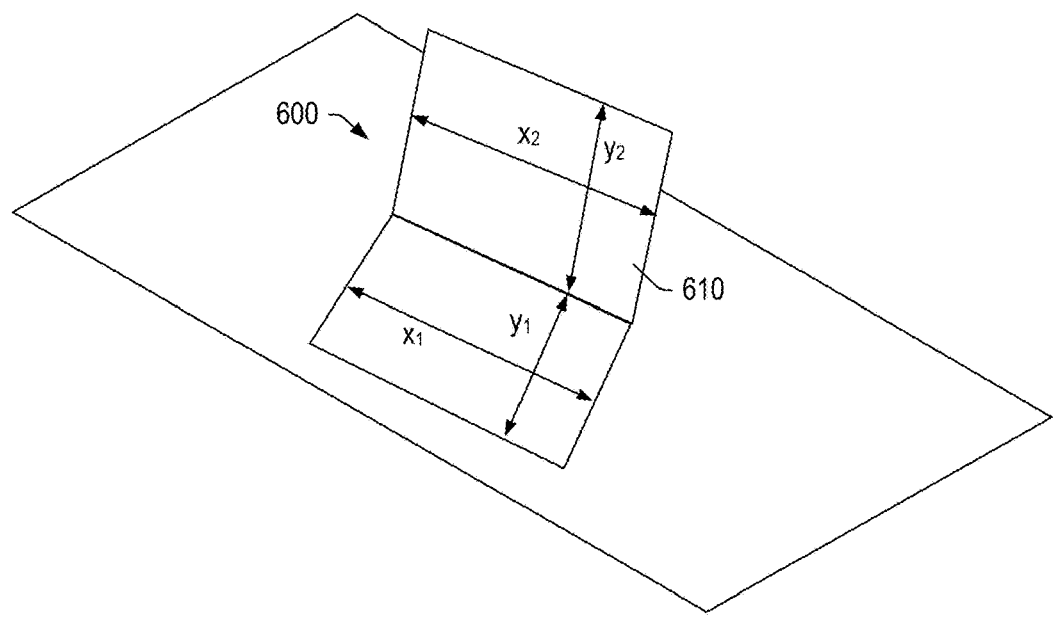
FIG. 6 is a series of views of an example of an assembly.
Figure 6:
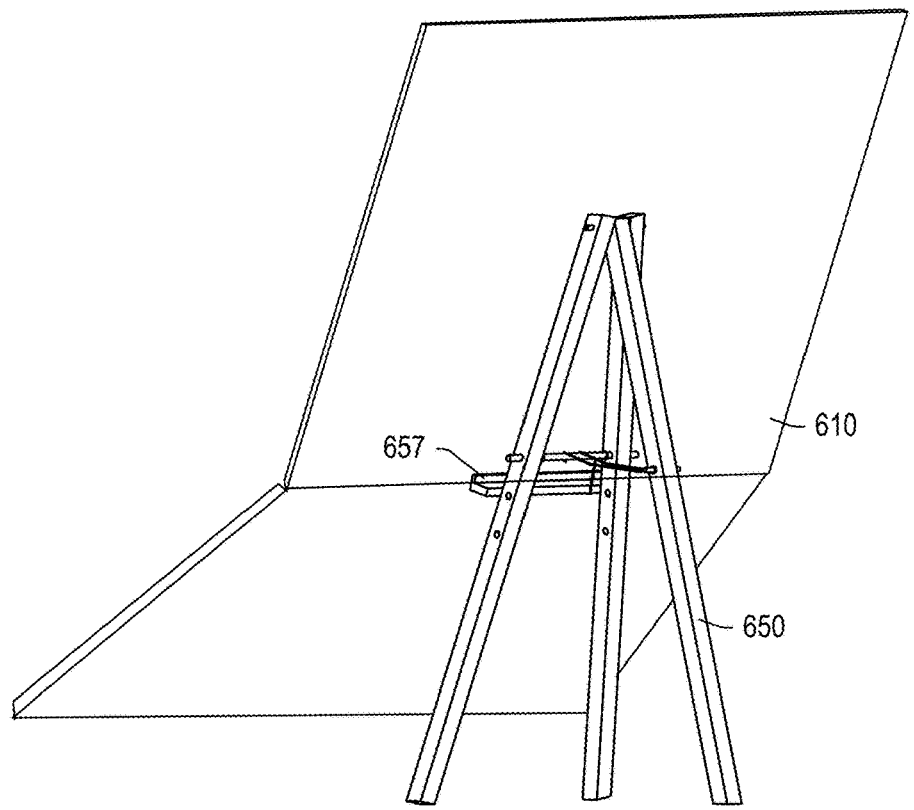

FIG. 6 shows an example of an assembly 600 that includes a device 610 that is supported by a stand 650. In the example of FIG. 6, a cross-member 657 of the stand 650 is in contact with the device 610. For example, consider the device 610 being a clamshell device that can be in an open clamshell orientation or a closed clamshell orientation. As shown, the device 610 is in an open clamshell orientation with an opening angle of approximately 150 degrees where an edge can contact the cross-member 657 to support the device. In the example of FIG. 6, the device 610 may be a multi-display device, a continuous display device, a single display device, a display and keyboard device, etc. As an example, the cross-member 657 can be an adjustable coupling that is adjustable to support a device (e.g., the device 610) in at least two different orientations.

As shown in the example of FIG. 6, the device 610 can be defined by various dimensions such as $x_1$, $x_2$, $y_1$ and $y_2$ where a display of the upper portion may be defined as having an aspect ratio of $x_2$:$y_2$ where $x_2$ is greater than $y_2$ and where a display of the lower portion may be defined as having an aspect ratio of $x_1$:$y_1$ where $x_1$ is greater than $y_1$.

Figure 7:
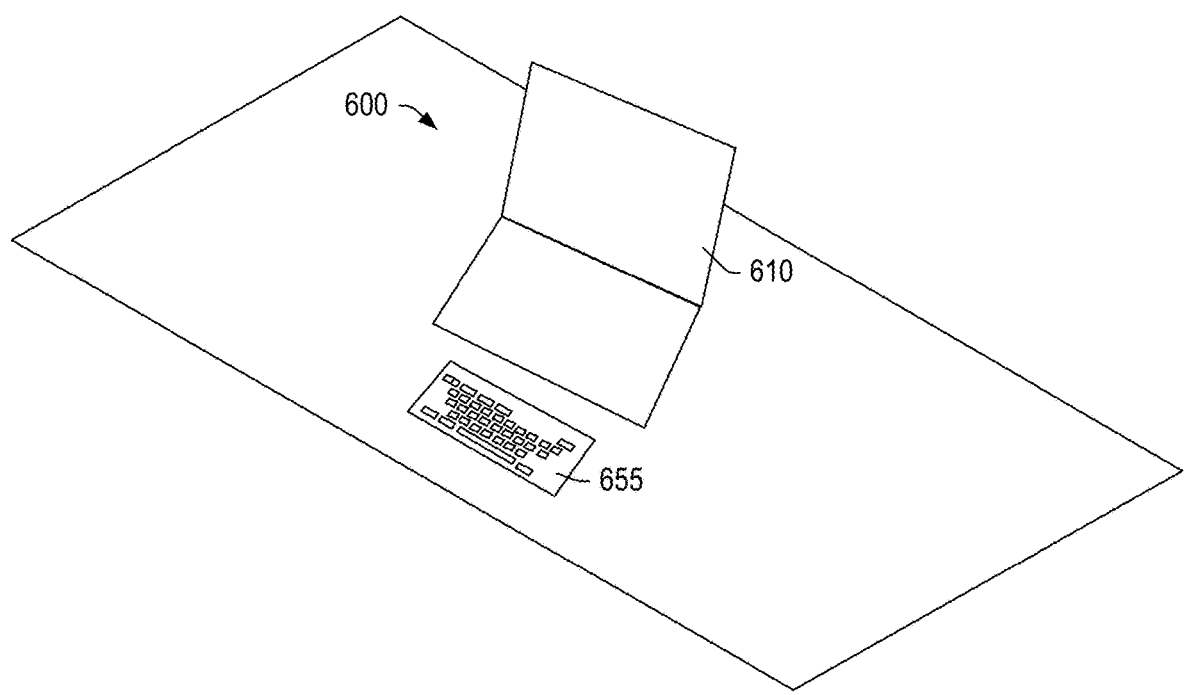
FIG. 7 is a view of an example of an assembly that includes a keyboard.

FIG. 7 shows an example of the assembly 600 that further includes a keyboard 655. In the example of FIG. 7, the device 610 can include a continuous display surface, multiple display surfaces, etc., such that a user can visual information using the device 610 while, for example, entering commands, letters, etc., using the keyboard 655. In the example of FIG. 7, where the device 610 includes a continuous display surface, it may be defined by an aspect ratio of $x_1$:$(y_1+y_2)$ or $x_2$:$(y_1+y_2)$ (see, e.g., FIG. 6) as the x dimension (e.g., x coordinate or x-axis) is substantially horizontal (e.g., parallel to a surface that supports the stand 650).

Figure 8:
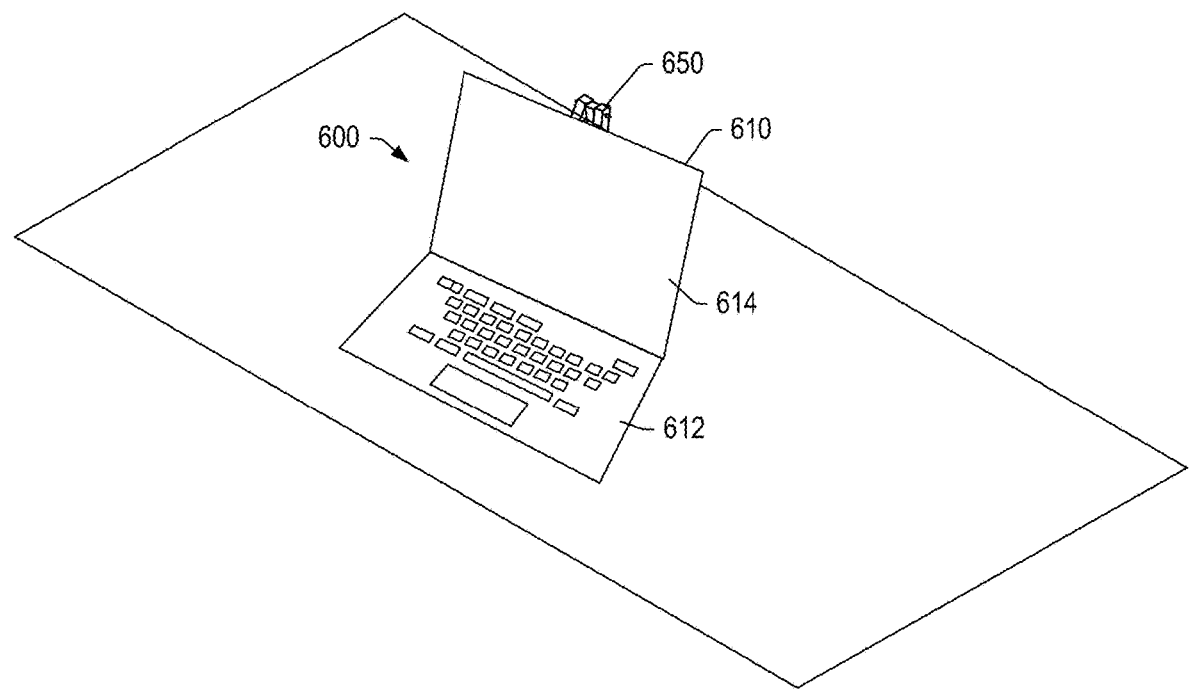
FIG. 8 is a series of views of an example of an assembly.
Figure 8:
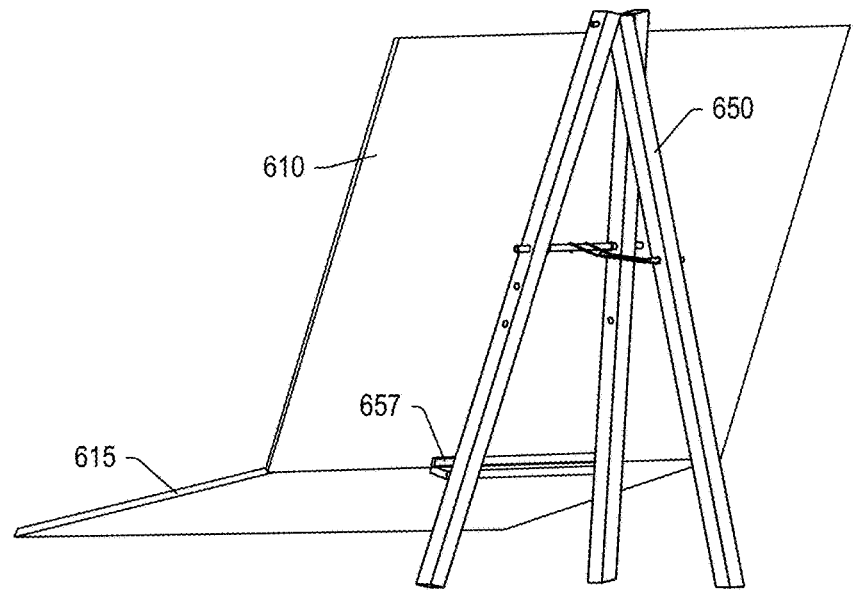

FIG. 8 shows an example of the assembly 600 where the device 610 includes a keyboard portion 612 and a display portion 614. In the example of FIG. 8, the cross-member 657 is positioned closer to the front feet of the stand 650 and the angle of the clamshell device 610 in the illustrated open orientation is approximately 110 degrees. In such an example, a user may visualize information using the display portion 614 and type using the keyboard portion 612. As shown, the assembly 600 can be positioned on a surface (e.g., a desktop, a tabletop, a countertop, etc.) where the device 610 is supported in part by the keyboard portion 612 contacting the surface and by the three feet of the stand 650 contacting the surface.

Figure 9:
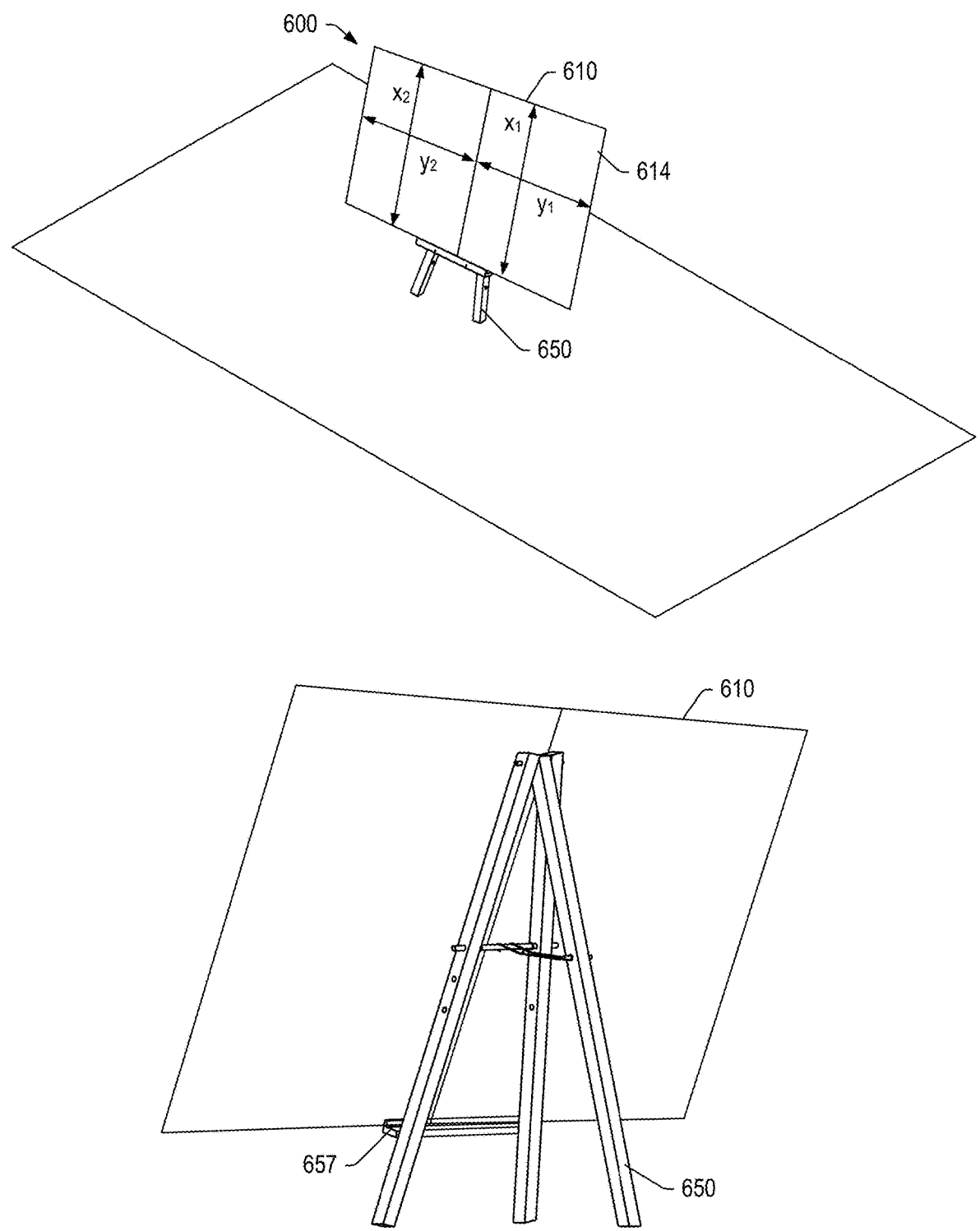
FIG. 9 is a series of views of an example of an assembly.

FIG. 9 shows an example of the assembly 600 where the device 610 includes a display portion 614, which may be a continuous display that is optionally flexible such that two portions of the device 610 can be in a closed orientation (e.g., approximately 0 degrees or, for example, less than 0 degrees where a radius of curvature exists in a flexible display) or an open orientation as shown (e.g., approximately 180 degrees open). In the example of FIG. 9, the cross-member 657 is positioned such that the device 610 is not in contact with a surface and such that the device 610 is supported by the stand 650 on a surface (e.g., a desktop, a tabletop, a countertop, etc.).

In the example of FIG. 9, where the device 610 includes a continuous display surface, it may be defined by an aspect ratio of $(y_1+y_2)$:$x_1$ or $(y_1+y_2)$:$x_2$ (see, e.g., FIG. 6) as the y dimension (e.g., y coordinate or y-axis) is substantially horizontal (e.g., parallel to a surface that supports the stand 650).

Figure 10:
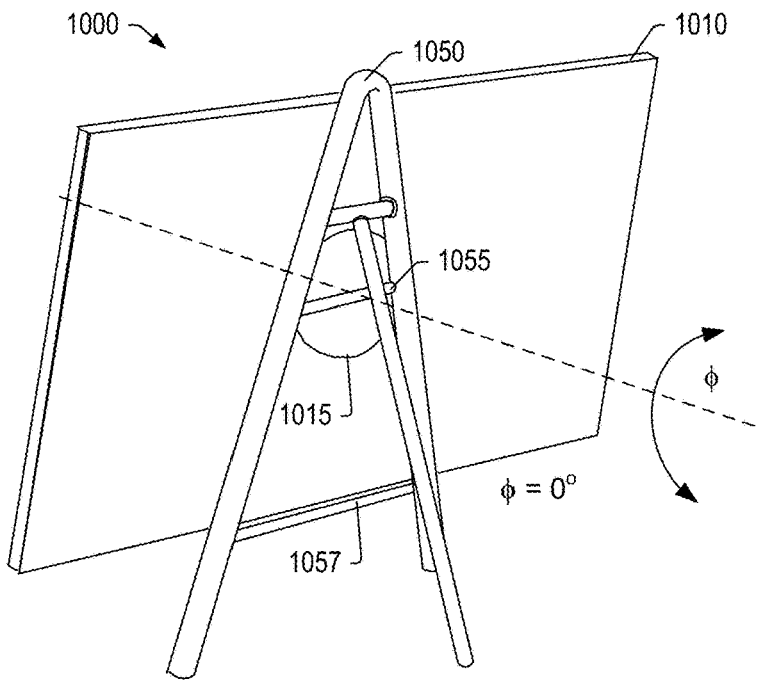
FIG. 10 is a series of views of an example of an assembly.
Figure 10:
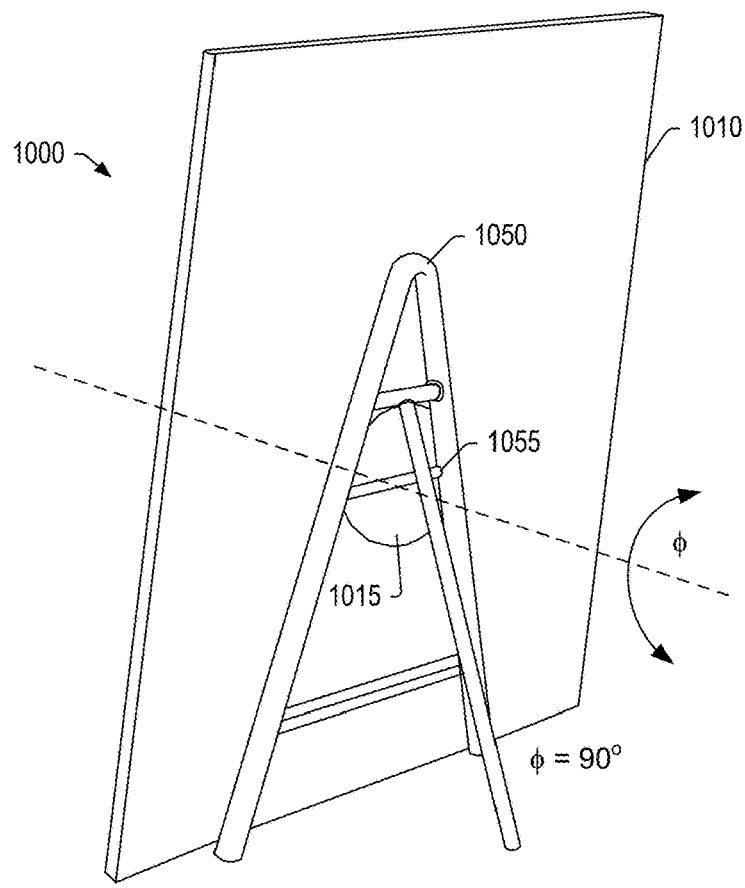

FIG. 10 shows an example of an assembly 1000 that includes a device 1010 and a stand 1050, which may include one or more features of the stand 300 of FIG. 3. As shown, the device 1010 can be rotated and supported by the stand 1050 on a surface (e.g., a desktop, a tabletop, a countertop, etc.). In the example of FIG. 10, a component 1015 is operatively coupled to the member 1055 of the stand 1050 where the component 1015 may be part of the device 1010, part of the stand 1050 or a separate component. As an example, the component 1015 can be a turntable (e.g., lazy susan, etc.) that allows for rotation of the device 1010 about the axis illustrated in the views of FIG. 10. As an example, the component 1015 may be a suction cup, a magnetic component, an adhesive component, etc., that can attach to the device 1010 and rotate about the axis with support from the member 1055, which may include an axle that is operatively coupled to the component 1015. As an example, the component 1015 can be an adjustable coupling that is adjustable to support a device in at least two different orientations.

In the example of FIG. 10, the aspect ratio of a display surface of the device 1010 is greater in the orientation with angle φ=0 degrees and less in the orientation with angle φ=90 degrees where aspect ratio is defined as "horizontal dimension":"upright dimension" where the "upright" dimension can have a vector component that is aligned with gravity, where the "upright" dimension can be orthogonal to the horizontal dimension, etc.

In FIG. 10, the upper orientation can be a landscape orientation while the lower orientation can be a portrait orientation. As shown, an orientation can be defined according to an angle φ, which, for example, in the landscape orientation may be 0 degrees or 180 degrees and in the portrait orientation may be 90 degrees or 270 degrees. As an example, the component 1015 may support the device 1010 and/or a member of the stand 1050 may support the device 1010. For example, in the landscape (e.g., horizontal) orientation, a member 1057 may support at least a portion of the weight of the device 1010. In the portrait (e.g., vertical) orientation, the member 1057 may optionally be utilized by repositioning of the member 1057 where the member 1057 is positionable. As an example, in the portrait orientation, a lower edge of the device 1010 may contact a surface for support (e.g., a desktop, a tabletop, a countertop, etc.). As an example, the device 1010 may be supported by the component 1015 in the portrait orientation.

Figure 11:
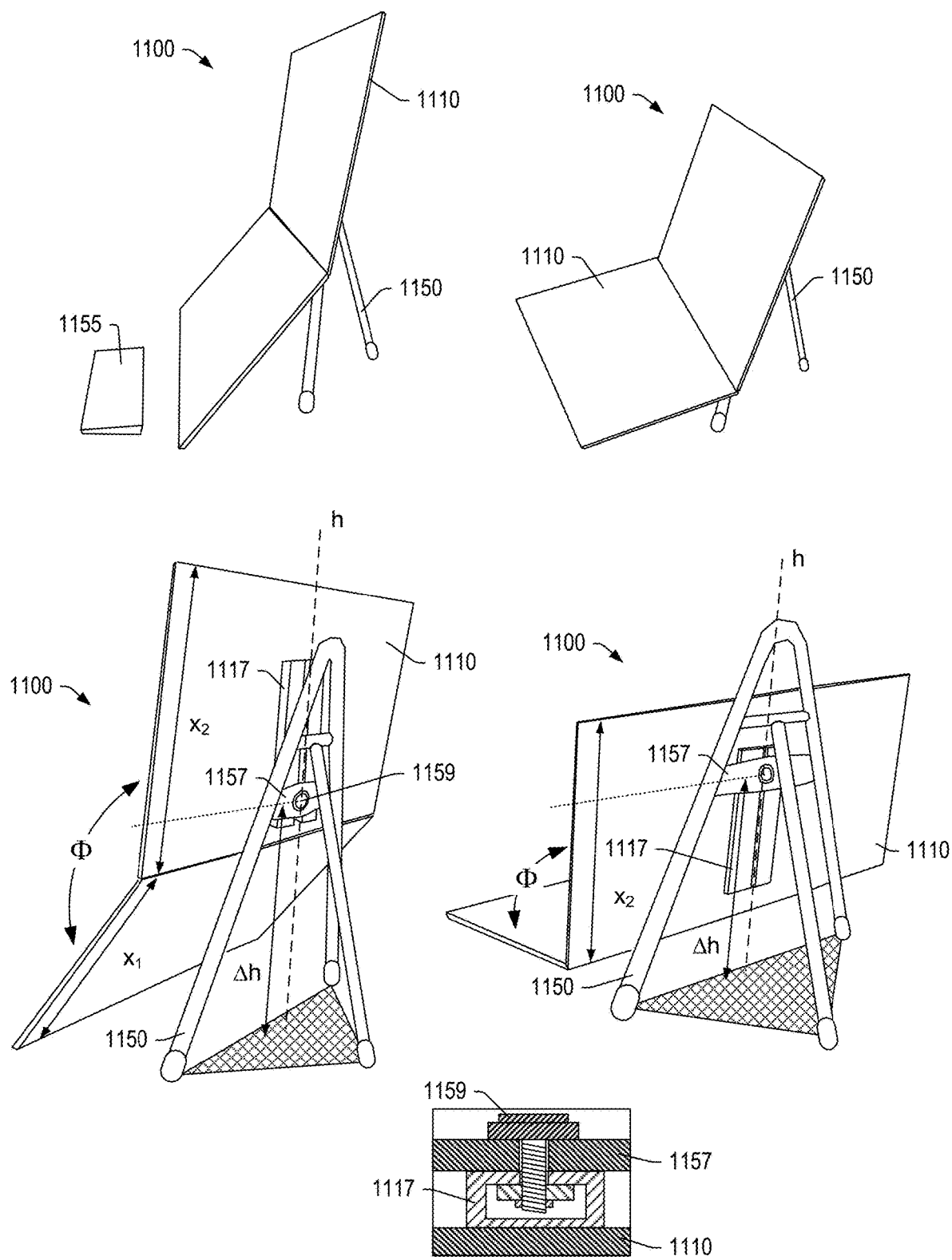
FIG. 11 is a series of views of an example of an assembly.

FIG. 11 shows an example of an assembly 1100 that includes a device 1110 and a stand 1150, which may include one or more features of the stand 300 of FIG. 3. As shown, the device 1110 can include at least one display and may optionally be utilized with a keyboard 1155, which may be a wired and/or a wireless keyboard. As an example, the device 1110 can be a clamshell type of device such as, for example, having two portions that can fold and open akin to the device 100 of FIG. 1.

In FIG. 11, two example orientations are shown where the angle Φ differs between two portions of the device 1110 in a manner that, with respect to the stand 1150, is adjustable via a channel member 1117 and a member 1157 that is operatively coupled to front legs of the stand 1150. As shown, the device 1110 can pivot about an axis such as a hinge axis where the two portions defined the angle Φ. In one of the orientations, the angle Φ is approximately 150 degrees; whereas, in the other one of the orientations, the angle is approximately 90 degrees.

As shown in FIG. 11, the member 1157 can include a locking component 1159 that can cause the channel member 1117 and the member 1157 to be fixed in a desired orientation of the device 1110. For example, the channel member 1117 can include a cross-sectional profile that defines a channel where the locking component 1159 can include a bolt portion and a nut portion with matching threads where rotation of the bolt portion causes a contact portion to contact and apply pressure to a surface or surfaces of the channel member 1117. In such an example, the locking component 1159 can clamp the channel member 1117 to the member 1157. Where the channel member 1117 is fixed to the device 1110, the member 1157 can then support the device 1110 in a desired orientation. As an example, a user may rotate the locking component 1159 to release a clamping force between the channel member 1117 and the member 1157, reorient the device 1110 and rotate the locking component 1159 in an opposite direction to apply a clamping force between the channel member 1117 and the member 1157. As an example, the member 1157 can be an adjustable coupling that is adjustable to support a device (e.g., the device 1110) in at least two different orientations.

As shown in FIG. 11, the channel member 1117 in combination with the member 1157 and the locking component 1159 can be utilized to adjust and fix a spatial relationship between the portion of the device 1110 having the dimension $x_2$ and a height $\Delta h$, which can be measured as a distance between a support surface (e.g., a desktop, a tabletop, a countertop, etc., where a triangle may be formed by feet of legs of the stand 1150) and the locking component 1159.

In the example of FIG. 11, the channel member 1117 can be defined by an axial channel length, for example, along an axis h measured between opposing axial ends of the channel member 1117. In the orientation of the left hand side of FIG. 11, the locking component 1159 is positioned proximate to a lower axial end of the channel member 1117 and, in the orientation of the right hand side of FIG. 11, the locking component 1159 is positioned proximate to a higher axial end of the channel member 1117. In such examples, $\Delta h$ may remain the same while the relationship (e.g., overlap) between the dimension $x_2$ and $\Delta h$ changes. For example, a difference between the orientations may be with respect to a distance of a hinge assembly to the support surface where the angle Φ decreases as that distance decreases and where the angle Φ increases as that distance increases.

Figure 12:
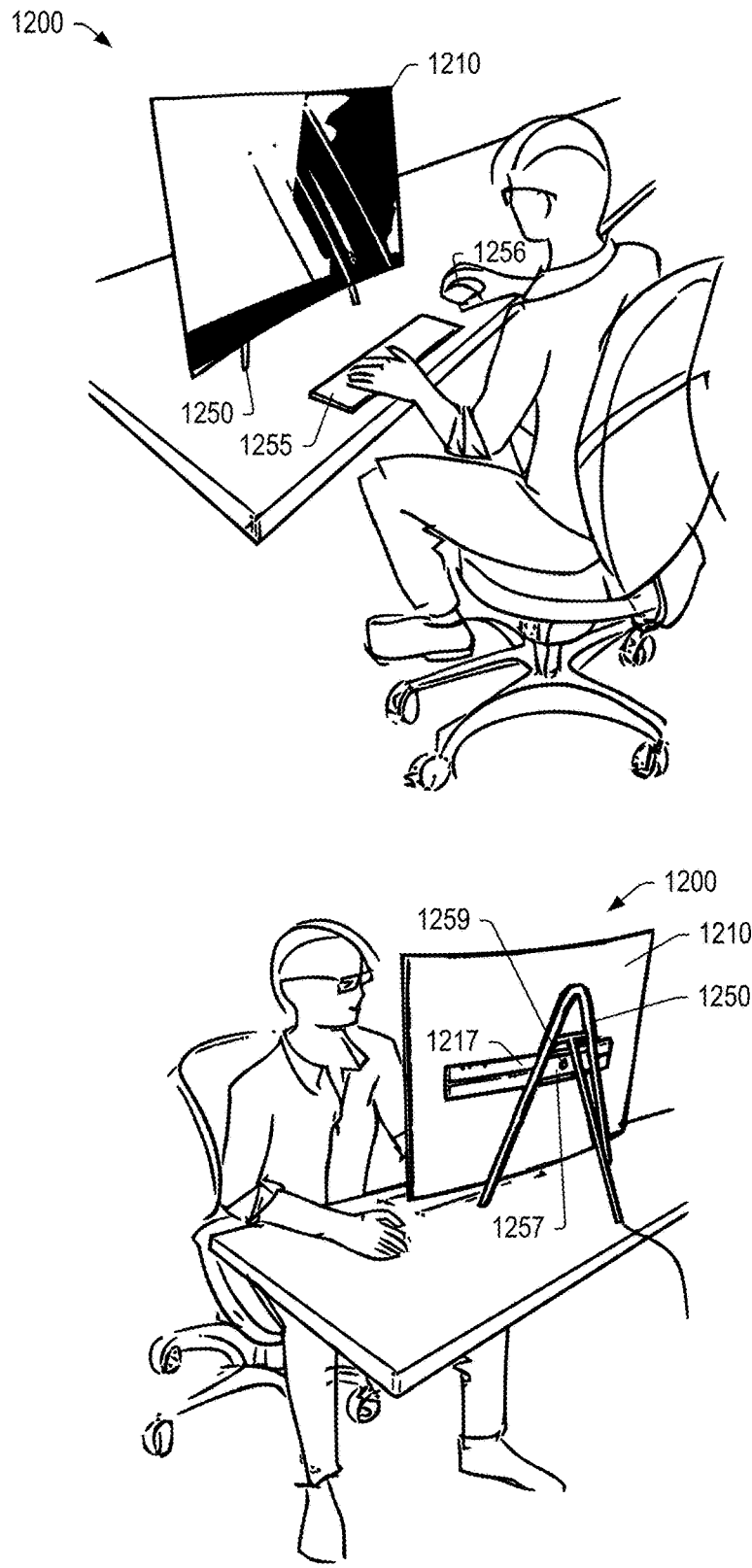
FIG. 12 is a series of views of an example of an assembly.

FIG. 12 shows an example of an assembly 1200 that includes a device 1210 and a stand 1250, which may include one or more features of the stand 300 of FIG. 3. As shown, the device 1210 can include a display and may optionally be utilized with a separate keyboard 1255, which may be a wired and/or a wireless keyboard. As an example, the device 1210 can be planar, bendable, foldable, curvable, etc. For example, consider the device 1210 as including a display that can be defined in part by a radius of curvature (e.g., consider a curved display).

In the example of FIG. 12, the device 1210 is shown as including a channel member 1217 that is oriented substantially horizontally (e.g., parallel to a support surface) and the stand is shown as including a member 1257. In such an example, a user may adjust the device 1210 using the channel member 1217 as supported by the member 1257 (e.g., via a locking component, etc.). As an example, the member 1257 can be an adjustable coupling that is adjustable to support a device in at least two different orientations.

In the example of FIG. 12, the aspect ratio of a display of the device 1210 is greater than unity as the horizontal dimension is greater than the upright dimension (e.g., 16:9, etc.). As an example, a horizontal dimension of a curved display may be measured along a curve of the curved display.

Figure 13:
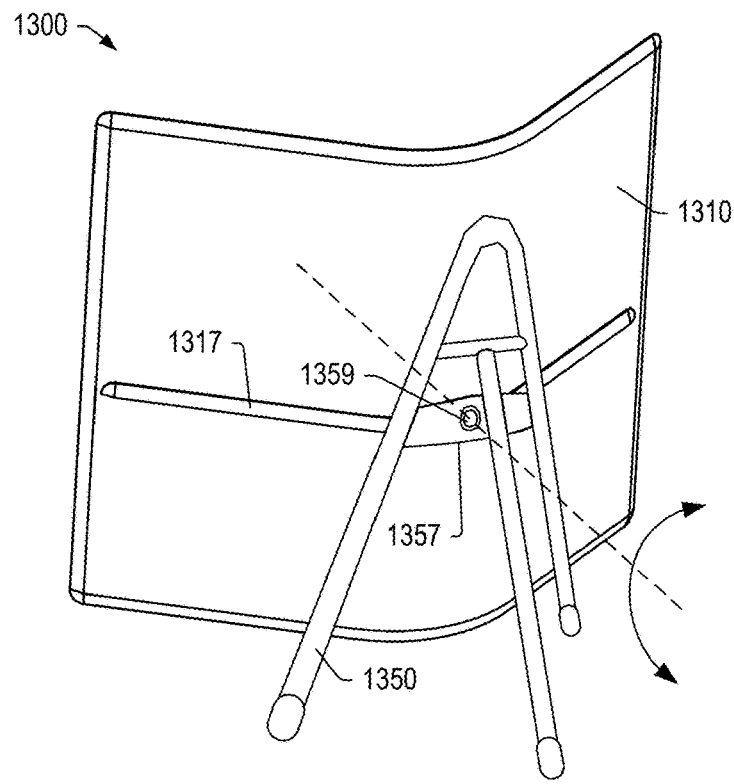
FIG. 13 is a series of views of an example of an assembly.
Figure 13:
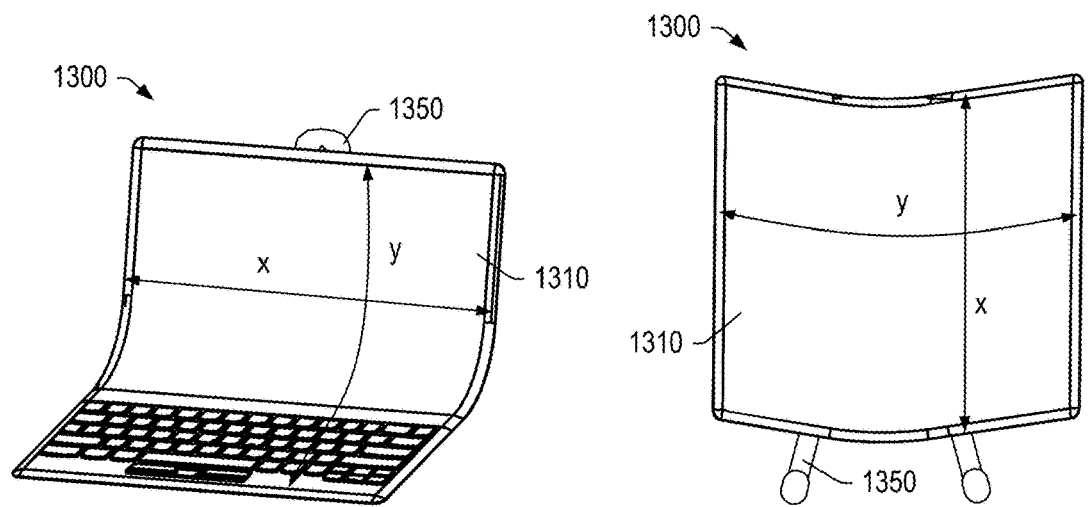

FIG. 13 shows an example of an assembly 1300 that includes a device 1310 and a stand 1350, which may include one or more features of the stand 300 of FIG. 3. As shown, the device 1310 includes a channel 1317, which may be integral to the device 1310 or a component that is fixed to the device 1310. For example, consider a device that includes a housing where a back surface of the housing (e.g., opposite a display, a keyboard, etc.) includes one or more channels. In such an example, the stand 1350 can include a locking component 1359 that can be received at least in part in the channel 1317 for clamping the device 1310 to the stand 1350, for example, via a member 1357. As an example, the member 1357 can be an adjustable coupling that is adjustable to support a device (e.g., the device 1310) in at least two different orientations.

As indicated in the example of FIG. 13, the device 1310 may be rotatable about an axis of the stand 1350, which may be an axis defined in part by the locking component 1359.

FIG. 13 shows two example orientations of the device 1310 with respect to the stand 1350 where one of the orientations can be a laptop mode orientation of the device 1310 and where another one of the orientations can be a display mode orientation of the device 1310.

As an example, the device 1310 can include circuitry that can determine an orientation of the device with respect to a stand, a support surface and/or gravity where a determined orientation may be utilized to trigger an operational mode of the device 1310. For example, where the device 1310 is in the laptop mode orientation, a keyboard may be rendered to a portion of the device 1310 (e.g., where the device 1310 includes a continuous display) and, where the device 1310 is transitioned to the display mode orientation, the keyboard may be de-rendered (e.g., if rendered) such that more area is available for displaying graphics, text, images, etc. As an example, where the device 1310 includes a continuous display, there may be two orientations that cause rendering of a keyboard to the continuous display and two orientations that may utilize a full area of the continuous display. For example, a device may be characterized by symmetry such that a long dimension of the device can be horizontal in two different orientations to trigger a full area display mode and such that a short dimension of the device can be horizontal in two different orientations to trigger a laptop mode. As an example, one or more accelerometers, one or more gyroscopes, etc., may be utilized to determine an orientation of a device with respect to gravity and/or a change in orientation of a device (e.g., a transition from orientation to another, etc.).

In the example of FIG. 13, a display of the device 1310 can be defined by an aspect ratio. For example, in the "open book" orientation, the aspect ratio may be greater than unity as the horizontal dimension is greater than the upright dimension; noting that an aspect ratio may be defined for a viewable display portion of the device 1310 for rendering text, images, graphics, etc. in the typable keyboard orientation (lower left).

In the example of FIG. 13, the device 1310 is shown as including a y dimension and an x dimension where the device 1310 can be oriented with the y dimension horizontal (e.g., a horizontal dimension) and the x dimension upright (e.g., an upright dimension) and can be oriented with the x dimension horizontal (e.g., a horizontal dimension) and the y dimension upright (e.g., an upright dimension). As an example, the device 1310 can include a foldable region and/or a bendable region such that the device 1310 can be transitioned to a planar orientation (e.g., where the y dimension and the x dimension are in a plane). As shown in FIG. 13, where the device 1310 includes a bend (or a fold) along the y dimension, the y dimension can be measured along a surface of the device 1310 (e.g., across the bend or the fold). As shown in FIG. 13, the device 1310 may be non-bendable or non-foldable along the x dimension. As an example, a bend or a fold along the y dimension can alter a footprint of the device 1310. For example, a footprint may be a projected area such as a downwardly projected area. As an example, where a device is a clamshell type of device with portions of equal area, the footprint of the device may be a full 100 percent footprint in an open planar orientation and 50 percent of that amount in a closed clamshell orientation (e.g., or in a 360 degree open tablet orientation).

Figure 14:
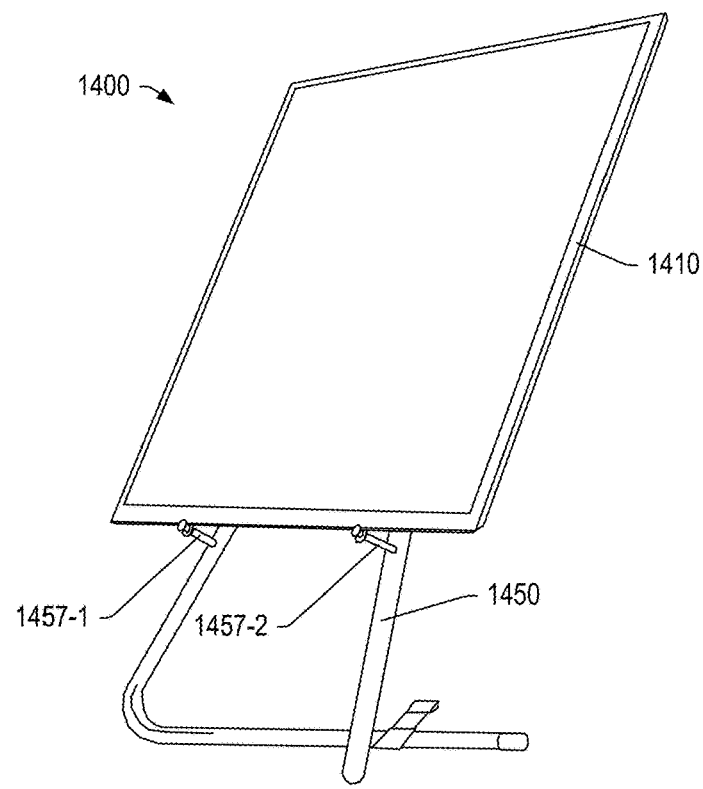
FIG. 14 is a series of views of an example of an assembly.
Figure 14:
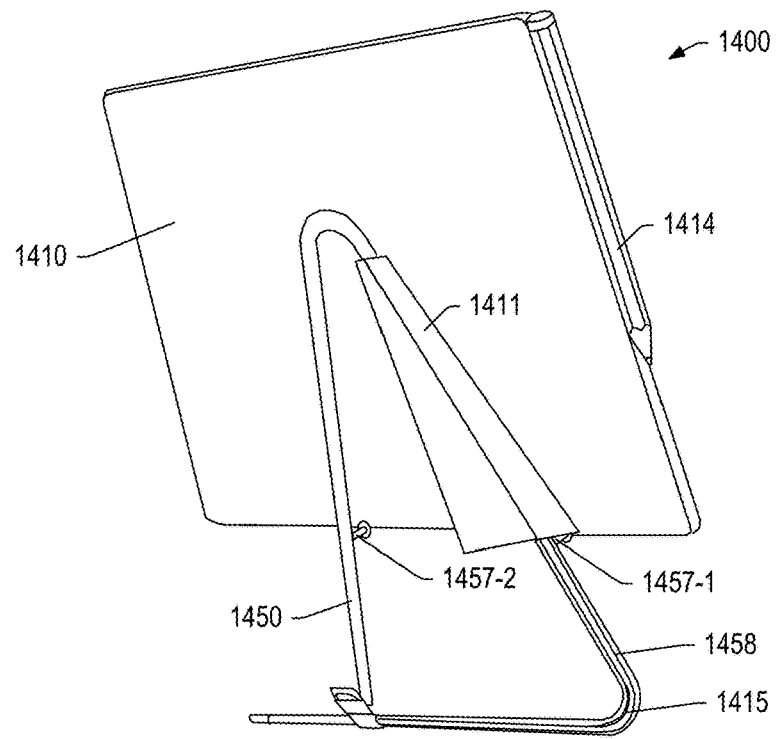

FIG. 14 shows an example of an assembly 1400 that includes a device 1410 and a stand 1450. As shown, the stand 1450 includes prongs 1457-1 and 1457-2, which may be types of members. As an example, the prongs 1457-1 and 1457-2 can be adjustable couplings that are adjustable to support a device in at least two different orientations. As an example, the stand 1450 can include a series of openings, tracks, etc., where the prongs 1457-1 and 1457-2 may be adjustable such that their distance from a support surface can be adjusted (e.g., height adjustment).

As an example, the assembly 1400 can include a circuitry package 1411 that includes circuitry that can be operatively coupled to circuitry of the device 1410. For example, the device 1410 can be a display device with a display and display circuitry where circuitry in the circuitry package 1411 can include one or more interfaces that can receive information that can be transmitted to the device 1410 and rendered to the display of the device 1410. As an example, the circuitry package 1411 may be a thin client, a single board computer, etc., optionally with a display interface. In the example of FIG. 14, the circuitry package 1411 is shown as being off the ground; noting that an on the ground or lower position of a circuitry package may be utilized. For example, consider a circuitry package that is coupled to a leg that is in contact with a support surface along a length of the leg (e.g., as opposed to being in contact at an end of the leg).

As an example, the assembly 1400 can include a cord 1415 that can provide power to power the device 1410, the circuitry package 1411, etc. As an example, the stand 1450 can include a channel 1458 that can receive at least a portion of the cord 1415, which may be a power cord that can include a plug that can be received by a socket (e.g., a wall power outlet socket, a power adapter socket, etc.).

As an example, the assembly 1400 can include a stylus 1414, which may be used with the device 1410. For example, consider the device 1410 as including digitizer circuitry that may be passive and/or active for receipt of input via the stylus 1414. In the example of FIG. 14, the stylus 1414 may include a magnetic material and the device 1410 may include a magnetic material such that a magnetic attraction force can be utilized to secure the stylus 1414 to the device 1410.

Figure 15:
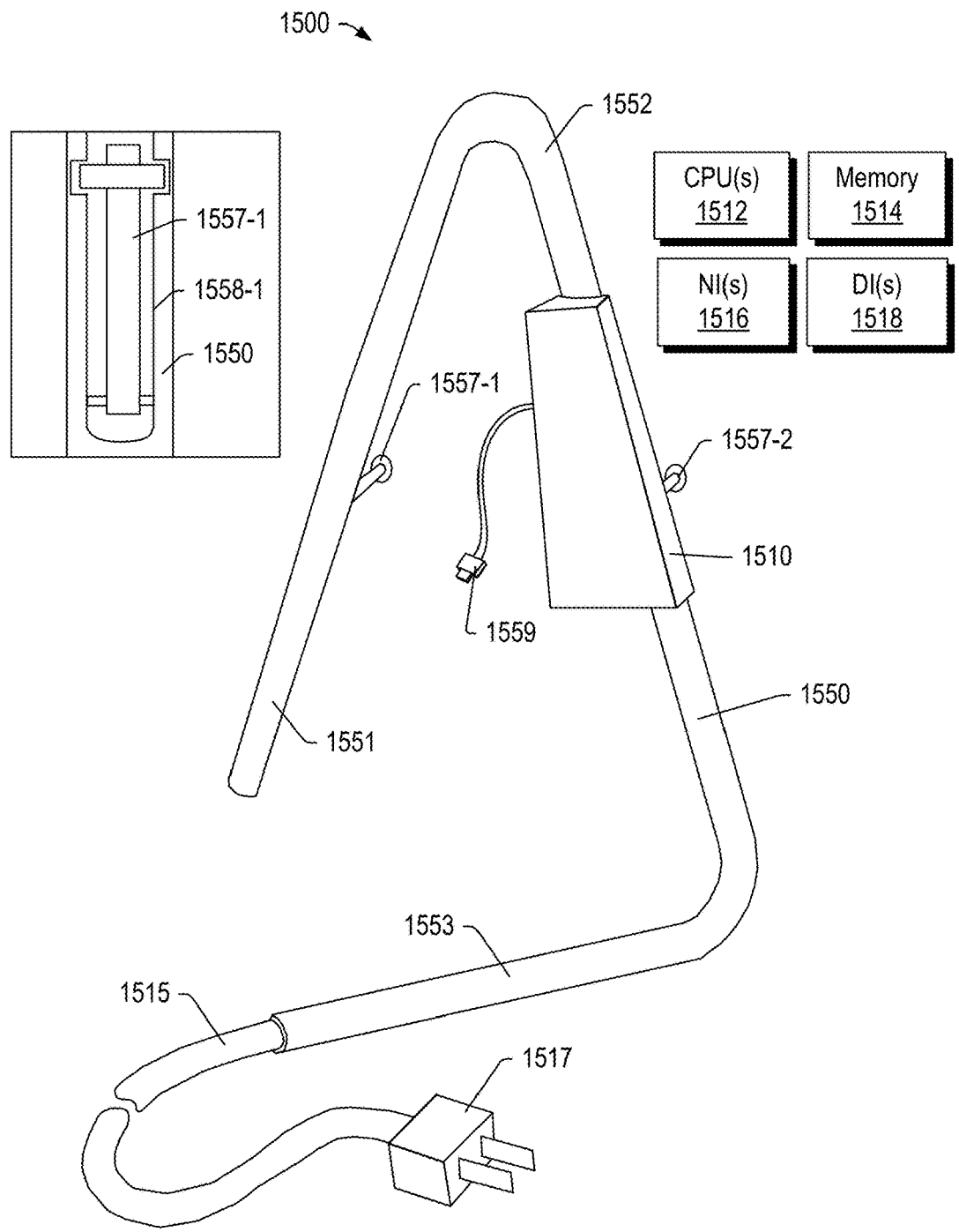
FIG. 15 is a series of views of an example of an assembly.

FIG. 15 shows an example of an assembly 1500 that includes a circuitry package 1510 that can include one or more processors 1512 (e.g., CPUs, GPUs, etc.), memory 1514, one or more network interfaces 1516 and one or more display interfaces 1518. As shown, the assembly 1500 includes a conduit 1550 that is shaped to form three legs 1551, 1552 and 1553. As shown, the legs 1551 and 1552 define a plane and form a peak at a bend of the conduit 1550 where the leg 1553 extends away from the plane at a bend with the leg 1552. As an example, the conduit 1550 may be defined as having a three legged, three-dimensional triangular shape where two legs define a plane and the third leg extends out of the plane, for example, as a support leg that can rest on a support surface (e.g., a desktop, a tabletop, a countertop, etc.).

As shown in FIG. 15, the conduit 1510 can house at least a portion of a cord 1515, which may be a power cord that includes a plug 1517 (e.g., for a wall outlet socket, a power adapter socket, etc.). While a plug is shown, the core 1515 may include a socket and/or another type of electrical connector.

In the example of FIG. 15, the cord 1515 can be operatively coupled to circuitry of the circuitry package 1510, for example, to provide electrical power for operation of the circuitry. As an example, the circuitry package 1510 and/or another portion of the assembly 1500 may include one or more rechargeable batteries such that the assembly 1500 may be operated without the cord 1515 being connected to a power source (e.g., a wall outlet, etc.).

In the example of FIG. 15, the conduit 1550 can be operatively coupled to prongs 1557-1 and 1557-2, which may be pivotable into respective sockets of the conduit 1550. As shown in an enlarged view of a portion of the assembly 1500, the conduit 1550 can include a socket 1558-1 (e.g., and another socket, not shown) that can receive the prong 1557-1. For example, an axle may be included such that the prong 1557-1 can pivot into and out of the socket 1558-1 (e.g., and similarly for the prong 1557-2 with respect to another socket of the conduit 1550). As an example, the socket 1558-1 can be shaped to receive the prong 1557-1 in a retracted state and to support the prong 1557-1 in an extended state. As an example, the prongs 1557-1 and 1557-2 can be adjustable couplings that are adjustable to support a device in at least two different orientations. As an example, the stand 1550 can include a series of openings, tracks, etc., where the prongs 1557-1 and 1557-2 may be adjustable such that their distance from a support surface can be adjusted (e.g., height adjustment).

As shown, the assembly 1500 can include a connector 1559, which may be operatively coupled to circuitry of the circuitry package 1510. As an example, the connector 1559 may be part of the circuitry package 1510 and extendable therefrom (e.g., from a storage state to an extended state). As an example, the circuitry package 1510 can include a recess for the connector 1559. As an example, the circuitry package 1510 can include a connector that can be directly connected to a display device and/or connected to a display device via a cable. As an example, a connector may be a mini-display connector, an HDMI connector, a USB connector, or another type of connector that can be utilized to transmit information and/or power to a display device.

As an example, the assembly 1500 may be utilized in combination with a display device, which may be a tablet, a smart phone, etc., where, for example, circuitry of the circuitry package 1510 may be operatively coupled to the display device to extend capabilities of the display device. For example, the circuitry package 1510 may include a processor or processors that have specifications that are beyond those of a processor of the display device (e.g., in terms of speed, number of cores, graphics capabilities, etc.).

As an example, the prongs 1557-1 and 1557-2 can support a display device where circuitry of the display device can be operatively coupled to circuitry of the circuitry package 1510 via the connector 1559. As an example, the circuitry package 1510 can include one or more types of connectors, one or more types of network interfaces, etc., which may be utilized to extend capabilities of a display device and/or the assembly 1500 (e.g., keyboard capabilities via a keyboard, mouse capabilities via a mouse, touchpad capabilities via a touchpad, sound system capabilities via a sound system, etc.).

In the example of FIG. 15, the circuitry package 1511 is shown as being off the ground; noting that an on the ground or lower position of a circuitry package may be utilized. For example, consider a circuitry package that is coupled to the leg 1553 that is in contact with a support surface along a length of the leg 1553 (e.g., as opposed to being in contact at an end of the leg as with the leg 1551). As an example, a circuitry package may be positioned to stabilize an assembly. For example, a center of gravity of an assembly may be determined where the circuitry package provides for a lower center of gravity and/or greater stability of a stand (e.g., shifting mass backwards toward a back leg, etc.). As an example, a stand may be rated with respect to a device, for example, as to an angle of the device on the stand, a size of the device, a mass of the device, a center of gravity of the device, etc.

As an example, a stand can include a rear leg that can include circuitry, such as, for example, a power cable, a data cable, a power and data cable, a power cable and a data cable, etc. As an example, a rear leg can be hollow or can be formed with a recess that can receive at least a portion of a cable or portions of cables. As an example, a rear leg (e.g., a back leg) can include one or more connectors, which may be operatively coupled to one or more cables. As an example, an assembly can include a device that can be operatively coupled to one or more cables that are carried and/or integrated in a rear leg of a stand (e.g., a back leg of a stand).

Figure 16:
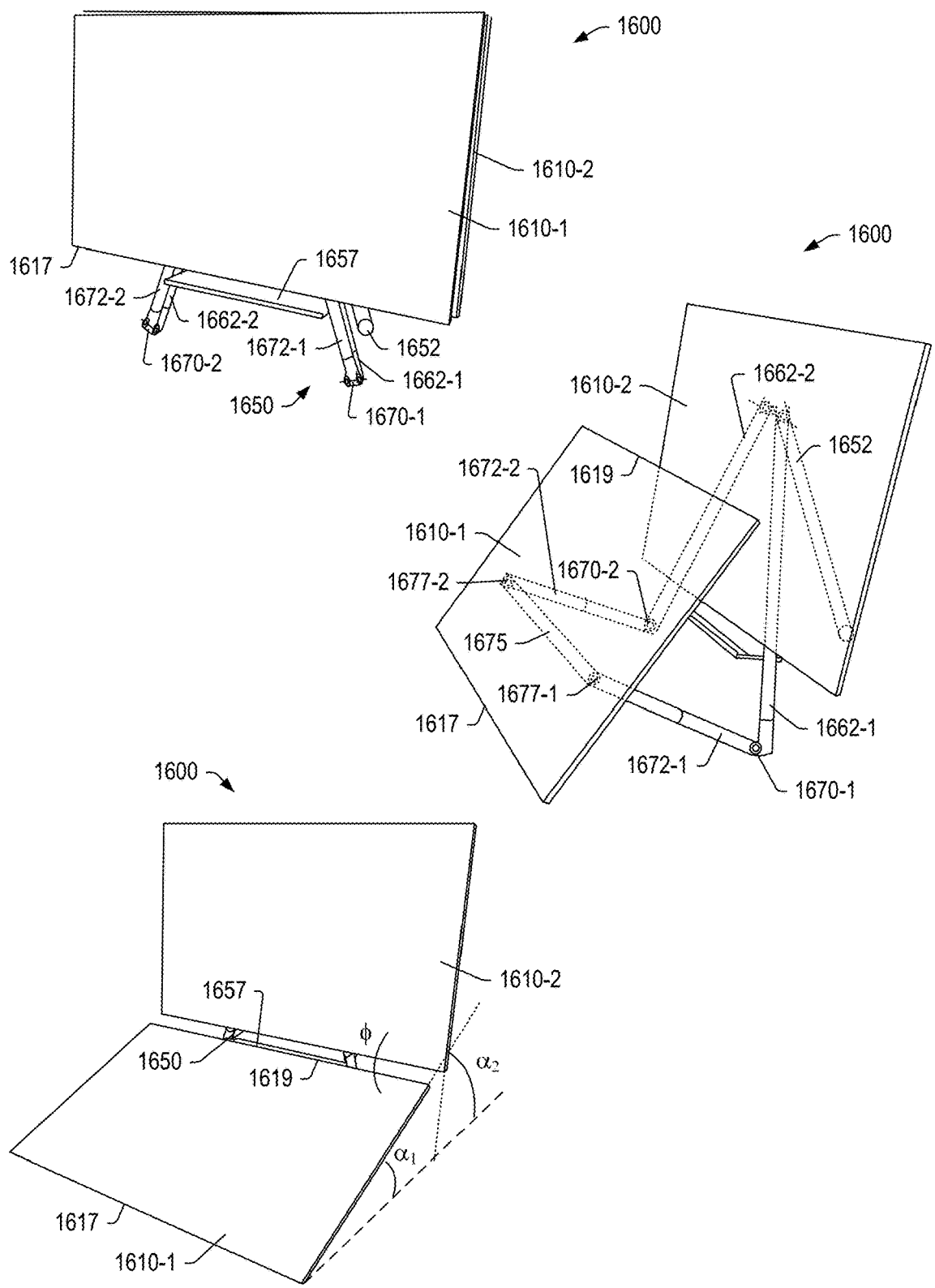
FIG. 16 is a series of views of an example of an assembly.

FIG. 16 shows an example of an assembly 1600 that includes multiple display devices 1610-1 and 1610-2 and a stand 1650. As shown, the display devices 1610-1 and 1610-2 can be stacked on the stand 1650, for example, to be overlapping. As an example, a user may utilize one or both of the display devices 1610-1 and 1610-2 in one or more orientations. The stand 1650 can include a member 1657 that can be utilized to support one or more of the display devices 1610-1 and 1610-2. As shown, the stand 1650 can include legs 1652, 1662-1, 1662-2, 1672-1 and 1672-2 where the legs 1652, 1662-1 and 1662-2 can form a tripod stand where the legs 1672-1 and 1672-2 can articulate via joints 1670-1 and 1670-2 that are formed with the legs 1662-1 and 1662-2. As an example, the display device 1610-1 can be carried by the legs 1672-1 and 1672-2, which may be coupled to a member 1675 via joints 1677-1 and 1677-2. As an example, the display device 1610-1 can include one or more members, one or more joints, etc.

As shown in the example of FIG. 16, the display device 1610-2 may remain stationary while the display device 1610-1 is transitioned from a first orientation to a second orientation where, in the first orientation, the display devices 1610-1 and 1610-2 are stacked and where, in the second orientation, the display devices 1610-1 and 1610-2 are not stacked. In the second orientation, the display devices 1610-1 and 1610-2 may be utilized for rendering graphics, text, images, etc.

As an example, in the second orientation, the display device 1610-1 may be utilized as an input device, for example, using touch, a stylus, etc. For example, a content creator may draw a portion of a scene using the display device 1610-1 where a composite scene is rendered to the display device 1610-2. As an example, a user may drag and drop a portion of a composite scene from the display device 1610-2 to the display device 1610-1 for editing, revision, etc. Such an approach may involve dragging a graphic, an image, an icon, etc., downwardly toward a bottom edge of the display device 1610-2 where that action triggers rendering to the display device 1610-1. Where the user has completed a task, the user may make a gesture that pushes the content upwardly such that it is rendered to the display device 1610-2 or, for example, a content creation application may automatically render what is being created (e.g., new, edited, etc.) using the display device 1610-1 to the display device 1610-2 in real-time.

As an example, where a user has completed various drawing tasks using the display device 1610-1, the user may re-orient the display device 1610-1 to stack it over the display device 1610-2. As an example, such a transition may trigger a display priority state such that the display device 1610-1 is assigned to be a "main" display while the display device 1610-2 may be transitioned to a low power mode or an off state. For example, upon transitioning the display device 1610-1 to a stacked orientation, circuitry may switch off at least display circuitry of the display device 1610-2 and make a display of the display device 1610-1 an active and only display. In the example of content creation of a portion of a scene, upon transitioning of the orientation, the entire scene may be rendered to the display of the display device 1610-1. Where the user desires to demonstrate the content created to another person, they may view the content on a single display of the display device 1610-1. And, where an edit is to be made, the user can transition the display devices 1610-1 and 1610-2 from the stacked orientation to the drawing orientation to make such an edit.

As an example, the assembly 1600 of FIG. 16 may be utilized in a stacked orientation where a single display is visible and where space is available in front of the single display, for example, for a keyboard, etc. As explained, the stand 1650 includes various features that allow for positioning of the display device 1610-1 such that it can fold down to a position in front of the display device 1610-2 where the position is defined by an angle that can be suitable for drawing on the display device 1610-1 (e.g., consider an angle of approximately 5 degrees to approximately 60 degrees, noting that an ergonomic angle for drawing may be in a range of approximately 20 degrees to 45 degrees. As an example, the stand 1650 may be configured or configurable with respect to two display devices to provide for an ergonomic angle for drawing on one of the two displays in an orientation that may be referred to as a drawing orientation. FIG. 16 shows an example angle $\alpha_1$ as being defined by a plane of the display device 1610-1 and a support surface (e.g., a desktop, a tabletop, a countertop, etc.). As an example, one or more of the joints 1670-1, 1670-2, 1677-1 and 1677-2 may be ratcheted to lock in at a particular angle or a particular group of angles, which can include one or more ergonomic drawing angles.

In the example of FIG. 16, another example angle $\alpha_2$ can be defined by a plane of the display device 1610-2 and a support surface (e.g., a desktop, a tabletop, a countertop, etc.). In the example of FIG. 16, the angle $\alpha_1$ may be a drawing angle (e.g., an ergonomic drawing angle as for drafting) and the angle $\alpha_2$ may be a viewing angle (e.g., an ergonomic viewing angle as for viewing a display when seated or standing; see also the angle $\beta_1$ of FIG. 2). FIG. 16 also shows an angle $\phi$ as an angle between the display devices 1610-1 and 1610-2 where each of the display devices 1610-1 and 1610-2 can define a corresponding plane where intersection of those planes can define the angle $\phi$. As shown, a gap can exist between edges of the display devices 1610-1 and 1610-2 in the drawing orientation where the member 1657 can be accessible via the gap. For example, the member 1657 may be utilized for storage of one or more implements (e.g., a stylus, styluses, etc.), that can be accessed when the assembly 1600 is in the drawing orientation.

As an example, the member 1657 may extend outwardly from a plane defined by the display device 1610-2 to support, at least in part, the display device 1610-1 in one or more orientations. For example, in the stacked orientation, the member 1657 may extend outwardly to form a support that can bear at least a portion of the mass of the display device 1610-1 along an edge 1617 (e.g., a bottom edge); whereas, in the drawing orientation, the member 1657 may extend outwardly to form a support that can bear at least a portion of the mass of the display device 1610-1 along a back side and/or another edge 1619 (e.g., an upper edge). In such an example, the member 1657 may help to support the weight and/or force applied by a hand or hands that are placed on the display device 1610-1 for drawing, etc. As an example, the position of the member 1657 where it forms a support (e.g., a shelf, etc.) may determine the angle $\alpha_1$. As an example, a member may be coupled to the legs 1662-1 and 1662-2 to support the display device 1610-2. In such an example, the member 1657 may be adjustable, for example, to support and/or position the display device 1610-1. For example, consider the member 1657 being adjustable upwardly or downwardly in a manner that can determine the angle $\alpha_1$ of the display device 1610-1 in the drawing orientation. As an example, where the member 1657 supports the display device 1610-2, it may be adjustable to position the display device 1610-2 in the stacked orientation and the drawing orientation. As an example, the member 1675 may be adjustable to with respect to the display device 1610-1 to allow for positioning of the display device 1610-1 higher or lower with respect to the member 1675.

As an example, the legs 1672-1 and 1672-2 may be telescoping such that their respective lengths can be adjusted. For example, a user may push the display device 1610-1 in a direction toward the joints 1670-1 and 1670-2 to shorten the legs 1672-1 and 1672-2 and may pull the display device 1610-1 in a direction away from the joints 1670-1 and 1670-2 to lengthen the legs 1672-1 and 1672-2. In such an example, the user may position the display device 1610-1 a desired distance from the display device 1610-2 (e.g., for purposes of a drawing orientation for drawing, etc.). As an example, the legs 1662-1 and 1662-2 and/or the leg 1652 may be telescoping such that leg length can be adjusted. In FIG. 16, the stand 1650 may include various features of a stand, for example, as in FIG. 3, FIG. 5, FIG. 10, FIG. 11, FIG. 21, etc.

As an example, in the drawing orientation of the assembly 1600, the display device 1610-1 may be in contact with a support surface, for example, along or near the edge 1617, which may be chamfered and optionally include a rubberized anti-shock material that has a sufficiently high coefficient of friction with the support surface.

In the drawing orientation, the assembly 1600 can be stabilized in a manner where the display device 1610-2 is less likely to tip backwards due to the mass and position of the display device 1610-1, which may be subjected to touching, etc., during drawing. Whereas, in the stacked orientation, the mass of both display devices 1610-1 and 1610-2 may help to stabilize the assembly 1600. For example, the mass of both display devices 1610-1 and 1610-2 in the stacked orientation may make the assembly 1600 more stable on the stand 1650 compared to an orientation that merely has the display device 1610-2 on the stand 1650.

As an example, the member 1657 may be suitable for storage of a stylus or other implement. As an example, the member 1657 may be a tray that is accessible in at least the stacked orientation and that may be accessible in the drawing orientation as well. As an example, a stylus stored on the member 1657 may be stable during a transition of the assembly 1600 from one orientation to another orientation.

As an example, one or more of the joints 1670-1, 1670-2, 1672-1 and 1672-2 may be spring biased or otherwise loaded, which may provide for smoother and more stable transitions between orientations. As an example, a hydraulic fluid mechanism, a pressurized gas mechanism, etc., may be utilized to provide for smooth and stable transitions of the legs as carrying the two display devices 1610-1 and 1610-2.

As shown in the example of FIG. 16, the legs 1672-1 and 1672-2 can be articulating legs as they can be joined to the legs 1662-1 and 1662-2 via the joints 1670-1 and 1670-2. In the example of FIG. 16, the legs 1662-1 and 1662-2 may remain stationary while the legs 1672-1 and 1672-2 are moved, for example, by rotation with respect to the legs 1662-1 and 1662-2 to position the display device 1610-1 with respect to the display device 1610-2. In such an example, the display device 1610-1 may also rotate or be rotatable with respect to a plane defined by the legs 1672-1 and 1672-2. For example, in the stacked orientation, the display device 1610-1 defines a plane that is substantially parallel to the plane defined by the legs 1672-1 and 1672-2; whereas, in the drawing orientation, the plane defined by the display device 1610-1 rotates by more than 90 degrees with a limit of 180 degrees with respect to the plane defined by the legs 1672-1 and 1672-2. As shown, in the stacked orientation, a back side of the display device 1610-1 may be proximate to or in contact with "front" sides of the legs 1672-1 and 1672-2; whereas, in the drawing orientation, the back side of the display device 1610-1 may be proximate to or in contact with "back" sides of the legs 1672-1 and 1672-2. As shown in the example of FIG. 16, the display device 1610-1 may rotate about the joints 1677-1 and 1677-2 as the assembly 1600 is transitioned between the stacked orientation and the drawing orientation.

As mentioned, in the drawing orientation, a content creation application may render particular information to a display of one of the display devices 1610-1 and 1610-2 that facilitates tasks, workflows, etc. For example, the lower display can be angled for drawing/sketching while exposing the other display for efficiently spreading out busy menus and drop downs, etc.

As an example, an assembly can include a first rectangular device that includes a display (see, e.g., the display device 1610-1); a second rectangular device that includes a display (see, e.g., the display device 1610-2); and a stand that supports the first rectangular device and the second rectangular device in different orientations, where the different orientations include a stacked orientation (see, e.g., FIG. 16 top perspective view) and a drawing orientation (see, e.g., FIG. 16 lower perspective view). As an example, a stand can include three legs, where two of the three legs define a plane (see, e.g., the legs 1662-1 and 1662-2 in the example of FIG. 16) and where another of the three legs forms an angle with respect to the plane (see, e.g., the leg 1652 in the example of FIG. 16). As an example, a stand can include two articulating legs (see, e.g., the legs 1672-1 and 1672-2 in the example of FIG. 16) where, for example, each of the two articulating legs can be operatively coupled to a corresponding one of two of the three legs (see, e.g., the joints 1670-1 and 1670-2 in the example of FIG. 16). As an example, in a stacked orientation, the two articulating legs can be disposed between a first rectangular display and a second rectangular display (see, e.g., FIG. 16 top perspective view). As an example, in a drawing orientation, a first rectangular display can be disposed in front of the two of the three legs at a drawing angle that is greater than approximately 5 degrees and less than approximately 60 degrees (see, e.g., $\alpha_1$ in the example of FIG. 16) and the second rectangular display can be disposed parallel to a plane defined by the two of the three legs at a viewing angle that is greater than approximately 60 degrees and less than approximately 110 degrees (see, e.g., $\alpha_2$ in the example of FIG. 16).

As an example, an assembly can include various modes, which can be operational modes that can be associated with one or more orientations. For example, consider a dual display mode (e.g., portrait, landscape, etc.), a dual display content creation mode, a single display mode (e.g., portrait, landscape, etc.).

As mentioned, a channel may be utilized to facilitate transitions between orientations. As an example, a channel can be part of a rail mechanism that may provide for a one step (e.g., lift or lower) operation to transition between orientations (e.g., modes). Such an approach may include translation and/or rotation.

As to operational modes, a mode with top and bottom dual displays can include a lower display with a steep angle to provide room for keyboard use (e.g., an angle that may be steeper than an ergonomic angle for purposes of drawing). In such an example, a spreadsheet could be rendered to the bottom display and one or more of e-mail, documents, and Internet windows could be rendered to the top display. As an example, one or more content creation applications (e.g., PHOTOSHOP, SOILDWORKS, SKETCHBOOK, CATIA, etc.) could be utilized, optionally using multiple displays in a beneficial manner that is in accord with how the each of the multiple displays is oriented as part of an assembly. As an example, a CAD application may utilize one display for input and another display for animated rendering (e.g., KEYSHOT, etc.).

Figure 17:
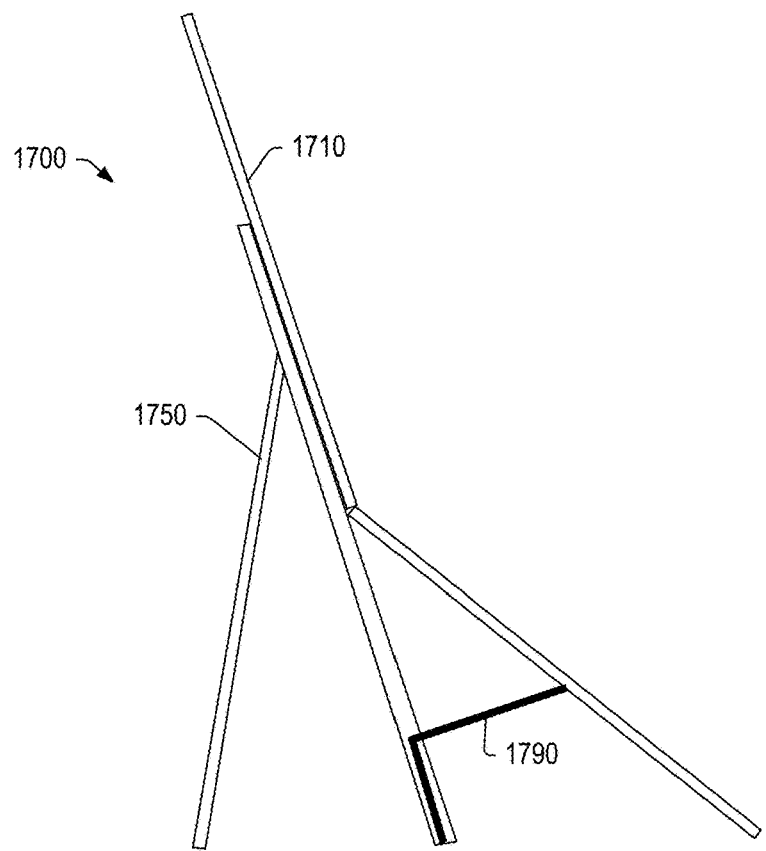
FIG. 17 is a series of views of an example of an assembly.
Figure 17:
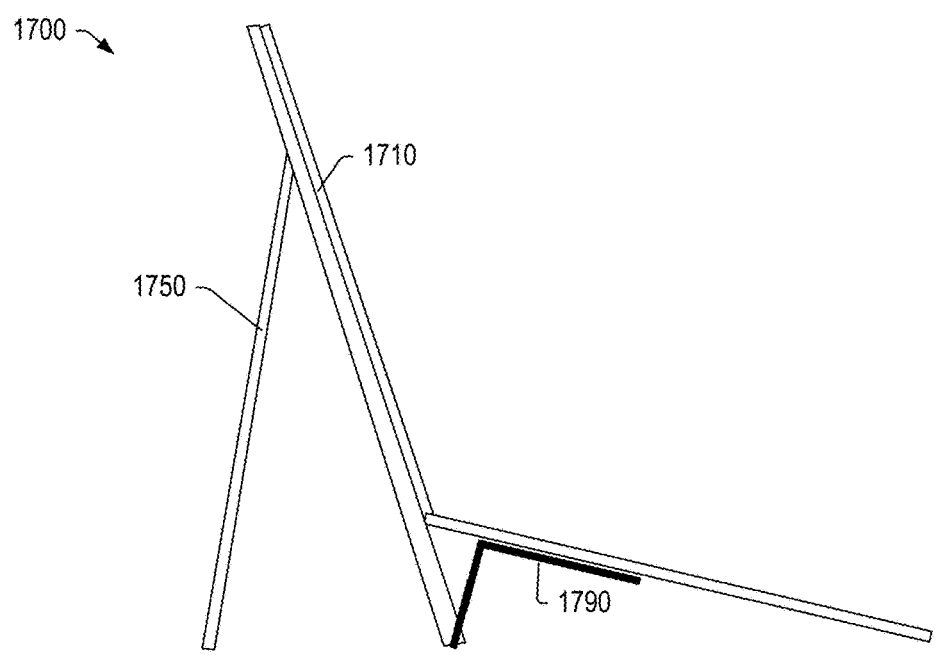

FIG. 17 shows an example of an assembly 1700 that includes a device 1710, a stand 1750 and an adjustable member 1790. As shown in the example of FIG. 17, the adjustable member 1790 can be oriented in a plurality of orientations. In the upper view, the adjustable member 1790 is shown as having a leg substantially aligned with front legs of the stand 1750 while another leg forms an angle with a portion of the device 1710. In the lower view, the adjustable member 1790 is shown as having a leg substantially parallel with a portion of the device 1710 while the other leg is tilted with respect to the front legs. In FIG. 17, the upper view may be a display orientation while the lower view may be a typing orientation, where the adjustable member 1790 can support a portion of the device 1710, which can include a keyboard.

Figure 18:
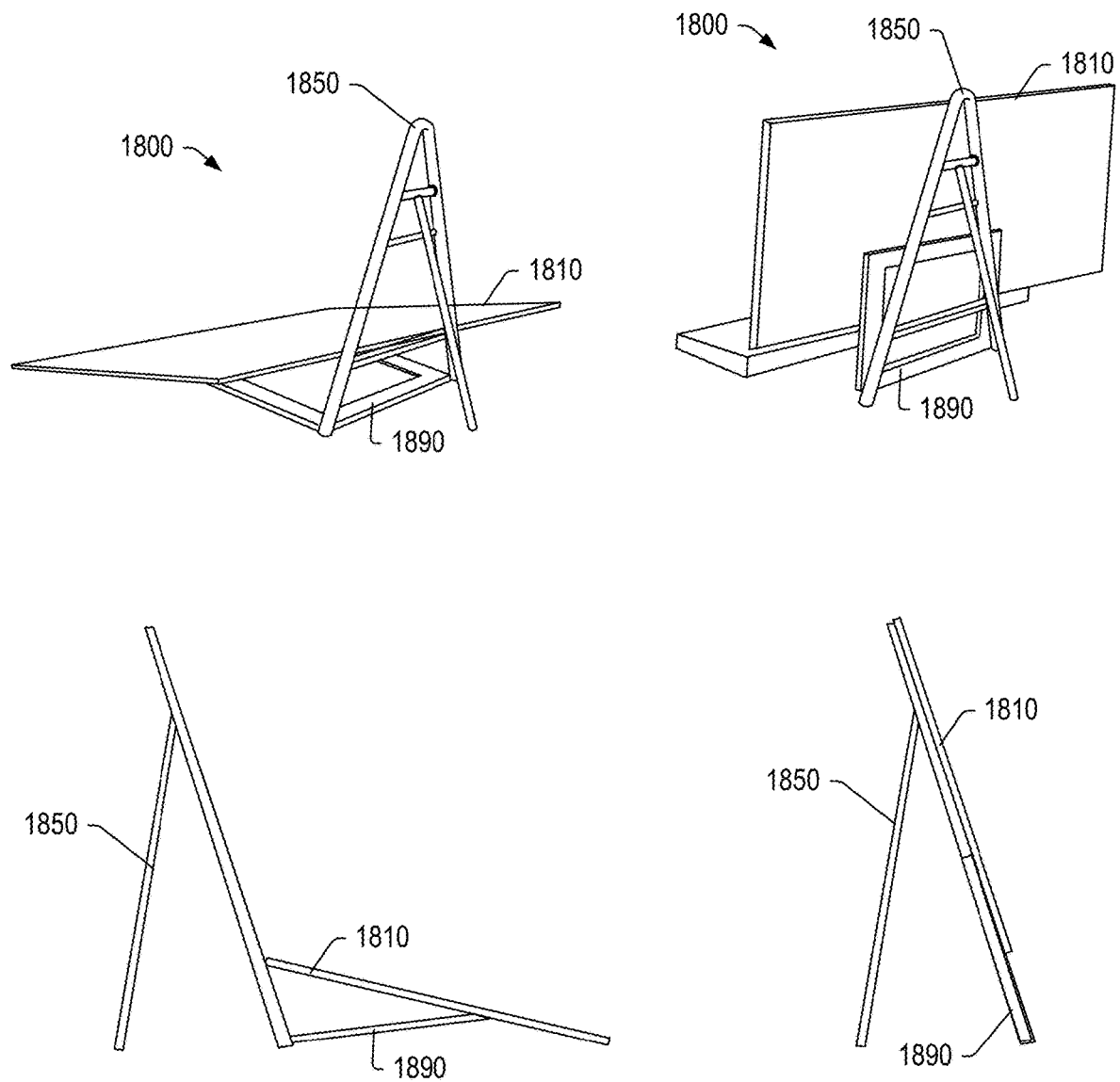
FIG. 18 is a series of views of an example of an assembly.

FIG. 18 shows an example of an assembly 1800 that includes a device 1810, a stand 1850 and an adjustable member 1890. As shown, the adjustable member 1890 can support the device 1810 in various orientations that include a tilted orientation where a portion of the device 1810 is in contact with a surface (e.g., a desktop, a tabletop, a countertop, etc.) and a less tilted orientation where the device 1810 is not in direct contact with a surface that supports the stand 1850.

Figure 19:
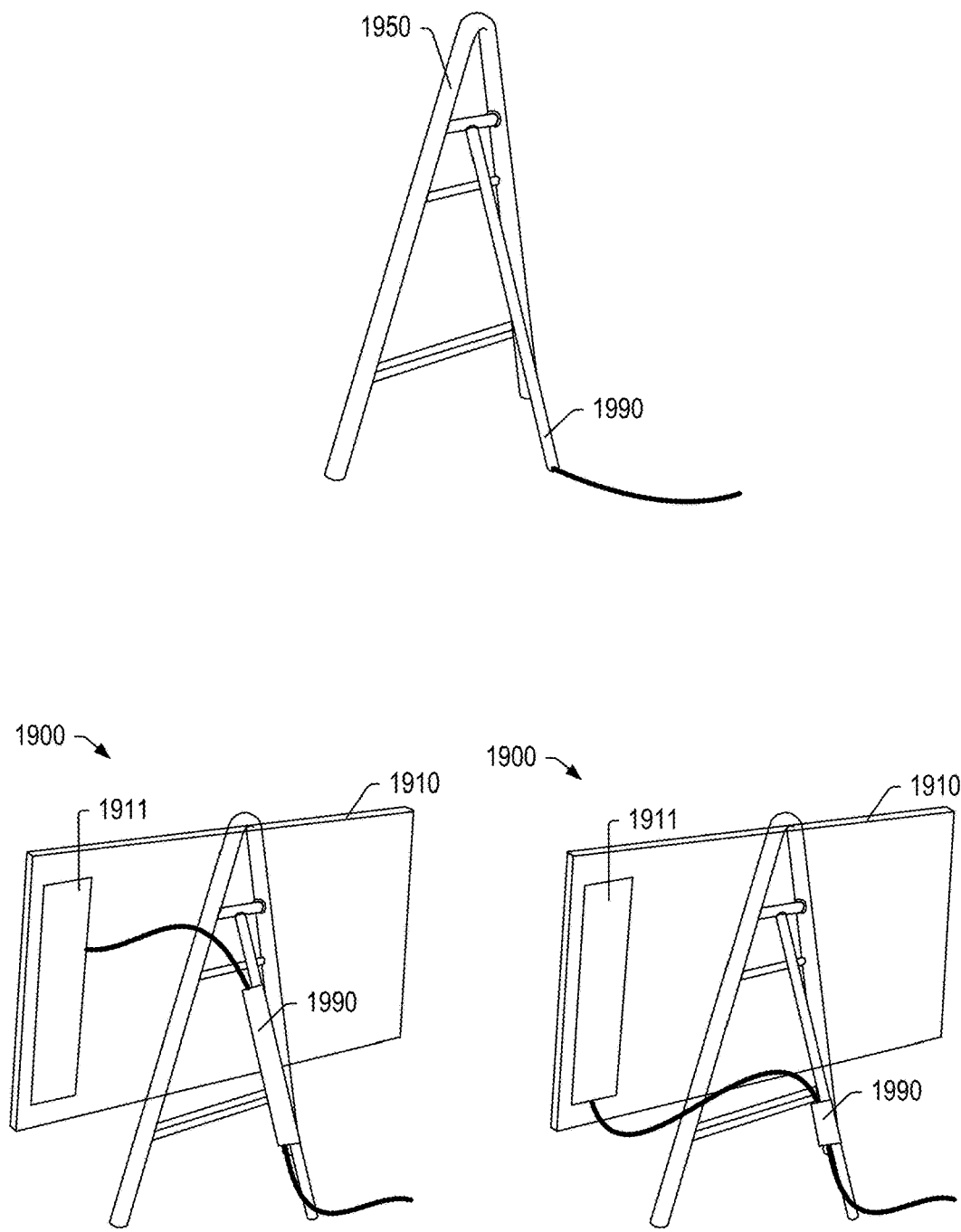
FIG. 19 is a series of views of an example of an assembly.

FIG. 19 shows an example of an assembly 1900 that includes a device 1910 and a stand 1950 where the stand 1950 includes a cable holder 1990, which may be a conduit. In the example of FIG. 19, the device 1910 can include integral circuitry and/or add-on circuitry 1911. As an example, the add-on circuitry 1911 can include thin client circuitry.

As an example, a thin client can be a lightweight computer that includes circuitry for establishing a remote connection with a server-based computing environment. In such an example, workload may be balanced more toward the server side than the client side. As an example, a server side environment may execute applications, perform computations, perform visualization tasks, and store data. A thin client can be contrasted to a fat client, which may be, for example, a workstation that includes a multicore processor or processors, multiple internal cards (e.g., graphics, etc.), etc.

1911, which may be a kit for the device 1910 where the device 1910 can be customized by selection of the type of the add-on circuitry 1911. For example, consider the add-on circuitry 1911 being selected from a plurality of different types of add-on circuitry that may be for different types of tasks (e.g., graphics, computing, cloud-interaction, network communications, etc.).

Figure 20:
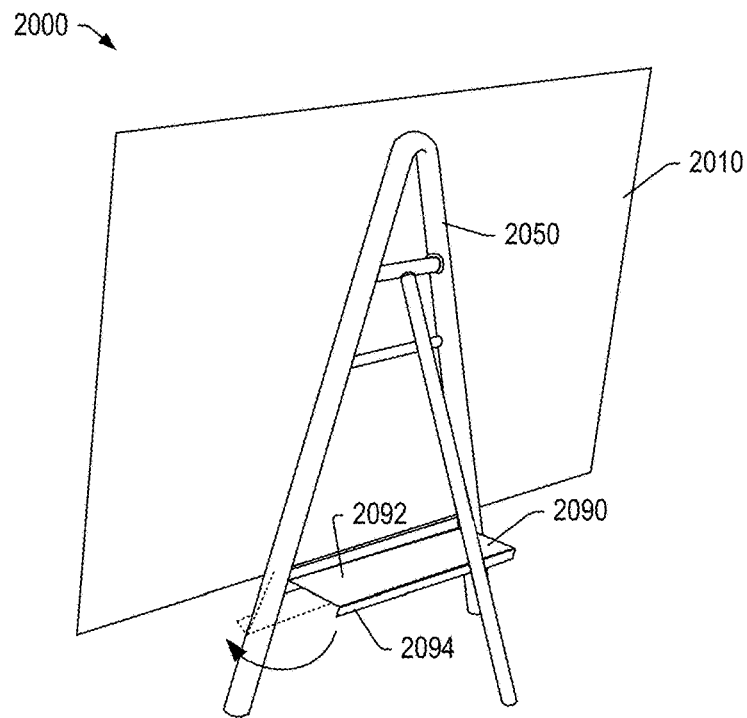
FIG. 20 is a series of views of an example of an assembly.
Figure 20:
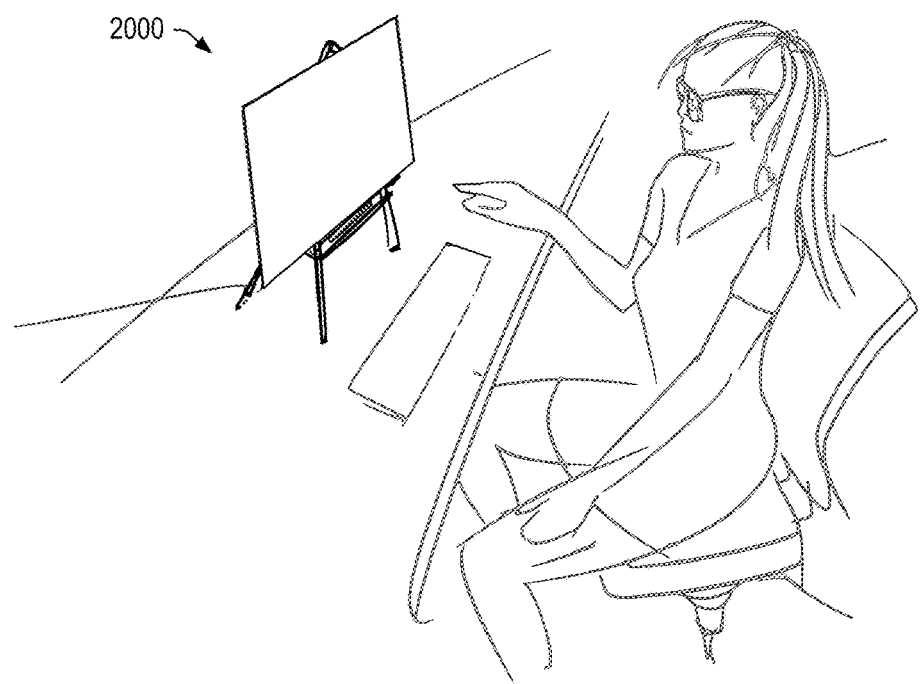

FIG. 20 shows an example of an assembly 2000 that includes a device 2010, a stand 2050 and a platform 2090, which may be an adjustable platform. As an example, the platform 2090 may be for supporting one or more components such as, for example, a stylus, a mouse, a keyboard, a smart phone, etc. As an example, the platform 2090 may be a recharge platform for recharging one or more components.

As an example, consider the platform 2090 as including wireless charging circuitry, which can be inductive charging circuitry that uses an electromagnetic field to transfer energy between two objects using electromagnetic induction. Energy sent through an inductive coupling to an electrical device may be utilized to charge one or more batteries, power a device, etc. As an example, consider circuitry operable according to the Qi wireless charging standard.

An induction charger can use an induction coil to create an alternating electromagnetic field from within a charging base where a second induction coil in a device takes power from the electromagnetic field and converts it back into electric current (e.g., to charge a battery, etc.). In such an example, the two induction coils in proximity combine to form an electrical transformer. As an example, greater distances between sender and receiver coils can be achieved when the inductive charging system uses resonant inductive coupling.

As an example, the platform 2090 may be positionable in that it can be positioned at least in part in front of the front legs of the stand 2050. As an example, the platform 2090 may be rotatable such that it can be in an orientation that differs from horizontal as shown in the example of FIG. 20. For example, consider a tilting platform that can be utilized to support a smart phone with a display of the smart phone in a plane that is approximately the same as that of a display of the device 2010 or, for example, that is at an angle that is tilted slight off from that of a display of the device 2010 as a user may look downward from the display of the device 2010 to see the display of the smart phone.

In the example of FIG. 20, the platform 2090 includes a planar portion 2092 and a lip 2094 at an end of the planar portion 2092. As indicated by an arrow, the platform 2090 may be rotatable about an axis at or proximate to an opposing end of the planar portion 2092 such that the planar portion 2092 can be set at an angle where the lip 2094 can support a smart phone. As mentioned, the platform 2090 may include circuitry that can interact with a smart phone such as, for example, to charge a battery of the smart phone. As an example, the platform 2090 may support a keyboard (e.g., a wireless keyboard), a stylus, etc. As an example, the platform 2090 may include circuitry that can charge a battery of a keyboard, a stylus, a speaker, a camera, a mouse, a touchpad, etc.

Figure 21:
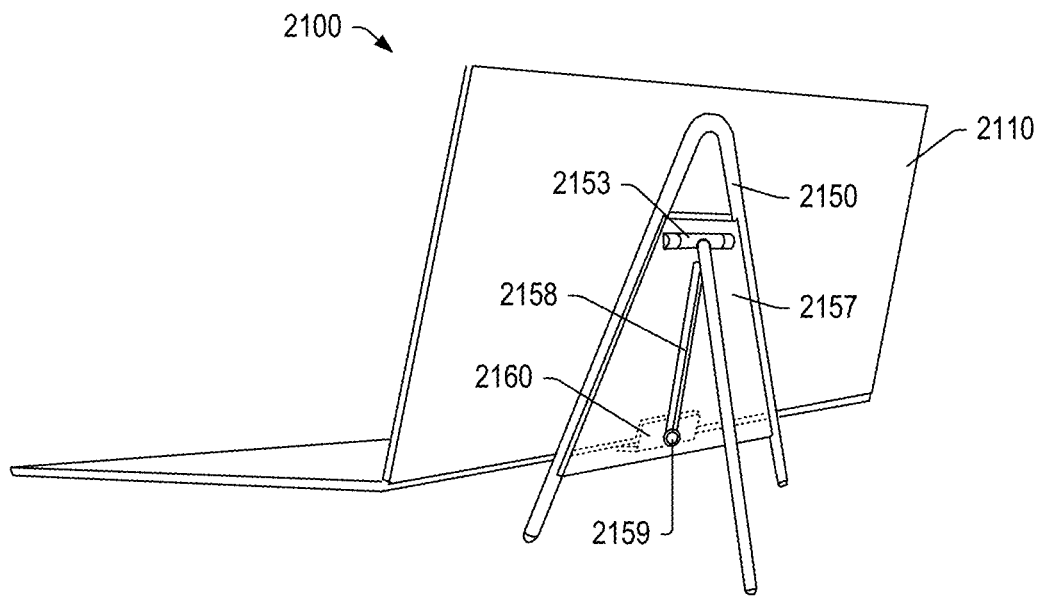
FIG. 21 is a series of views of an example of an assembly.
Figure 21:
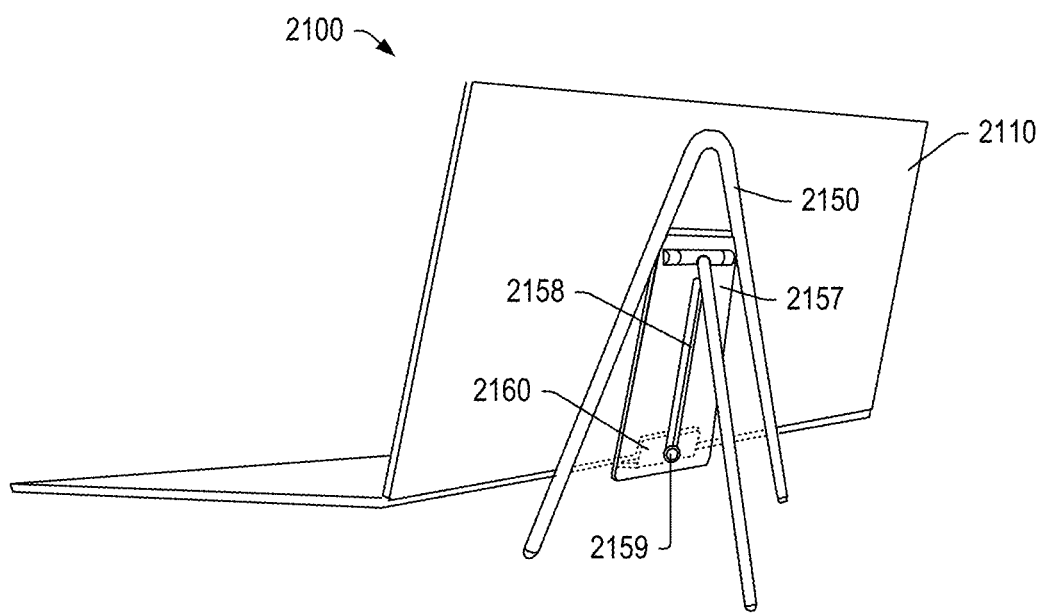

FIG. 21 shows an example of an assembly 2100 that includes a device 2110 and a stand 2150 where the stand 2150 includes a plate 2157 that contributes to the mass of the stand 2150 to enhance stability of the assembly 2100. As an example, the plate 2157 may be supported or operatively coupled to one or more features of the stand 2150. For example, the plate 2157 can span a distance between two front legs of the stand 2150 over at least a portion of a longitudinal (e.g., vertical) length of the plate 2157. As shown, the stand 2150 can include a joint 2153 that supports pivoting of a back leg of the stand 2150. The joint 2153 may optionally be integral to the plate 2157. For example, the joint 2153 may be formed in part by journals that can support an axle where the back leg of the stand 2150 is coupled to the axle.

As an example, the plate 2157 may be formed from a piece of stock material where a punch and/or a press are utilized to form features of the plate 2157. For example, an opening may be punched in the plate and journals pressed into the plate 2157 by deforming material of the plate 2157 where an axle can be received via one side of the plate 2157 with its ends disposed in the journals where the opening in the plate 2157 exposes a portion of the axle that can be coupled to the back leg of the stand 2150 (e.g., via an interference fit, a threaded socket and leg portion, etc.). In such an example, where the device 2110 is supported by the stand 2150, the axle may be inaccessible and, for example, secured between one side of the plate 2157 and one side of the device 2110.

In FIG. 21, the plate 2157 is shown as including a channel 2158 that can cooperate with a locking component 2159 and a clip 2160, which may be translatable and/or rotatable with respect to the channel 2158. As an example, the clip 2160 may have an L-shaped cross-sectional profile configured to support the device 2110 where two portions of the device 2110 join (e.g., at hinge edges of the two portions, etc.). As an example, the clip 2160 may be positioned to contact and support a back surface of a lower portion of the device 2110 (e.g., a keyboard housing) and/or be positioned to contact and support a lower edge of an upper portion of the device 2110 (e.g., a display housing) where the lower and upper portions are coupled via at least one hinge.

As an example, the locking component 2159 may include one or more features of the locking component 1159 of the example of FIG. 11 where, for example, the clip 2160 may include a threaded portion, etc., whereby the locking component 1159 can be rotated to clamp the clip 2160 to the plate 2157 at one or more positions along the channel 2158. For example, a user may loosen the locking component 2159 and slide the clip 2160 to a desired position along the channel 2158 and then tighten the locking component 2159 to secure the clip 2160 at the desired position along the channel 2158, for example, to support a device using the clip 2160. As an example, the clip 2160 can be an adjustable coupling that is adjustable to support a device (e.g., the device 2110) in at least two different orientations.

As an example, while the example assembly 2100 of FIG. 21 is shown with the device 2110 as being a clamshell type of device, the stand 2150 may be utilized to support a display, a tablet, a smart phone, etc.

Figure 22:
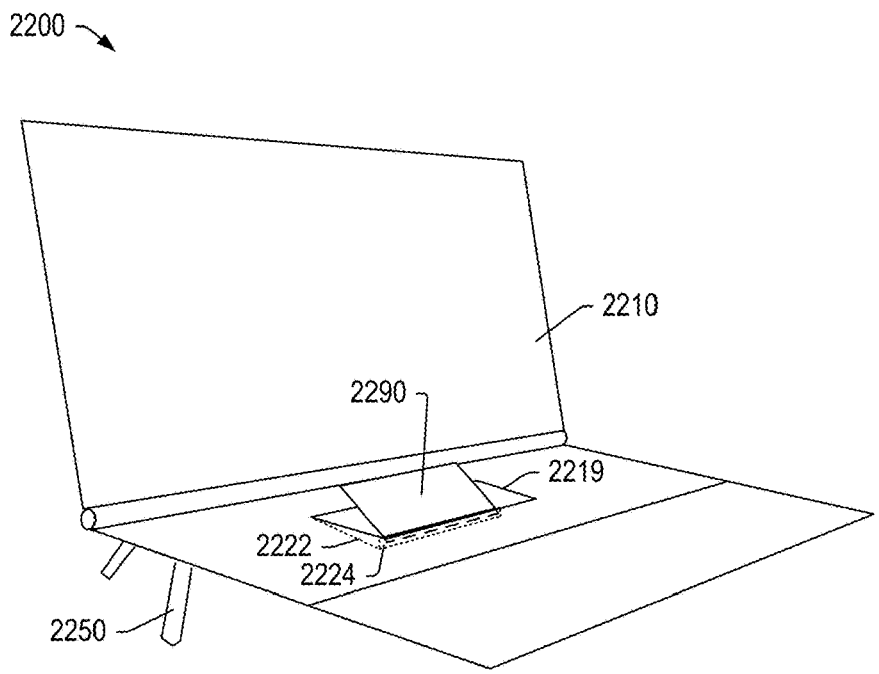
FIG. 22 is a series of views of an example of an assembly.
Figure 22:
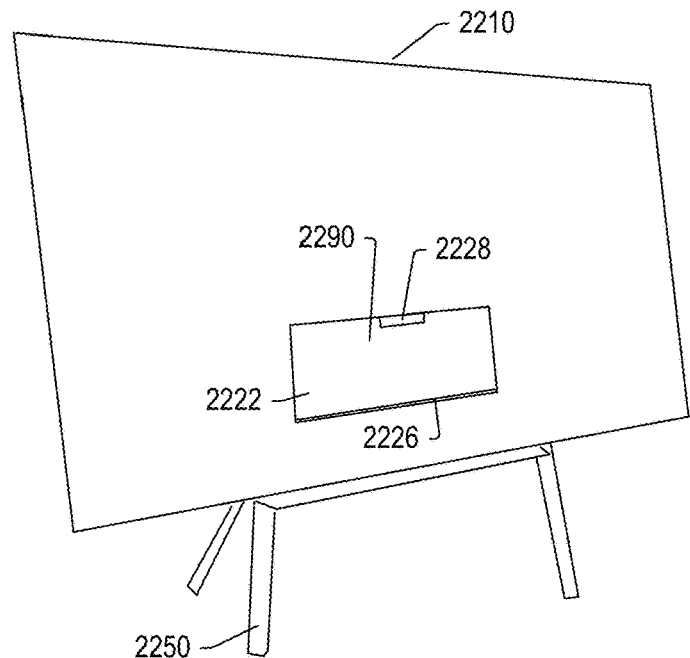

FIG. 22 shows an example of an assembly 2200 that includes a device 2210 and a stand 2250 where the device 2210 includes a recess 2219 that can support a smart phone 2290. As shown, the device 2210 has a clamshell configuration where two portions can be in a closed or an open orientation. In the open orientation, the recess 2219 can support the smart phone 2290 such that a display of the smart phone 2290 is visible to a user that is in front of the device 2210 (e.g., to view a display of the device 2210, to type on a keyboard of the device 2210, etc.). As shown in FIG. 22, in a closed orientation of the device 2210, the recess may allow for seating of the smart phone 2290, optionally in an orientation where a display of the smart phone 2290 is visible with the device 2210 in the closed orientation as supported by the stand 2250.

As an example, the recess 2219 can include a transparent piece 2222 with a lip 2224 where the transparent piece 2222 tilts downwardly to support a smart phone as in the upper view of FIG. 22 where the transparent piece 2222 can tilt to be substantially flush with an underside of a portion of the device 2210 (e.g., the underside of a keyboard portion of the device 2210). In such an example, a user may flip the smart phone around such that the display of the smart phone is facing the transparent piece 2222 such that the display is visible when the device 2210 is in a closed orientation and supported on the stand 2250 or otherwise positioned where the underside of the portion of the device 2210 with the recess 2219 is visible. In the example of FIG. 22, the device 2210 is a case for the smart phone 2290. As an example, the transparent piece 2222 may be hinged at an end opposite that of the lip 2224, as illustrated by a hinge 2226, which can operatively couple the transparent piece 2224 to the device 2210. As an example, the transparent piece 2224 may be openable from the underside as shown such that a user may take the smart phone 2290 out of the recess 2219 when the device 2210 is in a closed, clamshell orientation. For example, consider the hinge 2226 being a spring hinge that is forced by spring force to an orientation where the transparent piece 2222 is substantially flush with the underside of the device 2210. In such an example, a finger grip (e.g., a notch, etc.) 1528 may be accessible for a user to pull on the transparent piece 2222 to rotate it outwardly to access the recess 2219 (e.g., and to insert or remove something from the recess 2219 such as a smart phone or other device, component, etc.). As an example, a locking mechanism may be included such that the transparent piece 2222 snaps shut to be locked. For example, a locking mechanism can be via an interference fit between one or more features of the recess 2219 and the transparent piece 2222 and/or the lip 2224 (e.g., consider a tab that is resilient, a gasket that is resilient, etc.).

In the example of the upper view of FIG. 22, where the hinge 2226 is a spring hinge, once the transparent piece 2222 is open and the smart phone 2290 positioned by the lip 2224, the weight of the smart phone 2290 may be sufficient to maintain the transparent piece 2222 in the open position.

Figure 23:
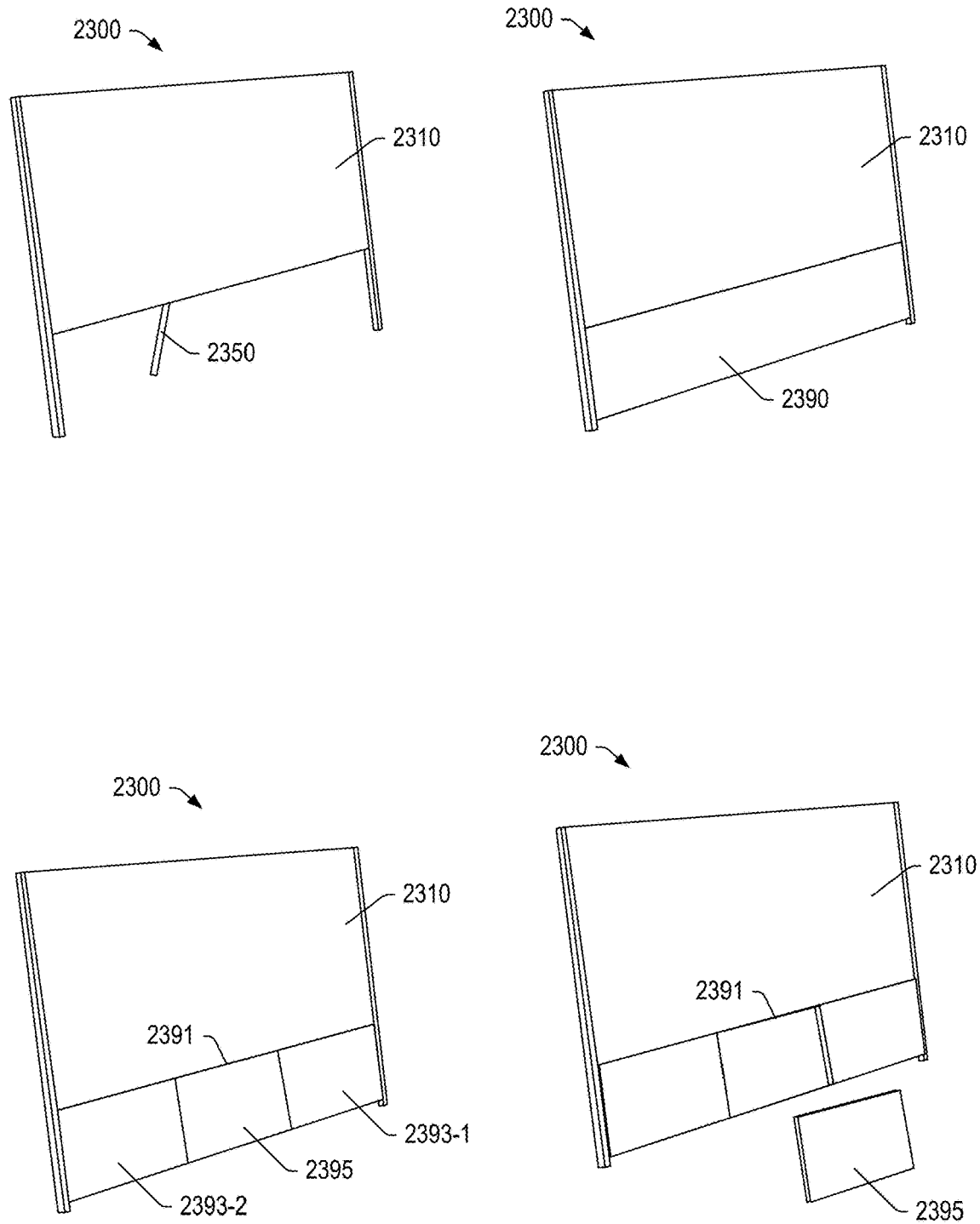
FIG. 23 is a series of views of an example of an assembly.

FIG. 23 shows an example of an assembly 2300 that includes a device 2310 and a stand 2350. As shown, a space exists below the device 2310 and between the front legs of the stand 2350. As shown in FIG. 23, the space can be utilized for one or more purposes. For example, a component 2390 may be received in the space where the component 2390 includes circuitry that can be operatively coupled to circuitry of the device 2310. As an example, the component 2390 can include a recess 2391 or recesses that can receive one or more items. For example, consider a smart phone 2395 being receivable in the recess 2391. As an example, the component 2390 can include items 2393-1 and 2393-2, which may be, for example, left and right speakers.

As an example, the component 2390 may be a computing unit that includes at least one processor, memory, etc. (e.g., consider a gaming computing unit, a workstation computing unit, a thin client computing unit, etc.). As an example, the device 2310 can be or include a display that can be operatively coupled to circuitry of the component 2390. As an example, the recess 2391 may be configured to receive a mobile device such as the smart phone 2395, a tablet, etc.

Figure 24:
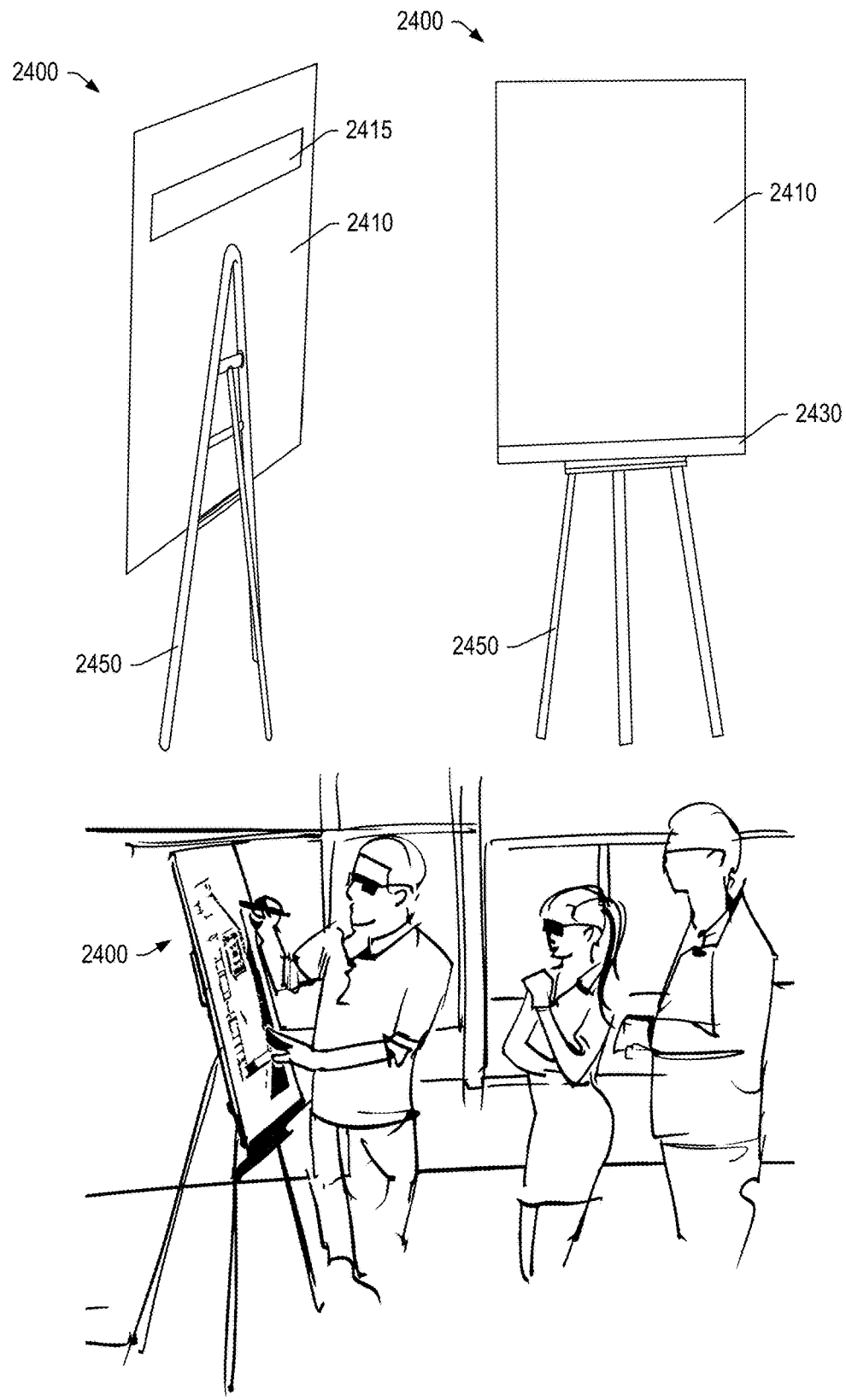
FIG. 24 is a series of views of an example of an assembly.

FIG. 24 shows an example of an assembly 2400 that includes a device 2410 and a stand 2450 where the device 2410 and/or the stand 2450 can include a component 2430 such as a speaker, which may be a wired and/or a wireless speaker, a network interface, which may be a wired and/or a wireless network interface, a thin client, etc. As an example, the assembly 2400 may include a component 2415, which may be an add-on component, an integral component, etc.

Figure 25:
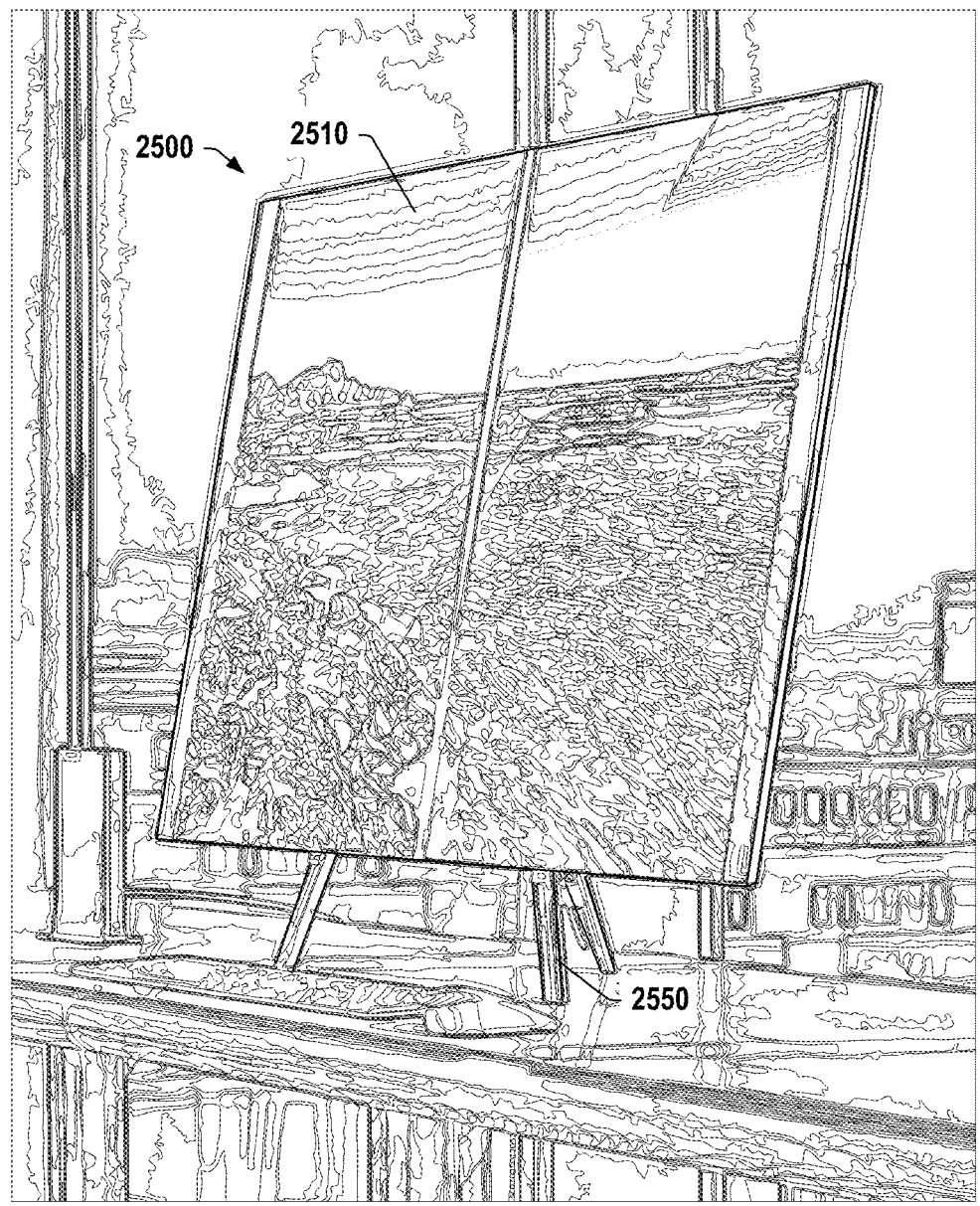
FIG. 25 is a view of an example of an assembly.

FIG. 25 shows an example of an assembly 2500 that includes a device 2510 and a stand 2550 where the device 2510 includes one or more displays. As an example, the device 2510 can be a clamshell device that can be oriented in an open orientation of approximately 180 degrees and positioned on the stand 2550 as positioned on a surface (e.g., a desktop, a tabletop, a countertop, etc.). As shown, the assembly 2500 can provide for a relatively "clean" desktop as the device 2510 may be elevated a distance above the surface. In such an example, a keyboard, a mouse, a stylus, etc., may be positioned underneath the device 2510, in a drawer, on a platform of the stand 2550, etc.

In the example of FIG. 25, the aspect ratio of the two display halves together can be defined by a horizontal dimension and an upright dimension. As an example, the stand 2550 may support the device 2510 in one or more orientations, which may include an orientation where the device 2510 has an angle between two portions such that the device 2510 is not in a planar in orientation. As an example, in a planar orientation, the device 2510 may be oriented in at least one orientation on the stand 2550 such as the orientation shown in FIG. 25. As an example, another orientation may be planar where two portions are an upper portion and a lower portion rather than a left portion and a right portion. As an example, the device 2510 can include one or more hinges, a bendable region or regions, a foldable region or regions, etc.

Figure 26:
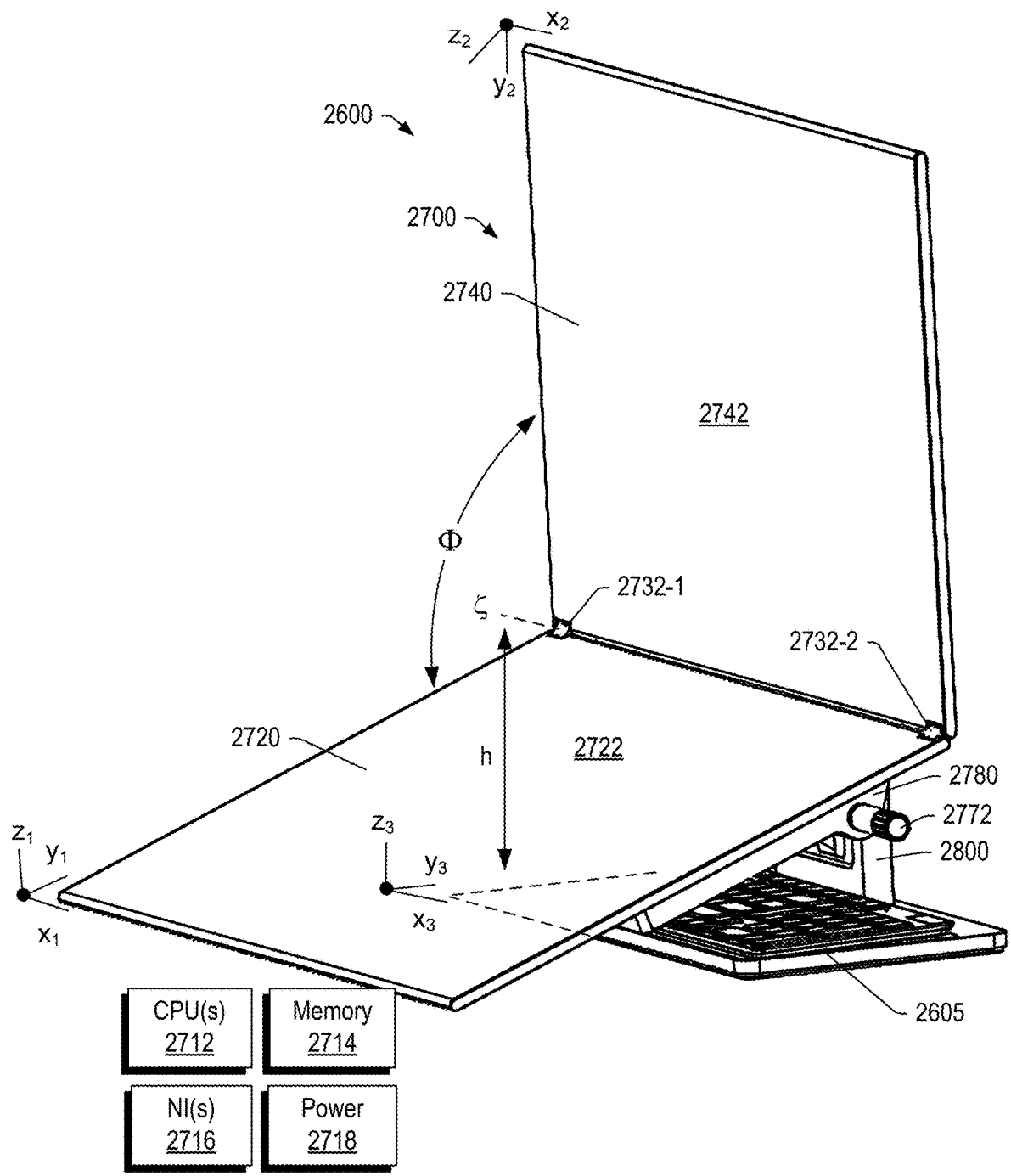
FIG. 26 is a view of an example of an assembly.

FIG. 26 shows an example of an assembly 2600 that includes an optional keyboard 2605, a device 2700 with two portions 2720 and 2740 where each of the two portions 2720 and 2740 includes a respective display surface 2722 and 2742, and a stand 2800 where the device 2600 is at least in part supported by the stand 2800.

As shown, the device 2700 can be described using two coordinate systems and an axis $\zeta$ where an angle $\Phi$ can be defined with respect to the axis $\zeta$ and the two portions 2720 and 2740. As shown, the portion 2720 can be defined via the coordinate system $x_1$, $y_1$ and $z_1$ and the portion 2740 can be defined via the coordinate system $x_2$, $y_2$ and $z_2$. Further, the stand 2800 can be defined via the coordinate system $x_3$, $y_3$ and $z_3$. As shown, a vertical distance h (e.g., aligned with respect to a direction of gravity) can be defined between a lower $x_3,y_3$ plane of the stand 2800 (e.g., or a support surface) and the axis $\zeta$.

The display surfaces 2722 and 2742 may be portions of a single continuous display or may be portions of multiple displays (e.g., two separate displays). For example, the device 2700 may be a bendable or foldable device that includes a region that can define an axis that may be a bending or a folding axis. As an example, the device 2700 can be a clamshell type of device that includes a hinge or hinges 2732-1 and 2732-2 that can define an axis such that the device 2700 can be in one or more open clamshell orientations (e.g., greater than 0 degrees and less than 360 degrees, etc.), a closed clamshell orientation (e.g., approximately 0 degrees) and optionally a tablet orientation (e.g., approximately 360 degrees).

As an example, the distance h may be decreased or increased where the stand 2800 can support at least a portion of a mass of the device 2700. As an example, as the distance h increases, the angle $\Phi$ may increase such that the two portions 2720 and 2740 are increasingly positioned in a common plane (e.g., where the angle $\Phi$ is approximately 180 degrees). For example, the display surfaces 2722 and 2742 may be in a common plane such that the device 2700 appears to have a single, contiguous display surface. In such an example, the display surfaces 2722 and 2742 may be utilized to render a single image; whereas, in the orientation show in the example of FIG. 27, the display surface 2722 may be for one purpose and the display surface 2742 may be for another purpose. In such an example, the display surface 2722 may be for drawing and include a digitizer, which may operate with a stylus and/or one or more other tools that can be handheld and maneuvered to draw, select, etc., content rendered to the display surface 2722, which may be graphical content, image content (e.g., still or video), content of one or more graphical user interfaces, etc.

As to dimensions, the portion 2720 may have a dimension in the $x_1$ direction of approximately 10 cm to approximately 100 cm (e.g., $\Delta x_1$) may have a dimension in the $y_1$ direction of approximately 10 cm to approximately 100 cm (e.g., $\Delta y_1$) and may have a thickness in the $z_1$ direction of approximately 5 mm to approximately 100 mm, depending on configuration as the portion 2720 may include one or more removable components. For example, a portion 2780 of the device 2700 may be detachable and re-attachable from the portion 2780.

As to dimensions, the portion 2740 may have a dimension in the $x_2$ direction of approximately 10 cm to approximately 100 cm (e.g., $\Delta x_2$), may have a dimension in the $y_2$ direction of approximately 10 cm to approximately 100 cm (e.g., $\Delta y_2$) and may have a thickness in the $z_2$ direction of approximately 5 mm to approximately 100 mm. As an example, the planar areas of the portions 2720 and 2740 may be approximately the same such that in a closed clamshell orientation edges of the portions 2720 and 2740 substantially align (e.g., akin to a notebook computer).

As to mass, the device 2700 may have a mass that is greater than approximately 200 grams and less than approximately 40 kilograms. As an example, the portion 2720 may have a greater mass than the portion 2740. As an example, a mass of the portion 2720 may be closer to that of the portion 2740 where the portion 2780 is detachable and detached. As an example, the stand 2800 may have a mass that is greater than approximately 200 grams and less than approximately 40 kilograms.

As an example, the device 2700 can include one or more processors, optionally one or more multi-core processors and one or more displays (e.g., touch, digitizer, etc.) operatively coupled to one or more of the one or more processors.

As an example, the portions 2720 and 2740 in combination may form a display area that can be characterized by a diagonal measurement such as, for example, a diagonal display measurement (e.g., consider a display diagonal in a range from 12 inches (e.g., approximately 30 cm) to 60 inches (e.g., approximately 150 cm)).

As to connectors, the device 2700 can include one or more connectors such as one or more INTEL THUNDERBOLT connectors, USB connectors, audio connectors, video connectors, power connectors, network connectors, etc.

As an example, the device 2700 may be operable in various modes such as a mode that utilizes circuitry of the portion 2780 while attached to the portion 2720, a mode that utilizes circuitry of the portion 2780 while detached from the portion 2720 (e.g., via wired and/or wireless connection), a mode that does not utilize circuitry of the portion 2780 while the portion 2780 is attached to the portion 2720, and a mode that utilizes circuitry of the portion 2780 while the portion 2780 detached from the portion 2720. As an example, with the portion 2780 detached from the portion 2720, the portion 2720 may have a bottom surface that can be relatively flat (e.g., planar) and suitable for supporting the device 2700 without the portion 2780 on a support surface (e.g., a desktop, a tabletop, a countertop, etc.). As an example, the portion 2720 may include one or more feet that extend outwardly a distance from a housing surface of the portion 2720. As an example, the device 2700 may be formed from housings such as, for example, a housing of the portion 2720 and a housing of the portion 2740 where, for example, for the portion 2780 being detachable, it can be formed with a housing (e.g., a housing that detaches and reattaches to the housing of the portion 2720).

As to the keyboard 2605, it is shown as being docked on a portion of the stand 2800 (e.g., sitting on top of a surface of the stand 2800). Such a keyboard may be wired and/or wireless as including circuitry that can be operatively coupled to a processor or processors of the device 2700 and/or operatively coupled to the device 2700 (e.g., consider a thin client or other computing unit supported by the stand 2800, etc.). As an example, a user may re-position the keyboard 2605 in front of the portion 2720 and utilize it for inputting characters, commands, etc., to the device 2700.

As an example, the device 2700 can include one or more processors 2712, memory 2714 (e.g., one or more memory devices), one or more network interfaces 2716, and one or more power cells 2718. Such components may be, for example, housed within one or more of the portions 2720, 2740 and 2780. As mentioned, a thin client type of unit may be operatively coupled to the device 2700. As an example, one or more of the portions 2720, 2740 and 2780 can include thin client circuitry.

As an example, the device 2700 may include one or more input devices such as the input device 2772, which may be detachable and re-attachable, for example, to position it on the right hand side or on the left hand side in the orientation shown in the example of FIG. 26 (e.g., in respective right side and left side connectors). As an example, where the device 2700 can be rotated such that the input device 2772 may be at the top or the bottom and optionally positionable (e.g., detachable and re-attachable). As an example, the input device 2772 may be for navigation of GUIs, etc. (e.g., menus, etc.).

Figure 27:
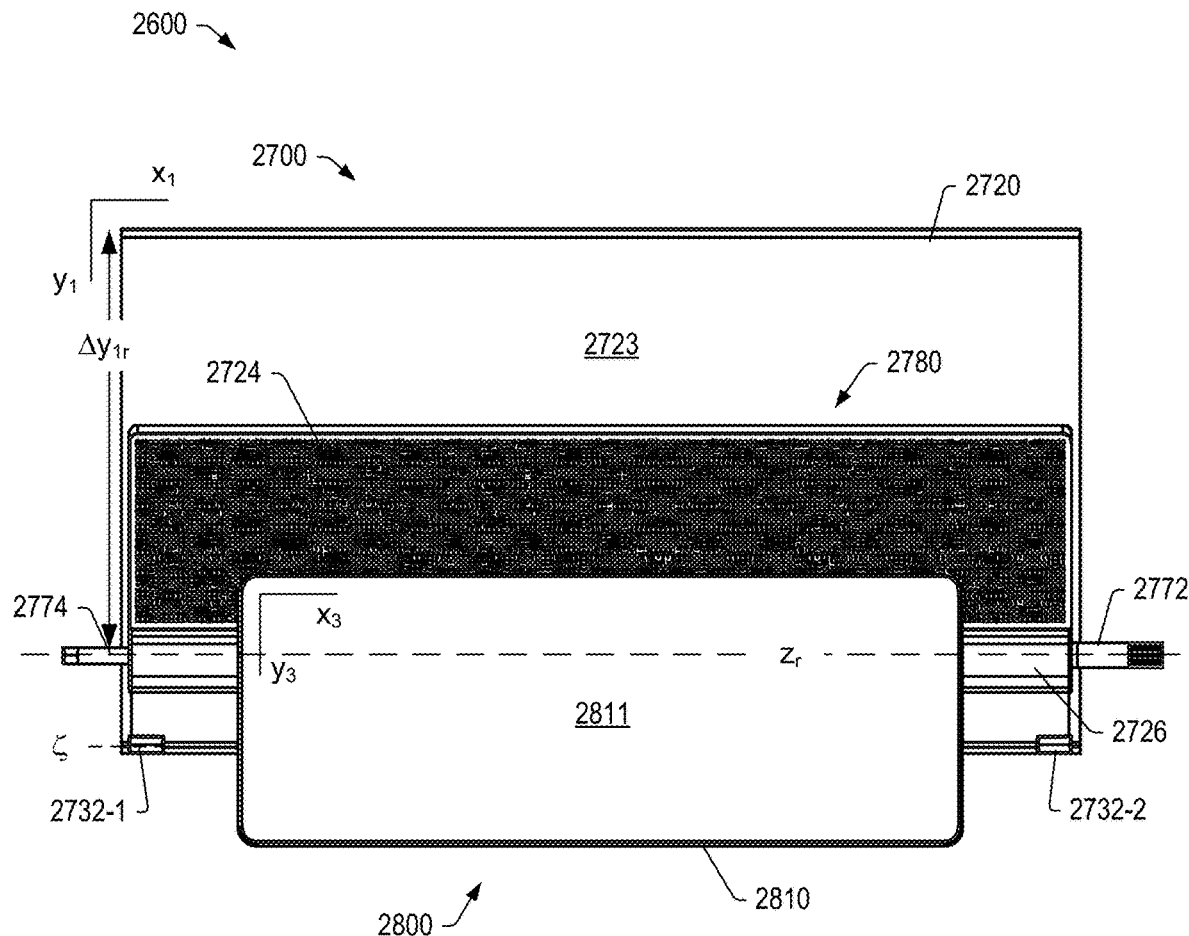
FIG. 27 is a view of an example of an assembly.

FIG. 27 shows a bottom plan view of the assembly 2600 where the device 2700 is operatively coupled to another input device 2774, which may be a stylus or other tool that is detachable and re-attachable (e.g., dockable, etc.). As an example, the device 2700 may include charging circuitry that can charge an input device such as the input device 2774.

In the view of FIG. 27, a back side 2723 of the portion 2720 can be seen, which includes openings 2724 and a ridge 2726. As shown, the ridge 2726 is positioned toward the hinge edge of the portion 2720 such that the ridge 2726 is not at a mid-point along the $y_1$ axis but rather at a distance from a front edge of the portion 2720 that is shown as $\Delta y_{1r}$. By placing the ridge 2726 closer to the hinge edge, the ridge 2726 may be utilized as a support to support the device 2700 without the stand 2800 where, for example, the ridge 2726 contacts a support surface (e.g., a desktop, a tabletop, a countertop, etc.), which may place the portion 2720 at an angle that is ergonomic for purposes of drawing, etc. As shown in the example of FIG. 27, the ridge 2726 is spaced a distance from the hinge edge of the portion 2720.

In the example of FIG. 27, the openings 2724 may be for one or more of heat transfer, sound transfer (e.g., speaker or speakers), etc. For example, the openings 2724 may be vent openings for movement of air by a fan in the portion 2780 and/or speaker grill openings for movement of air by a speaker in the portion 2780. As mentioned, the portion 2720 may be an assembly that includes multiple pieces, for example, consider an assembly where the ridge 2726 is part of the portion 2780 of the device 2700 that can be attached and detached from the portion 2720. FIG. 27 also shows the ridge 2726 as being defined in part by a ridge axis $z_r$, which may be an axis that is aligned with an axis of the input device 2772 and an axis of the input device 2774. As an example, the ridge 2726 may be defined via one or more radii defined with respect to the axis $z_r$.

As an example, the portion 2780 may include one or more types of circuitry. For example, consider one or more processors, memory, network interface(s), power (e.g., a battery or batteries), etc. As an example, the portion 2780 may provide for graphics processing and include, for example, one or more graphics processors (e.g., GPUs, etc.). As an example, the portion 2780 may be configured according to processing power, memory, graphics capabilities, etc. As an example, the device 2700 may be configured in a manner via selection of circuitry for the portion 2780. In such an example, the portions 2720 and 2740 may be suitable for use with one or more configurations of circuitry of the portion 2780. As an example, the portions 2720 and 2740 may be without processors and rely on one or more processors of the portion 2780. As an example, the portions 2720 and 2740 may differ in size, dimensions, capabilities such that the device 2700 is configurable via selection of the portion 2720, the portion 2740 and the portion 2780 (e.g., for particular types of applications such as video applications, CAD applications, music applications, etc.). In such an example, the device 2700 can be of a desired computational and display configuration that is suitable for use with the stand 2800 as an assembly.

In the view of FIG. 27, the stand 2800 is shown as including a base 2810 that includes a bottom surface 2811, which may include one or more feet (e.g., pads, etc.). As shown, the area or footprint of the bottom surface 2811 of the base 2810 of the stand 2800 is less than the area of the portion 2720 of the device 2700. As shown in FIG. 26, the area of the base 2810 on an upper side can be sufficient to support the keyboard 2605. As an example, the base 2810 can be a charging platform with charging circuitry that can be utilized to charge one or more devices such as a keyboard, a mouse, a smart phone, a tablet, etc. As an example, the stand 2800 may include circuitry such as power circuitry (e.g., wired and/or wireless power circuitry).

As shown in FIG. 26, with reference to FIG. 27, the base component 2810 is predominantly underneath the portion 2720 of the device 2700. The base component 2810 can be sized, shaped and of a mass that is suitable for stability of the device 2700 in various orientations.

Figure 28:
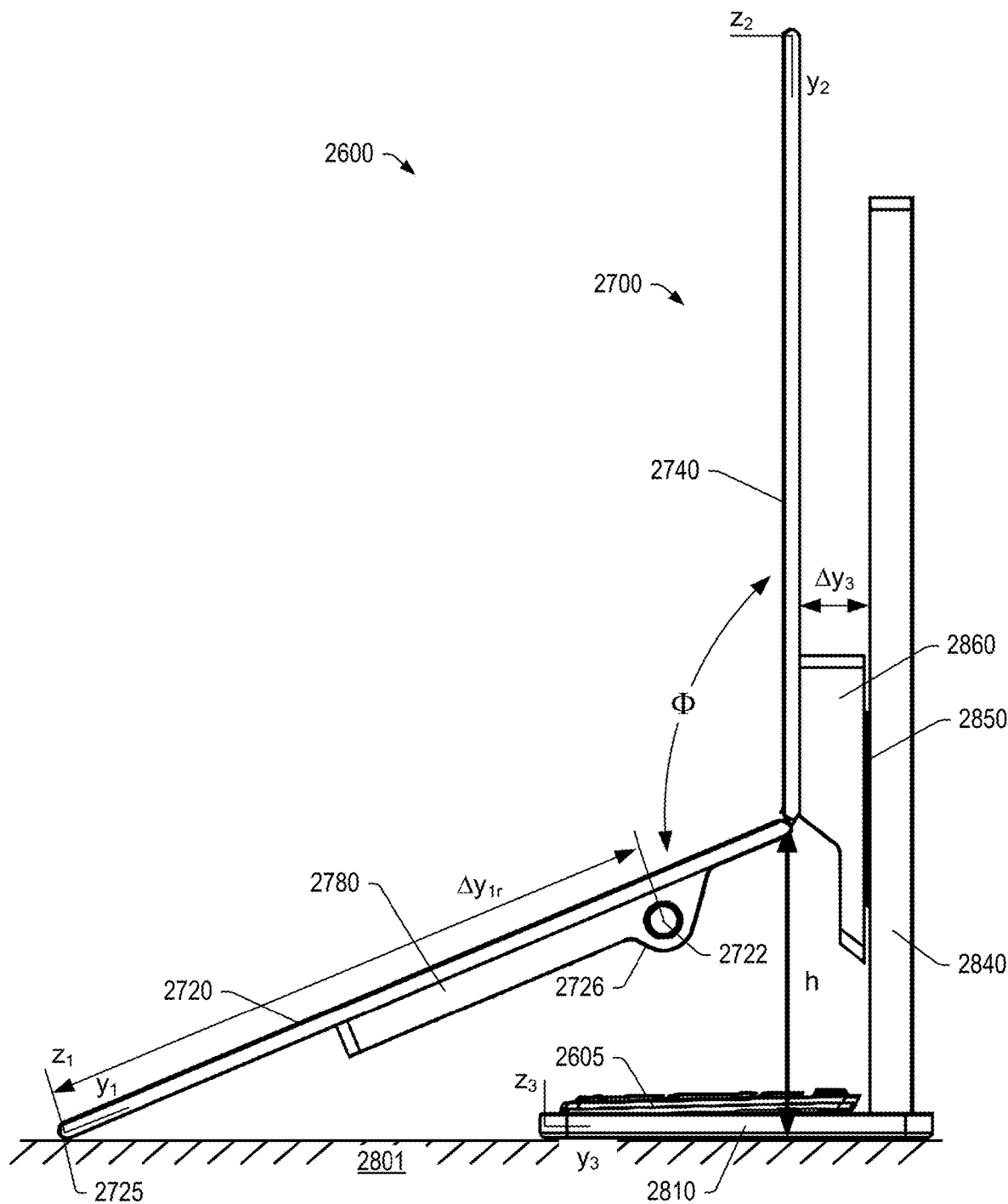
FIG. 28 is a view of an example of an assembly.

FIG. 28 shows a side view of the assembly 2600 where the portion 2720 of the device 2700 may be supported on a common support surface 2801 as the base 2810 of the stand 2800. As shown, space exists below the portion 2720 for storage of the keyboard 2605 on the base 2810 (e.g., an upper surface or platform of the base 2810). In the example of FIG. 28, the portion 2720 includes a front edge 2725, which includes a contact surface that contacts the support surface 2801.

In the example of FIG. 28, the stand 2800 is shown as including an upright 2840 that is operatively coupled to a turntable 2850 that is operatively coupled to a coupling 2860 that is operatively coupled to the device 2700. As an example, the turntable 2850 and the coupling 2860 may be translated up and down along the upright 2840 of the stand 2800 while the device 2700 is operatively coupled thereto such that the angle $\Phi$ between the portions 2720 and 2740 of the device 2700 may be adjusted. As mentioned, the axis $\zeta$ may define a vertical distance h, as shown in FIG. 28. As an example, the stand 2800 may have a minimum h (e.g., $h_{min}$) and a maximum h (e.g., $h_{max}$). In such an example, the angle $\Phi$ may be at a minimum for $h_{min}$ and at a maximum for $h_{max}$ where the axis $\zeta$ is horizontal. As an example, the coupling 2860 can be an adjustable coupling that is adjustable to support a device (e.g., the device 2700) in at least two different orientations.

As mentioned, the stand 2800 can include the turntable 2850, which may be rotatable at least 90 degrees (e.g., clockwise and/or counter-clockwise). In such an example, the device 2700 may be rotated such that the axis $\zeta$ has a vertical component that is normal to the base 2810 of the stand 2800.

As explained, the stand 2800 can include the coupling 2860 as a translatable coupling and the turntable 2850 as a rotatable component such that the device 2700 can be adjusted and/or transitioned from one orientation to another orientation. As an example, the device 2700 may be detachable from the stand 2800 and re-attachable to the stand 2800. In such an example, the device 2700 may or may not include one or more of the turntable 2850 and the coupling 2860.

Figure 29:
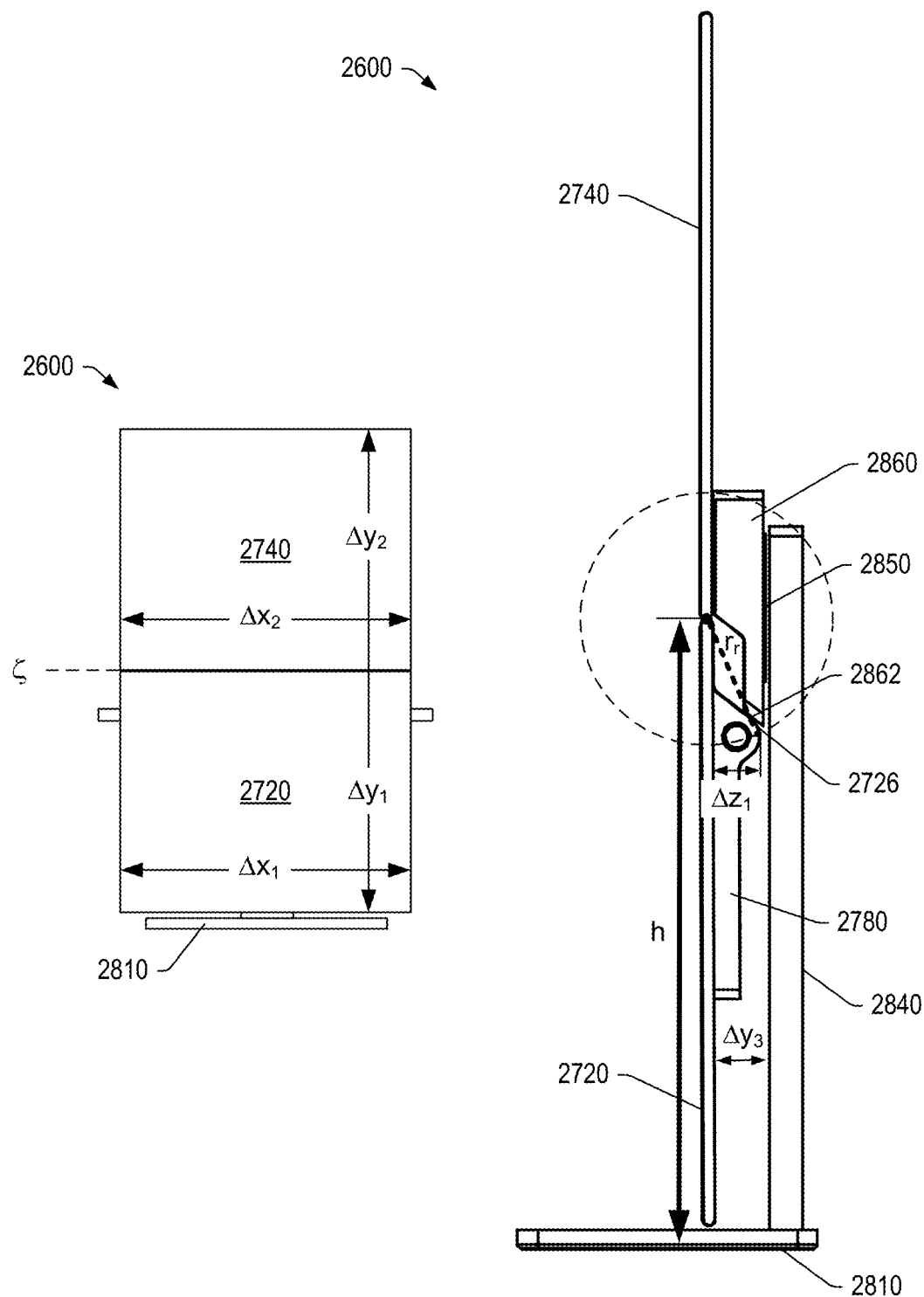
FIG. 29 is a view of an example of an assembly.

FIG. 29 shows a front view and a side view of an example of the assembly 2600 where the axis $\zeta$ is oriented horizontally and parallel to the base 2810 and where h may be at $h_{max}$ such that the portions 2720 and 2740 of the device 2700 are in a common plane. As shown, the dimensions $\Delta x_1$ and $\Delta x_2$ and hence axes $x_1$ and $x_2$ are horizontal and parallel to the base 2810 while the axes $y_1$ and $y_2$ are vertical. In the example of FIG. 29, the device 2700 can have a display area $\Delta x_1$ (or $\Delta x_2$) by the sum of $\Delta y_1$ and $\Delta y_2$. Such a display area may be characterized by a diagonal measurement. In the example of FIG. 29, the display area may be characterized as being a portrait display area as the height is greater than the width.

As shown in the example of FIG. 29, the ridge 2726 of the portion 2720 (e.g., the portion 2780 of the portion 2720) can be limited by a surface 2862 (e.g., or surfaces) of the coupling 2860, which may help to provide for stability and a reproducible angle of the portion 2720 with respect to the stand 2800, for example, such that the portion 2720 is normal to the base 2810 of the stand 2800 (e.g., or a support surface that supports the base 2810). In such an example, the portion 2740 may be substantially vertical due to its connection to the coupling 2860 and the portion 2720 may be limited and/or, by gravity, move into a substantially vertical orientation such that the two portions 2720 and 2740 are in a common plane. In such an example, the display surfaces 2722 and 2742 may be divided along the axis $\zeta$. As an example, the coupling 2860 may be translatable in a manner whereby at least a portion of the mass of the device 2700 is supported by contact of an edge of the portion 2720 with an upper surface of the base 2810 of the stand 2800. As an example, there may be a gap between the edge of the portion 2720 of the device and the upper surface of the base 2810 of the stand 2800 when h is at $h_{max}$, which may facilitate transitioning the device 2700 from the orientation shown to another orientation. As an example, such a gap may be sufficient to rotate the device 2700 from the orientation shown in the example of FIG. 29 by 90 degrees.

As shown in the example of FIG. 29, the ridge 2726 can be defined by a radius $r_r$ about the axis $\zeta$ and a gap labeled $\Delta y_3$ can exist between a back side of the portion 2720 and a front side of the upright 2840, where the gap is measured at a height that is below the portion 2780. As shown, the ridge 2726 of the portion 2780 can have a dimension $\Delta z_1$, which may be measured from a back side of the portion 2720. As shown in the example of FIG. 29, $\Delta z_1$ is less than $\Delta y_3$. As mentioned, the ridge 2726 can be at a distance $\Delta y_{1r}$ from a front edge of the portion 2720 and, as shown, a distance $r_r$ from a hinge edge of the portion 2720. Such an arrangement can provide for using the ridge 2726 as a stop with respect to the stand 2800 and for using the ridge 2726 as a support to angle the portion 2720 on a support surface, which can be without use of the stand 2800. As explained, the ridge 2726 can also be utilized for support of one or more tools (e.g., input devices, etc.), where the position of the ridge 2726 allows for space (e.g., a gap) between a tool (e.g., an input device) and a support surface such that a user's hand can access the tool where the ridge 2726 is utilized to support the portion 2720 on a support surface. As shown in the example of FIG. 29, a surface of the ridge 2726 can contact the surface 2862 of the coupling 2860 at an angle that can be measured with respect to the vertical position of the portion 2720. For example, where the portion 2720 forms an approximately 180 degree angle with respect to the portion 2740, the contact point (or contact area) between the ridge 2726 and the surface 2862 can be at an angle greater than 180 degrees. As shown, contact may be along sloped surfaces and limit rotation of the portion 2720 about the axis ζ.

Figure 30:
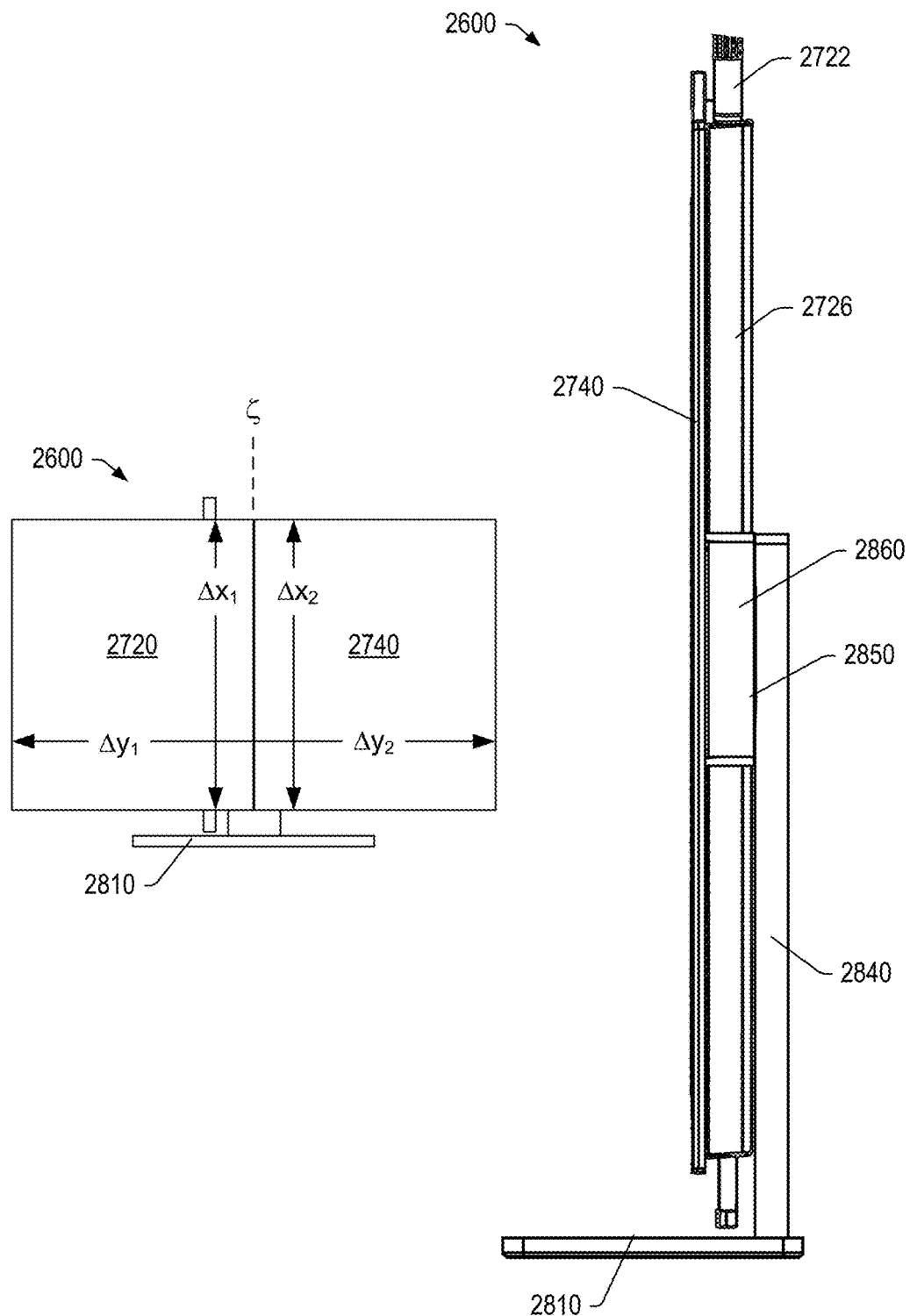
FIG. 30 is a view of an example of an assembly.

FIG. 30 shows a front view and a side view of an example of the assembly 2600 where the axis ζ is oriented vertically and normal to the base 2810 (e.g., normal to a support surface on which the base 2810 of the stand 2800 is supported). In such an example, the display surfaces 2722 and 2742 may be in a common plane where they are divided by the axis ζ (e.g., running vertically). As an example, one or more of the portions 2720 and/or 2740 may be angled in (e.g., the angle Φ at less than 180 degrees) such as a book orientation where the book is not flat.

As shown, the dimensions $\Delta y_1$ and $\Delta y_2$ and hence axes $y_1$ and $y_2$ are horizontal and parallel to the base 2810 while the axes $x_1$ and $x_2$ are vertical. In the example of FIG. 30, the device 2700 can have a display area $\Delta x_1$ (or $\Delta x_2$) by the sum of $\Delta y_1$ and $\Delta y_2$. Such a display area may be characterized by a diagonal measurement. In the example of FIG. 30, the display area may be characterized as being a landscape display area as the width is greater than the height.

As shown in the example orientation of FIG. 29, when both display surfaces 2722 and 2742 are rotated, the ridge 2726 contacts the surface 2862 to prevent the display surface 2722 from forming the angle Φ at more than 180 degrees with respect to the display surface 2742. Such contact may be utilized in the orientation of FIG. 29 or in the example orientation of FIG. 30.

Figure 31:
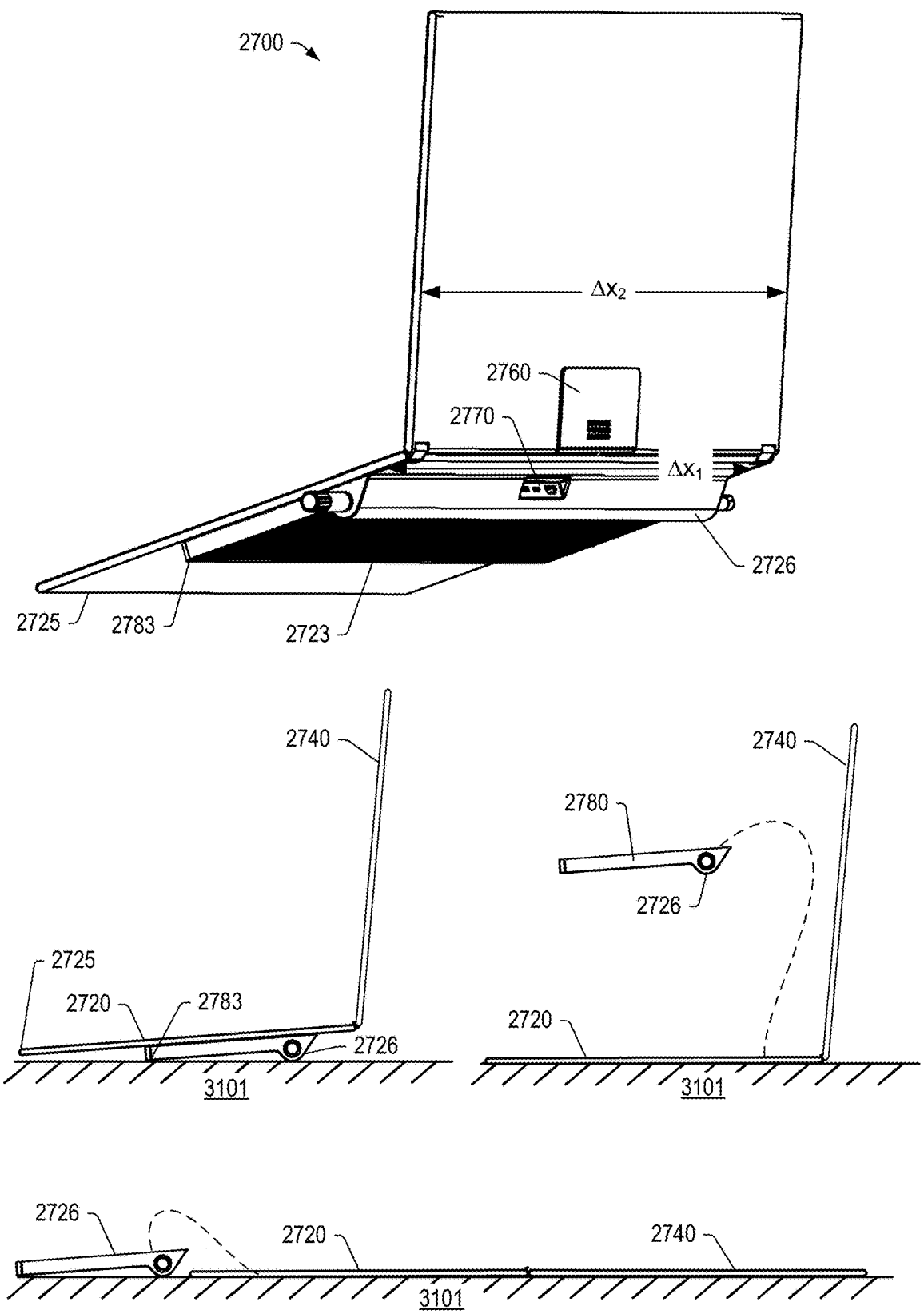
FIG. 31 is a series of views of an example of a device in various example orientations.

FIG. 31 shows a perspective view of the device 2700 as including a coupling 2760 and various connectors 2770 and a series of side views of the device 2700 in various orientations where the portion 2780 of the device 2700 that includes the ridge 2726 is detachable and re-attachable. For example, the portion 2780 can be detachable from the portion 2720 and may be operatively coupled electronically to the portion 2720 and/or the portion 2740 via one or more wired connections, one or more wireless connections, etc. For example, upon detaching the portion 2780, a cable may be exposed where one end of the cable is connected to the portion 2720 and where another end of the cable is connected to the portion 2780. In such an example, the cable may be of a length that may be in a range from approximately 5 cm to approximately 100 cm or more. In such an example, the portion 2780 can be set aside from the portions 2720 and 2780, which may be oriented with respect to each other in various orientations, which can include a planar orientation. For example, with the portion 2780 detached from the portion 2720, the portions 2720 and 2740 may be oriented with an angle of approximately 180 degrees (e.g., Φ~180 degrees) such that the portions 2720 and 2740 are in a common plane (e.g., a planar orientation). As an example, one or more of the portions 2720 and 2740 can include wireless circuitry where the portion 2780 includes wireless circuitry where the portion 2780 may communicate information to one or more of the portions 2720 and 2740 that can be rendered to the display surface 2722 and/or the display surface 2742. As an example, the portions 2720 and 2740 may be operatively coupled electronically, for example, via one or more wires, electrical contacts, etc. As an example, the portions 2720 and 2740 may be operatively coupled wirelessly for communication of data and/or power.

As an example, the portions 2720 and 2740 without the portion 2780 may be suitable for lying flat on a desktop, tabletop, countertop, etc., and/or for hanging on a wall and/or being supported on a shelf (e.g., a wall shelf, a cabinet shelf, etc.). In the planar orientation, the portions 2720 and 2740 may be separated by a joint while providing a viewing experience akin to that of a continuous display. For example, consider placing the portions 2720 and 2740 on a shelf and using them as a television, a monitor, etc. In such an example, the joint may be oriented vertically or horizontally. As an example, one or more of the hinges 2732-1 and 2732-2 may provide for locking the portions 2720 and 2740 in a planar orientation, which, as explained, in an assembled state with the stand 2800 and the portion 2780, the ridge 2726 can act as a limiter as to a planar orientation. As an example, one or more of the hinges 2732-1 and 2732-2 may include a locking component that can be utilized to lock and unlock the portions 2720 and 2740 in a planar orientation.

As shown in the perspective view, as an example, the coupling 2760 as disposed along a backside of the ridge 2726 of the portion 2780 may include one or more electrical connectors, optical connectors, etc. In such an example, the coupling 2860 of the stand 2800 may include one or more mating connectors such that one or more connections can be made between the device 2700 and the stand 2800. As to the various connectors 2770, these may include one or more cable type connectors where, for example, a cable may be routed using one or more features of the stand 2800. In the example of FIG. 31, the couplings 2760 and 2770 are positioned centrally along a midpoint of the dimension $\Delta x_1$ of the portion 2720 (e.g., or the portion 2780) and centrally along a midpoint of the dimension $\Delta x_2$ of the portion 2740. Such an arrangement can be utilized for connection of the device 2700 to the stand 2800 via the coupling 2760, which may optionally include one or more electrical and/or optical connectors (e.g., power, data, etc.), and, for example, routing of one or more cables substantially centrally along the upright 2840 of the stand 2800, which can include one or more cable management features.

As mentioned, where the portion 2780 is detachable, it may be operatively coupled to one or more of the portions 2720 and 2740. In such an example, the portion 2780 may be operatively coupled to one or more of the portions 2720 and 2740, and/or one or more other components via one or more of the connectors 2770.

As an example, the coupling 2760 may include one or more magnetic materials and the coupling 2860 of the stand 2800 may include one or more magnetic materials such that magnetic attraction force may be utilized to operatively coupled the device 2700 to the stand 2800. As an example, one or more magnets may be utilized to align one or more connectors (e.g., pogo-pins, contact surfaces, etc.) such that one or more connections are reliability made.

As an example, the ridge 2726 of the portion 2780 can be a support surface. For example, where the device 2700 is utilized without the stand 2800, the ridge 2726 may contact a support surface 3101 (e.g., a desktop, a tabletop, a countertop, etc.) and cause the portion 2720 of the device 2700 to be at an angle with respect to the support surface 3101. In such an example, the angle may be an ergonomic angle that is suitable for drawing, typing using a display rendered keyboard to at least a portion of the display surface 2722, etc.

As an example, the portion 2780 may include a front edge 2782 that can contact the support surface 3101 and/or, for example, the portion 2720 may include the front edge 2725 as a contact surface that can contact the support surface 3101 (see, e.g., FIG. 28).

As shown in FIG. 31, where the front edge 2783 of the portion 2780 is utilized to support the device 2700 on the support surface 3101, a space is defined between the portion 2780 and the support surface 3101, which can be defined in part by the ridge 2726. The space may be substantially wedge shaped and provide for flow of air, which may be for cooling of one or more electrical components in the portion 2780 and/or for sound transmission where the portion 2780 includes one or more speakers.

As shown in FIG. 31, a triangle may be defined by the front edge 2725 of the portion 2720, the axis $\zeta$ and a peak of the ridge 2726 (see, e.g., $\Delta z_1$ of FIG. 29). As an example, a tilt angle defined in part by the ridge 2726 may be greater than approximately 3 degrees and less than approximately 30 degrees. As an example, a tilt angle defined in part by the ridge 2726 may be greater than approximately 3 degrees and less than approximately 18 degrees. As an example, a tilt angle defined in part by the ridge 2726 may be greater than approximately 3 degrees and less than approximately 12 degrees.

As an example, the coupling 2860 can include a coupling surface that mates with the coupling 2760 of the device 2700 where a distance between the coupling surface and a surface of the upright 2840 is greater than a peak distance of the ridge 2726. For example, in the orientation of FIG. 28, a dimension $\Delta y_3$ is illustrated, which is also shown in the orientation of FIG. 29, where the coupling 2860 has a dimension that is approximately equal to the dimension of the ridge 2726 such that the ridge 2726 is space away from the upright 2840 to form a gap. In the example orientation of FIG. 29, the ridge 2726 and the surface 2862 of the coupling 2860 contact at an angle of approximately 45 degrees. As an example, one or more surfaces may be rubberized or otherwise elastomeric such that shock, vibration, etc., are reduced when the ridge 2726 contacts the coupling 2862. For example, the ridge 2726 may include an elastomeric material that can be comfortable for a hand to grid, reduce shock and be slide-resistant. As to gripping, in a closed clamshell orientation of the device 2700, a user's hand may contact the ridge 2726 in an ergonomic and comfortable/anti-slip manner; in the assembly 2600, the ridge 2726 may contact the stand 2800 to provide stability, reduce shock and/or vibration; and in a surface supported orientation of the device 2700 without the stand 2800, the ridge 2726 may contact a desktop, a tabletop, a countertop, etc., to reduce risk of sliding.

Figure 32:
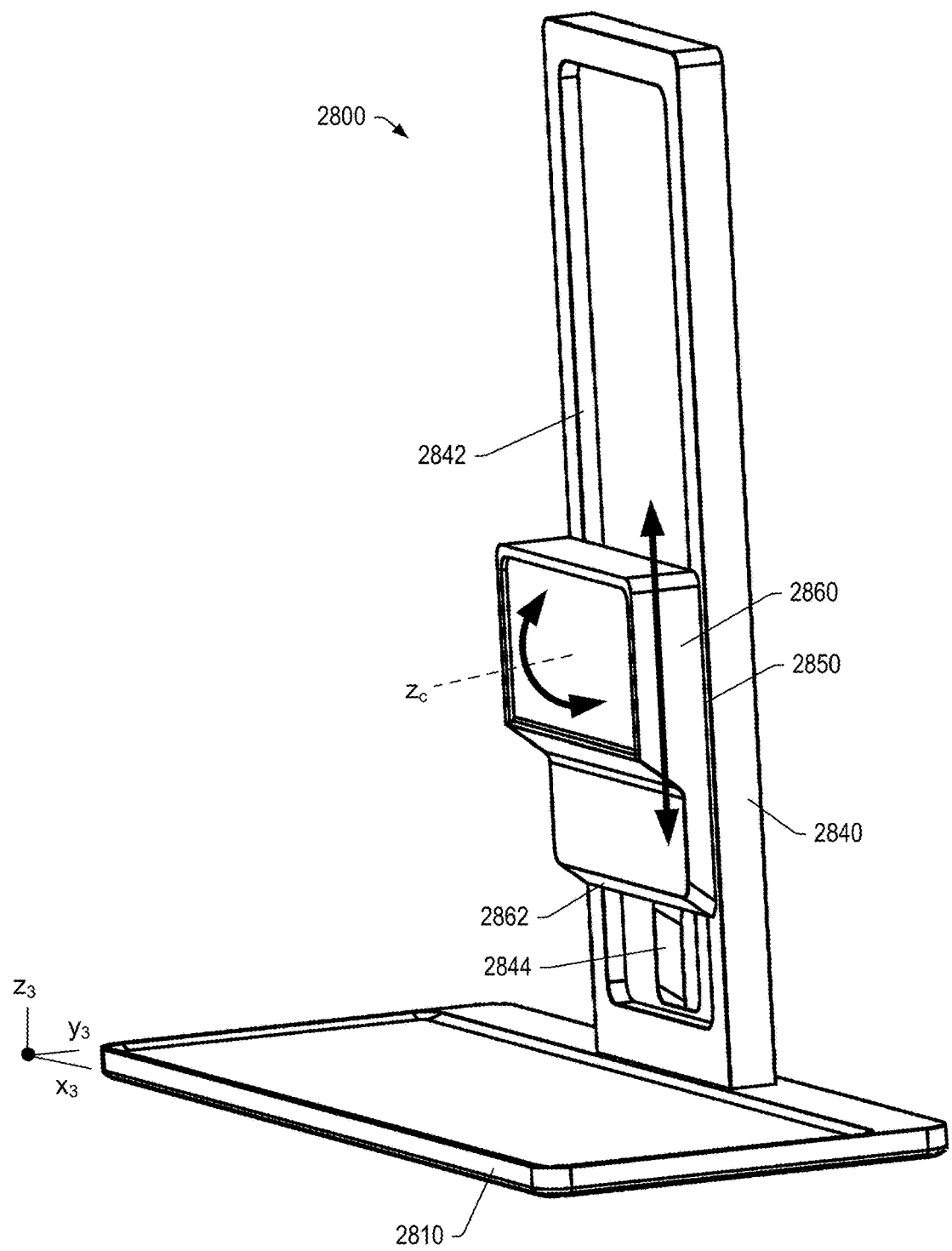
FIG. 32 is a view of an example of a stand.

FIG. 32 shows a perspective view of the stand 2800 where the upright 2840 is shown as including a track 2842 for movement of the turntable 2850 and the coupling 2860 (e.g., translation up and down) and an opening 2844 as a cable management feature that can receive one or more cables as may be connected to the device 2700 (e.g., via one or more of the various connectors 2770). In FIG. 32, a surface 2862 is shown along a lower portion of the coupling 2860, which may be a support surface that can contact the ridge 2726 of the portion 2720 of the device 2700 (see, e.g., the orientation of FIG. 29). FIG. 32 also shows a straight line with arrows that indicates directions of translation (up and down) of the coupling 2860 as well as an arc with arrows that indicates directions of rotation (e.g., clockwise and counter-clockwise) of the coupling 2860 about an axis $z_c$, which can be an axis of rotation of the turntable 2850.

The Cartesian coordinate system $x_3$, $y_3$ and $z_3$ is shown in FIG. 32, which may be utilized to define dimensions of the base 2810, the upright 2840, the turntable 2850, the coupling 2860, the opening 2844 (e.g., cable passage in the upright 2840), etc. As mentioned, the base 2810 can be shaped and sized to support a keyboard such as the keyboard 2605 of FIG. 26. As mentioned, the coupling 2860 (e.g., via the turntable 2850) may be limited in its lower position along the upright 2840 such that it does not completely cover the opening 2844 and/or such that it provides for sufficient space below the portion 2720 of the device (e.g., with the portion 2780) for a keyboard to be positioned on the base 2810, which can be removed for use and replaced for storage.

Figure 33:
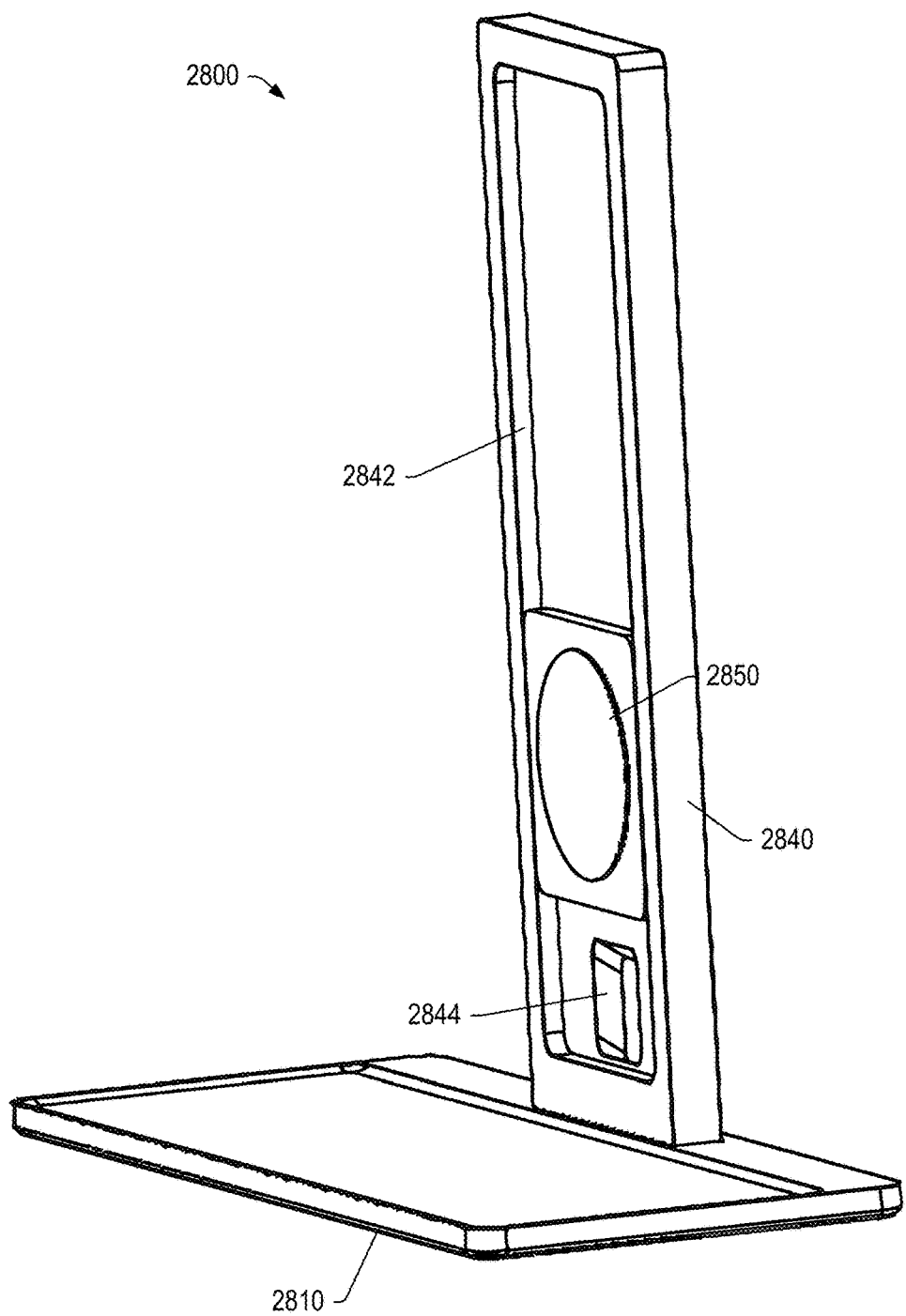
FIG. 33 is a view of an example of a stand.

FIG. 33 shows a perspective view of the stand 2800 without the coupling 2860 such that the turntable 2850 is received in the track 2842 of the upright 2840 of the stand, which may be an interference fit connection, a lockable connection, etc., such that the turntable 2850 may be securely positioned at a vertical position along the track 2842 to support at least a portion of the mass of a device such as the device 2700 (e.g., along with the coupling 2860).

Figure 34:
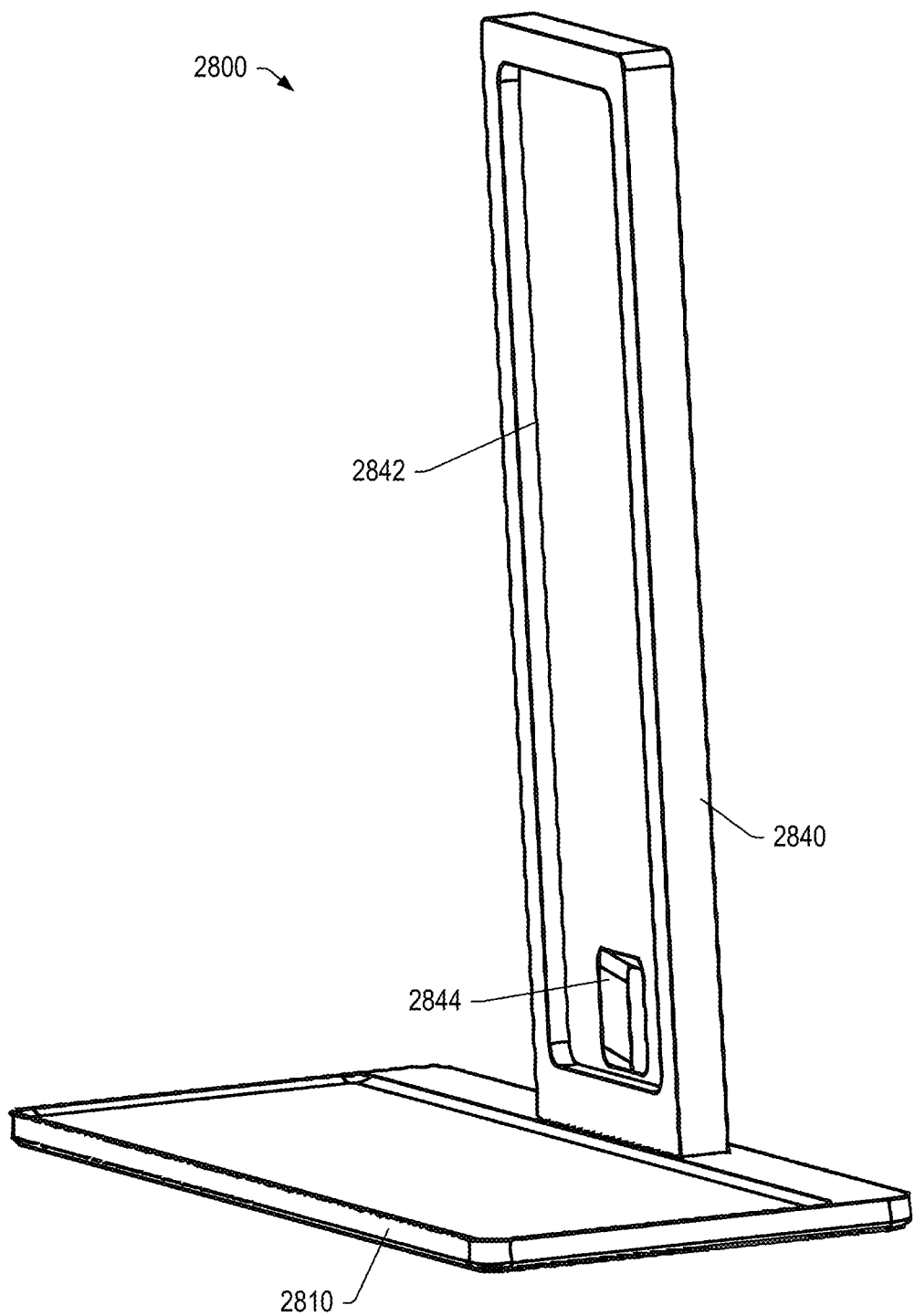
FIG. 34 is a view of an example of a stand.

FIG. 34 shows a perspective view of the stand 2800 without the turntable 2850, such that the track 2842 is visible as running from a lower position to an upper position in which the turntable 2850 is translatable; noting that the lower position may be limited where one or more cables are running through the opening 2844. For example, the track 2842 can include one or more edges that prevent the turntable 2850 from translation to a position where the coupling 2860 would act as a guillotine to damage one or more cables. In such an example, a gap can exist that is sufficient for passage of one or more cables through the opening 2844 where the lower surface 2862 of the coupling 2860 may not pinch the one or more cables.

As an example, the input device 2722 may be a pop-out device such that in a particular orientation the input device 2722 pops out along an axis. Such an input device may include a mechanism akin to a push button of ball-point pen. As an example, when the angle $\Phi$ reaches a particular trigger angle, the input device 2722 may translate outwardly to a position as shown.

As an example, an assembly can include a rectangular device that includes an x dimension, a y dimension and a display; and a stand that supports the rectangular device in different orientations, where the different orientations include a horizontal orientation of the x dimension and a horizontal orientation of the y dimension, where the stand includes an adjustable coupling that physically supports at least a portion of a mass of the rectangular device in the horizontal orientation of the x dimension and that physically supports at least a portion of a mass of the rectangular device in the horizontal orientation of the y dimension. In such an example, the rectangular device can be foldable along the y dimension. For example, the display of the rectangular device may be a continuous flexible display that spans at least 80 percent of the x dimension and at least 80 percent of the y dimension such that upon folding of the rectangular device along the y dimension, the continuous flexible display is also folded. In such an example, the continuous flexible display may be a bendable display and the rectangular device can include a foldable or bendable single housing or housing portions that are coupled via a foldable or bendable region, which may utilize one or more types of hinges and/or one or more types of elastomeric materials. In the example of FIG. 26, the device 2700 includes two portions 2720 and 2740 that are foldable along a y dimension (e.g., as defined by $y_1$ and $y_2$). In the example of FIG. 13, the device 1310 includes a continuous flexible display where the device 1310 includes a housing that is foldable along the y dimension (e.g., such that a line along the y dimension becomes curved).

As an example, a stand can include a track where an adjustable coupling is translatable via the track. As an example, a stand can include a series of openings where an adjustable coupling is adjustable via the series of openings.

As an example, an adjustable coupling can include an axis of rotation where the adjustable coupling is rotatable about the axis of rotation to transition a rectangular device from a horizontal orientation of an x dimension to a horizontal orientation of a y dimension.

As an example, an adjustable coupling can be translatable and rotatable. For example, consider a turntable that is translatable in a track of a stand where a coupling is fit to the turntable or a part thereof. In such an example, the coupling is adjustable via the track and the turntable such that it is both translatable and rotatable.

As an example, a stand can be a tripod stand. For example, consider a tripod stand that includes three legs where two of the three legs are formed from a unitary component. In such an example, the unitary component may be tubular in shape and bendable to have a form suitable for supporting a rectangular device on a support surface.

As an example, a stand can include a base and an upright, where an adjustable coupling is translatable along at least a portion of the upright and where the adjustable coupling is rotatable to transition a rectangular device from a horizontal orientation of an x dimension to a horizontal orientation of a y dimension. In such an example, horizontal may be parallel to a support surface (e.g., a desktop, a tabletop, a countertop, etc.).

As an example, an adjustable coupling can include a magnetic material and a rectangular device can include a magnetic material, where the rectangular device couples to the stand via a magnetic attraction force. For example, the rectangular device can include one or more magnets and/or the adjustable coupling can include one or more magnets such that a magnetic force can attract the rectangular device and the adjustable coupling in a manner that securely couples the rectangular device to the adjustable coupling in various orientations of the rectangular device with respect to gravity.

As an example, a rectangular device can include a first portion and a second portion operatively coupled by one or more hinges, where the first portion includes a first display surface, where the second portion includes a second display surface, and where the first portion includes a ridge on a side opposite the first display surface. In such an example, a surface of the ridge can contacts a surface of an adjustable coupling to limit at least one planar orientation of the first display surface and the second display surface to 180 degrees, where, for example, the at least one planar orientation includes a horizontal orientation of an x dimension and a horizontal orientation of the y dimension.

As an example, an adjustable coupling can include a locking component that includes threads rotatable about an axis of rotation. For example, upon rotation, the threads can mate with matching threads of another component to cause a clamping force to be applied that can secure an orientation of a rectangular device coupled to the adjustable coupling.

As an example, a stand can include circuitry. For example, consider a stand that includes one or more of a power connector, a data connector and a power and data connector.

As an example, an assembly can include a thin client. In such an example, a stand can physically support the thin client and, for example, a rectangular device can be operatively coupled to the thin client. As an example, a portion of a rectangular device can be operatively coupled to a thin client. For example, in FIG. 28, the portion 2780 may be a thin client that is operatively coupled to the portion 2720 of the device 2700. As mentioned, the portion 2780 may be removable from the portion 2720, for example, as shown in FIG. 31. In a removed state, the portion 2780 may be operatively coupled electronically to the portion 2720, for example, via wire and/or wireless circuitry. For example, a cable, BLUETOOTH, WIFI, etc., may be utilized such that communication of data can occur between the portion 2720 and/or the portion 2740 and the portion 2780. As an example, the portion 2780 may include a battery or batteries (e.g., lithium, etc.), that can provide power for operation of one or more of the portions 2720 and 2740 (e.g., via a cable, via connectors, etc.).

As an example, an assembly can include a keyboard and a stand can include a keyboard platform and wireless charging circuitry for the keyboard. In such an example, consider a base of the stand as including the keyboard platform where the stand can support a rectangular device in various orientations where in at least some of the orientations the keyboard is storable on the keyboard platform.

As an example, a rectangular device can be of a clamshell configuration that is transitionable between open and closed orientations. For example, in FIG. 31, the device 2700 can be transitionable between a closed orientation of approximately 0 degrees and the open orientation as shown, which is approximately 180 degrees.

As an example, a rectangular device can include a smart phone recess. In such an example, the smart phone recess may be suitable for positioning a smart phone in one or more orientations. For example, consider a closed orientation where the smart phone is in a substantially planar orientation with at least a portion of the rectangular device and, for example, a tilted orientation, where the smart phone is disposed at an angle to a plane of a portion of the rectangular device.

As an example, an assembly can include a rectangular device that includes a maximum length dimension, a maximum width dimension, and a display; and a stand that supports the rectangular device in different orientations, where the different orientations include a lengthwise horizontal orientation and a lengthwise vertical orientation, where the stand includes an adjustable member. In such an example, the stand can include a base, a leg, legs, etc. For example, consider three legs, where two of the three legs define a plane, where another of the three legs forms an angle with respect to the plane, and where the adjustable member is operatively coupled to the two of the three legs to physically support at least a portion of a mass of the rectangular device in the lengthwise horizontal orientation and in the lengthwise vertical orientation.

As an example, a rectangular device can have a fixed length and a fixed width. For example, consider a display device that can be non-foldable and non-bendable. As an example, a flat-screen display device may be of fixed length and width dimensions. As an example, a curved-screen display device may be of fixed length and width dimensions and defined in part by a radius of curvature (e.g., an arc angle with a focus and a radius). As an example, a tablet or slate device may be of fixed length and width dimensions.

As an example, a clamshell device may be of a fixed width dimension and an adjustable length dimension to a maximum length dimension. For example, consider the device 100 of FIG. 1 where in the orientation 109 the device 100 is at its maximum length dimension; whereas, in the orientation 107, the device 100 is at a minimum length dimension. In the example of FIG. 1, the device 100 has a fixed width dimension.

As an example, a rectangular device that includes a display may be defined in a Cartesian coordinate system as including a length, a width and a thickness where, for example, the display occupies at least a portion of the length and the width. As an example, a length can be of a dimension that is greater than a width of a rectangular device where a landscape orientation of the rectangular device has the length substantially horizontal and where a portrait orientation of the rectangular device has the length substantially vertical. For example, consider a tablet or slate device with a display that can be oriented with a long dimension, as a length dimension, horizontal or vertical.

As an example, a foldable device may be foldable about a region (e.g., a hinge, hinges, a resilient flexible material, etc.) to orient the foldable device in one or more folded orientations (e.g., 0 degrees and 360 degrees) and in one or more open orientations (e.g., greater than 0 degrees and less than 360 degrees), which can include an extended planar orientation (e.g., 180 degrees). For example, consider the device 610 of FIG. 9, which is shown in an extended planar orientation.

As an example, a display may be defined as a viewable surface to which circuitry can render information such as text, graphics, images, video, etc. As an example, a display may be a touch-screen display, which may be usable with a finger, a stylus and/or another implement. As an example, a touch-screen display may operate using digitizer circuitry, which depending on technology utilized, may operate without direct contact between an implement and the touch-screen display. For example, consider electric field and/or magnetic field technologies, which may operate with or without direct contact.

As an example, an assembly can include a rectangular device that includes an x dimension, a y dimension and a display; and a stand that supports the rectangular device in different orientations. In such an example, the different orientations can include a horizontal orientation of the x dimension and a horizontal orientation of the y dimension. As an example, a stand can include an adjustable member and three legs, where two of the three legs define a plane, where another of the three legs forms an angle with respect to the plane, and where the adjustable member is operatively coupled to the two of the three legs to physically support at least a portion of a mass of a rectangular device in multiple orientations (e.g., in a horizontal orientation of an x dimension and in a horizontal orientation of a y dimension, etc.).

As an example, a rectangular device can be foldable and/or bendable along its y dimension (see, e.g., FIG. 1, FIG. 6, etc.).

As to physical support of a device, as an example, consider a stand that includes at least one adjustable member of a plurality of members. In the example of FIG. 10, the stand 1050 includes members 1015 and 1055, which may be utilized for physical support of the device 1010 in different orientations of the device 1010 where the member 1015 can be adjustable. In the example of FIG. 11, the stand 1150 includes members 1157 (e.g., a cross-member) and 1159 (e.g., a locking component) where the member 1159 can be adjustable with respect to the channel member 1117 in a manner whereby at least a portion of a mass of the device 1110 is supported by the members 1157 and 1159 in cooperation with the channel member 1117. In the example of FIG. 12, the stand 1250 includes members 1257 (e.g., a cross-member) and 1259 (e.g., a locking component) where the member 1259 can be adjustable with respect to the channel member 1217 in a manner whereby at least a portion of a mass of the device 1210 is supported by the members 1257 and 1259 in cooperation with the channel member 1217. In the example of FIG. 13, the stand 1350 includes members 1357 (e.g., a cross-member) and 1359 (e.g., a locking component) where the member 1359 can be adjustable with respect to the channel 1317 in a manner whereby at least a portion of a mass of the device 1310 is supported by the members 1357 and 1359 in cooperation with the channel 1317. In the examples of FIG. 14 and FIG. 15, the members 1457-1 and 1457-2 and the members 1557-1 and 1557-2 may be adjustable to support at least a portion of a mass of a device such as the device 1410, etc. In the example of FIG. 16, the member 1657 may be adjustable to support at least a portion of a mass of the display device 1610-1 and/or, for example, the member 1657 may be adjustable to support at least a portion of a mass of the display device 1610-1 and/or 1610-2. In the example of FIG. 21, the stand 2150 includes members 2157 (e.g., a plate), 2159 (e.g., a locking component) and 2160 (e.g., a clip) where, for example, the members 2159 and 2160 may be adjustable with respect to a channel 2158 of the member 2157 where the member 2160 can support at least a portion of a mass of the device 2110. In the example of FIG. 32, the stand 2800 provides for rotation and translation; noting that a turntable (e.g., rotational mechanism) may be part of a device and/or part of a stand and that a translational mechanism may be part of a device and/or part of a stand.

As an example, a stand can be a tripod stand. As an example, a stand can include two of three legs formed from a unitary component. For example, consider a tube shaped member that includes a bend where one leg is defined to one side of the bend and another leg is defined to another side of the bend. In such an example, the two legs can be nonparallel (e.g., to an extent defined by an angle of the bend) and define a plane. As an example, a stand can include three legs where two of the legs are front legs that are nonparallel. As an example, two front legs of a three-legged stand can define an isosceles triangle where, for example, the two front legs are of equal length (e.g., equal length legs of an isosceles triangle).

As an example, an adjustable member of a stand can be a cross-member that is adjustable to define a base of an isosceles triangle with respect to lengths of two of three legs of the stand.

As an example, a stand can include three legs where each of the three legs includes a corresponding elastomeric foot.

As an example, an adjustable member can include an axis of rotation. For example, consider a rectangular device that is rotatable about the axis of rotation for transitions from a horizontal orientation of an x dimension of a rectangular device and a horizontal orientation of a y dimension of the rectangular device where the x and y dimensions may be defined with respect to a 2D or a 3D Cartesian coordinate system (e.g., x and y or x, y, and z). As an example, an adjustable member can include or can be a locking component that can include threads rotatable about an axis of rotation.

As an example, a stand can include an axle that forms a joint where one of three legs of the stand is adjustable via the joint. For example, consider a T-joint where a back leg can be adjusted with respect to two front legs of a three-legged stand.

As an example, a stand can include circuitry, which may be power circuitry, processing circuitry, memory circuitry, interface circuitry, connector circuitry, lighting circuitry, etc. As an example, a stand can include one or more types of circuitry. As an example, a stand can include one or more of a power connector, a data connector and a power and data connector.

As an example, an assembly can include a thin client, where the stand physically supports the thin client and where a rectangular device is operatively coupled to the thin client. In such an example, the rectangular device may be a computing device, a display device, a computing and display device, etc.

As an example, an assembly can include a keyboard. For example, consider a keyboard as a separate component and/or as a part of a rectangular device that includes a display. As an example, a keyboard may be a physical keyboard with depressible keys or a touch sensitive keyboard without depressible keys or a hybrid keyboard with depressible keys and one or more touch sensitive surfaces, etc. (e.g., a touch pad, a touch sensor, etc.).

As an example, a rectangular device can have a clamshell configuration that is transitionable between open and closed orientations. For example, consider a rectangular device that includes two portions operatively coupled via at least one hinge. As an example, a rectangular device may be bendable or foldable where, for example, a fold may be made in a region of the rectangular device to configure the rectangular device in an orientation that is other than planar. As an example, a foldable device may be transitionable between a planar orientation and a folded orientation.

As an example, a rectangular device can include a smart phone recess. For example, consider a recess that can house a smart phone. As an example, a recess may have a door that is hinged such that it can be opened and closed. Such a door may be, for example, at least in part transparent such that a display of a smart phone can be viewable while the smart phone is disposed at least in part in the recess.

As an example, an assembly can include a first rectangular device that includes a display; a second rectangular device that includes a display; and a stand that supports the first rectangular device and the second rectangular device in different orientations, where the different orientations include a stacked orientation and a drawing orientation, where the stand includes three legs, where two of the three legs define a plane, where another of the three legs forms an angle with respect to the plane, and where the stand includes two articulating legs, where each of the two articulating legs is operatively coupled to a corresponding one of the two of the three legs, where, in the stacked orientation, the two articulating legs are disposed between the first rectangular display and the second rectangular display, and where, in the drawing orientation, the first rectangular display is disposed in front of the two of the three legs at a drawing angle that is greater than approximately 5 degrees and less than approximately 60 degrees and the second rectangular display is disposed parallel to the plane at a viewing angle that is greater than approximately 60 degrees and less than approximately 110 degrees.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 35:
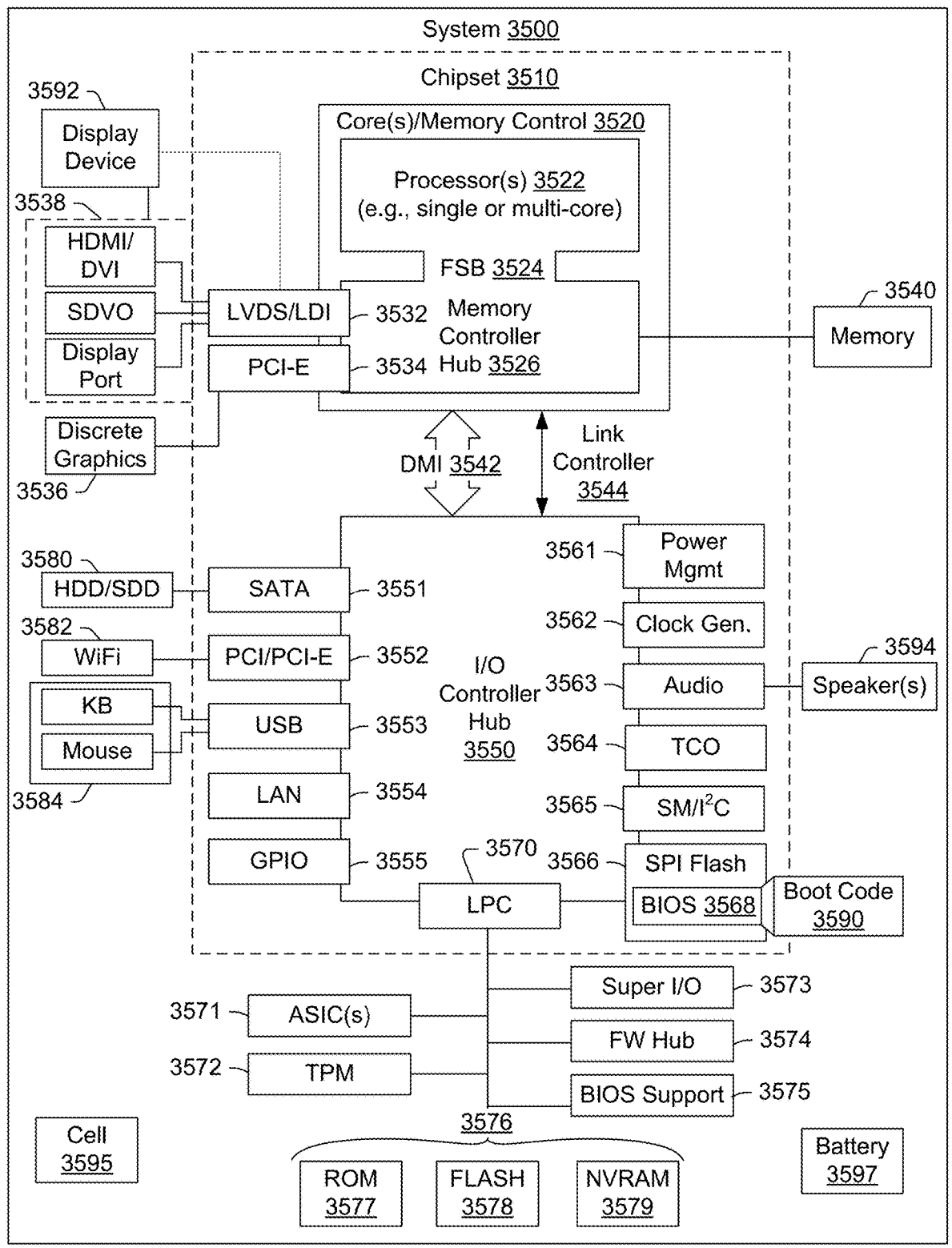
FIG. 35 is a diagram of an example of a system that includes one or more processors.

While various examples of circuits or circuitry have been discussed, FIG. 35 depicts a block diagram of an illustrative computer system 3500. The system 3500 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C. As an example, an all-in-one (AIO) system can include one or more features of the system 3500 (e.g., consider the YOGA® A940® AIO as sold by Lenovo (US) Inc. As apparent from the description herein, various types of devices may include features of the system 3500, other features and/or only some of the features of the system 3500.

As shown in FIG. 35, the system 3500 includes a so-called chipset 3510. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 35, the chipset 3510 has a particular architecture, which may vary to some extent depending on brand or manufacturer. The architecture of the chipset 3510 includes a core and memory control group 3520 and an I/O controller hub 3550 that exchange information (e.g., data, signals, commands, etc.) via, for example, a direct management interface or direct media interface (DMI) 3542 or a link controller 3544. In the example of FIG. 35, the DMI 3542 is a chip-to-chip interface (sometimes referred to as being a link between a "northbridge" and a "southbridge").

The core and memory control group 3520 include one or more processors 3522 (e.g., single core or multi-core) and a memory controller hub 3526 that exchange information via a front side bus (FSB) 3524. As described herein, various components of the core and memory control group 3520 may be integrated onto a single processor die, for example, to make a chip that supplants the conventional "northbridge" style architecture.

The memory controller hub 3526 interfaces with memory 3540. For example, the memory controller hub 3526 may provide support for DDR SDRAM memory (e.g., DDR, DDR2, DDR3, etc.). In general, the memory 3540 is a type of random-access memory (RAM). It is often referred to as "system memory".

The memory controller hub 3526 further includes a low-voltage differential signaling interface (LVDS) 3532. The LVDS 3532 may be a so-called LVDS Display Interface (LDI) for support of a display device 3592 (e.g., a CRT, a flat panel, a projector, etc.). A block 3538 includes some examples of technologies that may be supported via the LVDS interface 3532 (e.g., serial digital video, HDMI/DVI, display port). The memory controller hub 3526 also includes one or more PCI-express interfaces (PCI-E) 3534, for example, for support of discrete graphics 3536. Discrete graphics using a PCI-E interface has become an alternative approach to an accelerated graphics port (AGP). For example, the memory controller hub 3526 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 3550 includes a variety of interfaces. The example of FIG. 35 includes a SATA interface 3551, one or more PCI-E interfaces 3552 (optionally one or more legacy PCI interfaces), one or more USB interfaces 3553, a LAN interface 3554 (more generally a network interface), a general purpose I/O interface (GPIO) 3555, a low-pin count (LPC) interface 3570, a power management interface 3561, a clock generator interface 3562, an audio interface 3563 (e.g., for speakers 3594), a total cost of operation (TCO) interface 3564, a system management bus interface (e.g., a multi-master serial computer bus interface) 3565, and a serial peripheral flash memory/controller interface (SPI Flash) 3566, which, in the example of FIG. 35, includes BIOS 3568 and boot code 3590. With respect to network connections, the I/O hub controller 3550 may include integrated gigabit Ethernet controller lines multiplexed with a PCI-E interface port. Other network features may operate independent of a PCI-E interface.

The interfaces of the I/O hub controller 3550 provide for communication with various devices, networks, etc. For example, the SATA interface 3551 provides for reading, writing or reading and writing information on one or more drives 3580 such as HDDs, SDDs or a combination thereof. The I/O hub controller 3550 may also include an advanced host controller interface (AHCI) to support one or more drives 3580. The PCI-E interface 3552 allows for wireless connections 3582 to devices, networks, etc. The USB interface 3553 provides for input devices 3584 such as keyboards (KB), one or more optical sensors, mice and various other devices (e.g., microphones, cameras, phones, storage, media players, etc.). On or more other types of sensors may optionally rely on the USB interface 3553 or another interface (e.g., I²C, etc.). As to microphones, the system 3500 of FIG. 35 may include hardware (e.g., audio card) appropriately configured for receipt of sound (e.g., user voice, ambient sound, etc.).

In the example of FIG. 35, the LPC interface 3570 provides for use of one or more ASICs 3571, a trusted platform module (TPM) 3572, a super I/O 3573, a firmware hub 3574, BIOS support 3575 as well as various types of memory 3576 such as ROM 3577, Flash 3578, and non-volatile RAM (NVRAM) 3579. With respect to the TPM 3572, this module may be in the form of a chip that can be used to authenticate software and hardware devices. For example, a TPM may be capable of performing platform authentication and may be used to verify that a system seeking access is the expected system.

The system 3500, upon power on, may be configured to execute boot code 3590 for the BIOS 3568, as stored within the SPI Flash 3566, and thereafter processes data under the control of one or more operating systems and application software (e.g., stored in system memory 3540). An operating system may be stored in any of a variety of locations and accessed, for example, according to instructions of the BIOS 3568. Again, as described herein, a satellite, a base, a server or other machine may include fewer or more features than shown in the system 3500 of FIG. 35. Further, the system 3500 of FIG. 35 is shown as optionally include cell phone circuitry 3595, which may include GSM, CDMA, etc., types of circuitry configured for coordinated operation with one or more of the other features of the system 3500. Also shown in FIG. 35 is battery circuitry 3597, which may provide one or more battery, power, etc., associated features (e.g., optionally to instruct one or more other components of the system 3500). As an example, a SMBus may be operable via a LPC (see, e.g., the LPC interface 3570), via an I²C interface (see, e.g., the SM/I²C interface 3565), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. An assembly comprising:
a foldable device that comprises two portions and a region that defines a folding axis for the two portions, wherein each of the two portions comprises a respective display surface; and
a stand that comprises a base, an upright coupled to the base, and an adjustable coupling rotatably and translatably coupled to the upright, wherein the foldable device mounts to the stand via the adjustable coupling for translation and rotation of the foldable device and wherein the adjustable coupling comprises a magnetic material and wherein the foldable device comprises a magnetic material, wherein the foldable device couples to the adjustable coupling via a magnetic attraction force.

2. The assembly of claim 1 wherein the stand comprises a track and wherein the adjustable coupling is translatable via the track.

3. The assembly of claim 1 wherein the adjustable coupling comprises a turntable.

4. The assembly of claim 1 wherein the upright comprises a cable opening.

5. The assembly of claim 1 wherein the foldable device comprises a coupling that mates with the adjustable coupling of the stand.

6. The assembly of claim 5 wherein the coupling of the foldable device is positioned on a back side of one of the two portions.

7. The assembly of claim 6 wherein the adjustable coupling comprises a support surface for a back side of another one of the two portions.

8. The assembly of claim 1 wherein the adjustable coupling is translatable on the upright to a height from the base that is at least equal to a height of one of the two portions.

9. The assembly of claim 1 wherein the adjustable coupling is rotatable by 90 degrees to transition the folding axis from being aligned with the upright to being orthogonal to the upright.

10. The assembly of claim 1 wherein each of the respective display surfaces of the two portions is a separate display surface.

11. The assembly of claim 1 comprising a hinge that defines the folding axis.

12. The assembly of claim 11 wherein the foldable device comprises a coupling disposed on one of the two portions offset from the hinge, wherein the coupling mates with the adjustable coupling of the stand.

13. The assembly of claim 1 wherein a back side of one of the two portions comprises a ridge.

14. The assembly of claim 13 wherein a surface of the ridge contacts a surface of the adjustable coupling to limit at least one planar orientation of the respective display surfaces of the two portions.

15. The assembly of claim 1 wherein the foldable device is rotatable via the adjustable coupling to a portrait orientation of the two portions and a landscape orientation of the two portions.

16. The assembly of claim 1 wherein the stand comprises circuitry.

17. The assembly of claim 1 wherein the stand comprises one or more of a power connector, a data connector and a power and data connector.

18. The assembly of claim 1 comprising a keyboard and wherein the stand comprises a keyboard platform.

19. The assembly of claim 1 wherein the foldable device comprises a clamshell configuration transitionable between open and closed orientations.

* * * * *